(12) United States Patent
Rottler et al.

(10) Patent No.: US 9,311,043 B2
(45) Date of Patent: Apr. 12, 2016

(54) ADAPTIVE AUDIO FEEDBACK SYSTEM AND METHOD

(71) Applicant: Apple Inc., Cupertino, CA (US)

(72) Inventors: Benjamin A. Rottler, San Francisco, CA (US); Aram M. Lindahl, Menlo Park, CA (US); Allen Paul Haughay, Jr., San Jose, CA (US); Shawn A. Ellis, Sunnyvale, CA (US); Policarpo Bonilla Wood, Jr., San Jose, CA (US)

(73) Assignee: Apple Inc., Cupertino, CA (US)

( * ) Notice: Subject to any disclaimer, the term of this patent is extended or adjusted under 35 U.S.C. 154(b) by 415 days.

(21) Appl. No.: 13/769,217

(22) Filed: Feb. 15, 2013

(65) Prior Publication Data

US 2013/0159861 A1  Jun. 20, 2013

Related U.S. Application Data

(63) Continuation of application No. 12/686,876, filed on Jan. 13, 2010, now Pat. No. 8,381,107.

(51) Int. Cl.
| | |
|---|---|
| *G06F 3/00* | (2006.01) |
| *G06F 3/16* | (2006.01) |
| *G06F 3/0482* | (2013.01) |
| *G10L 13/00* | (2006.01) |
| *G10L 15/00* | (2013.01) |

(52) U.S. Cl.
CPC ............... *G06F 3/167* (2013.01); *G06F 3/0482* (2013.01); *G10L 13/00* (2013.01); *G10L 15/00* (2013.01)

(58) Field of Classification Search
CPC ......... G06F 3/048; G06F 3/167; G10L 15/00; G10L 13/00
USPC .................................................. 715/727–729
See application file for complete search history.

(56) References Cited

U.S. PATENT DOCUMENTS

| 3,704,345 A | 11/1972 | Coker et al. |
| 3,828,132 A | 8/1974 | Flanagan et al. |

(Continued)

FOREIGN PATENT DOCUMENTS

| CH | 681573 A5 | 4/1993 |
| DE | 3837590 A1 | 5/1990 |

(Continued)

OTHER PUBLICATIONS

Acero, A., et al., "Environmental Robustness in Automatic Speech Recognition," International Conference on Acoustics, Speech, and Signal Processing (ICASSP'90), Apr. 3-6, 1990, 4 pages.

(Continued)

*Primary Examiner* — Patrick Riegler
(74) *Attorney, Agent, or Firm* — Morrison & Foerster LLP

(57) ABSTRACT

Various techniques for adaptively varying audio feedback data on an electronic device are provided. In one embodiment, an audio user interface implementing certain aspects of the present disclosure may devolve or evolve the verbosity of audio feedback in response to user interface events based at least partially upon the verbosity level of audio feedback provided during previous occurrences of the user interface event. In another embodiment, an audio user interface may be configured to vary the verbosity of audio feedback associated with a navigable list of items based at least partially upon the speed at which a user navigates the list. In a further embodiment, an audio user interface may be configured to vary audio feedback verbosity based upon the contextual importance of a user interface event. Electronic devices implementing the present techniques provide an improved user experience with regard to audio user interfaces.

25 Claims, 20 Drawing Sheets

(56) References Cited

U.S. PATENT DOCUMENTS

| | | |
|---|---|---|
| 3,979,557 A | 9/1976 | Schulman et al. |
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |
| 4,653,021 A | 3/1987 | Takagi |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,614 A | 9/1991 | Bianco |
| 5,057,915 A | 10/1991 | Kohorn et al. |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lennig et al. |
| 5,491,772 A | 2/1996 | Hardwick et al. |
| 5,493,677 A | 2/1996 | Balogh |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,390 A | 3/1998 | Katayanagi et al. |
| 5,734,791 A | 3/1998 | Acero et al. |
| 5,737,609 A * | 4/1998 | Reed et al. .................. 717/126 |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |

(56) References Cited

U.S. PATENT DOCUMENTS

| | | | |
|---|---|---|---|
| 5,794,207 A | 8/1998 | Walker et al. | |
| 5,794,237 A | 8/1998 | Gore, Jr. | |
| 5,799,276 A | 8/1998 | Komissarchik et al. | |
| 5,801,692 A | 9/1998 | Muzio et al. | |
| 5,822,743 A | 10/1998 | Gupta et al. | |
| 5,825,881 A | 10/1998 | Colvin, Sr. | |
| 5,826,261 A | 10/1998 | Spencer | |
| 5,828,999 A | 10/1998 | Bellegarda et al. | |
| 5,835,893 A | 11/1998 | Ushioda | |
| 5,839,106 A | 11/1998 | Bellegarda | |
| 5,845,255 A | 12/1998 | Mayaud | |
| 5,857,184 A | 1/1999 | Lynch | |
| 5,860,063 A | 1/1999 | Gorin et al. | |
| 5,862,223 A | 1/1999 | Walker et al. | |
| 5,864,806 A | 1/1999 | Mokbel et al. | |
| 5,864,844 A | 1/1999 | James et al. | |
| 5,867,799 A | 2/1999 | Lang et al. | |
| 5,873,056 A | 2/1999 | Liddy et al. | |
| 5,875,437 A | 2/1999 | Atkins | |
| 5,884,323 A | 3/1999 | Hawkins et al. | |
| 5,895,464 A | 4/1999 | Bhandari et al. | |
| 5,895,466 A | 4/1999 | Goldberg et al. | |
| 5,899,972 A | 5/1999 | Miyazawa et al. | |
| 5,913,193 A | 6/1999 | Huang et al. | |
| 5,915,249 A | 6/1999 | Spencer | |
| 5,930,769 A | 7/1999 | Rose | |
| 5,933,822 A | 8/1999 | Braden-Harder et al. | |
| 5,936,926 A | 8/1999 | Yokouchi et al. | |
| 5,940,811 A | 8/1999 | Norris | |
| 5,941,944 A | 8/1999 | Messerly | |
| 5,943,670 A | 8/1999 | Prager | |
| 5,948,040 A | 9/1999 | DeLorme et al. | |
| 5,956,699 A | 9/1999 | Wong et al. | |
| 5,960,422 A | 9/1999 | Prasad | |
| 5,963,924 A | 10/1999 | Williams et al. | |
| 5,966,126 A | 10/1999 | Szabo | |
| 5,970,474 A | 10/1999 | LeRoy et al. | |
| 5,973,612 A * | 10/1999 | Deo et al. | 340/7.58 |
| 5,974,146 A | 10/1999 | Randle et al. | |
| 5,982,891 A | 11/1999 | Ginter et al. | |
| 5,987,132 A | 11/1999 | Rowney | |
| 5,987,140 A | 11/1999 | Rowney et al. | |
| 5,987,404 A | 11/1999 | Della Pietra et al. | |
| 5,987,440 A | 11/1999 | O'Neil et al. | |
| 5,999,908 A | 12/1999 | Abelow | |
| 6,016,471 A | 1/2000 | Kuhn et al. | |
| 6,023,684 A | 2/2000 | Pearson | |
| 6,024,288 A | 2/2000 | Gottlich et al. | |
| 6,026,345 A | 2/2000 | Shah et al. | |
| 6,026,375 A | 2/2000 | Hall et al. | |
| 6,026,388 A | 2/2000 | Liddy et al. | |
| 6,026,393 A | 2/2000 | Gupta et al. | |
| 6,029,132 A | 2/2000 | Kuhn et al. | |
| 6,038,533 A | 3/2000 | Buchsbaum et al. | |
| 6,052,656 A | 4/2000 | Suda et al. | |
| 6,055,514 A | 4/2000 | Wren | |
| 6,055,531 A | 4/2000 | Bennett et al. | |
| 6,064,960 A | 5/2000 | Bellegarda et al. | |
| 6,070,139 A | 5/2000 | Miyazawa et al. | |
| 6,070,147 A | 5/2000 | Harms et al. | |
| 6,076,051 A | 6/2000 | Messerly et al. | |
| 6,076,088 A | 6/2000 | Paik et al. | |
| 6,078,914 A | 6/2000 | Redfern | |
| 6,081,750 A | 6/2000 | Hoffberg et al. | |
| 6,081,774 A | 6/2000 | de Hita et al. | |
| 6,088,731 A | 7/2000 | Kiraly et al. | |
| 6,094,649 A | 7/2000 | Bowen et al. | |
| 6,105,865 A | 8/2000 | Hardesty | |
| 6,108,627 A | 8/2000 | Sabourin | |
| 6,111,562 A | 8/2000 | Downs et al. | |
| 6,119,101 A | 9/2000 | Peckover | |
| 6,122,616 A | 9/2000 | Henton | |
| 6,125,356 A | 9/2000 | Brockman et al. | |
| 6,144,938 A | 11/2000 | Surace et al. | |
| 6,173,261 B1 | 1/2001 | Arai et al. | |
| 6,173,279 B1 | 1/2001 | Levin et al. | |
| 6,188,967 B1 * | 2/2001 | Kurtzberg et al. | 702/84 |
| 6,188,999 B1 | 2/2001 | Moody | |
| 6,195,641 B1 | 2/2001 | Loring et al. | |
| 6,205,456 B1 | 3/2001 | Nakao | |
| 6,208,971 B1 | 3/2001 | Bellegarda et al. | |
| 6,233,559 B1 | 5/2001 | Balakrishnan | |
| 6,233,578 B1 | 5/2001 | Machihara et al. | |
| 6,246,981 B1 | 6/2001 | Papineni et al. | |
| 6,260,024 B1 | 7/2001 | Shkedy | |
| 6,266,637 B1 | 7/2001 | Donovan et al. | |
| 6,275,824 B1 | 8/2001 | O'Flaherty et al. | |
| 6,285,786 B1 | 9/2001 | Seni et al. | |
| 6,297,818 B1 | 10/2001 | Ulrich et al. | |
| 6,308,149 B1 | 10/2001 | Gaussier et al. | |
| 6,311,189 B1 | 10/2001 | deVries et al. | |
| 6,317,594 B1 | 11/2001 | Gossman et al. | |
| 6,317,707 B1 | 11/2001 | Bangalore et al. | |
| 6,317,831 B1 | 11/2001 | King | |
| 6,321,092 B1 | 11/2001 | Fitch et al. | |
| 6,334,103 B1 | 12/2001 | Surace et al. | |
| 6,356,854 B1 | 3/2002 | Schubert et al. | |
| 6,356,905 B1 | 3/2002 | Gershman et al. | |
| 6,366,883 B1 | 4/2002 | Campbell et al. | |
| 6,366,884 B1 | 4/2002 | Bellegarda et al. | |
| 6,385,662 B1 | 5/2002 | Moon et al. | |
| 6,421,672 B1 | 7/2002 | McAllister et al. | |
| 6,434,524 B1 | 8/2002 | Weber | |
| 6,446,076 B1 | 9/2002 | Burkey et al. | |
| 6,449,620 B1 | 9/2002 | Draper et al. | |
| 6,453,292 B2 | 9/2002 | Ramaswamy et al. | |
| 6,460,029 B1 | 10/2002 | Fries et al. | |
| 6,466,654 B1 | 10/2002 | Cooper et al. | |
| 6,469,712 B1 | 10/2002 | Hilpert, Jr. et al. | |
| 6,477,488 B1 | 11/2002 | Bellegarda | |
| 6,487,534 B1 | 11/2002 | Thelen et al. | |
| 6,499,013 B1 | 12/2002 | Weber | |
| 6,501,937 B1 | 12/2002 | Ho et al. | |
| 6,505,158 B1 | 1/2003 | Conkie | |
| 6,505,175 B1 | 1/2003 | Silverman et al. | |
| 6,505,183 B1 | 1/2003 | Loofbourrow et al. | |
| 6,510,417 B1 | 1/2003 | Woods et al. | |
| 6,513,063 B1 | 1/2003 | Julia et al. | |
| 6,523,061 B1 | 2/2003 | Halverson et al. | |
| 6,523,172 B1 | 2/2003 | Martinez-Guerra et al. | |
| 6,526,382 B1 | 2/2003 | Yuschik | |
| 6,526,395 B1 | 2/2003 | Morris | |
| 6,532,444 B1 | 3/2003 | Weber | |
| 6,532,446 B1 | 3/2003 | King | |
| 6,546,388 B1 | 4/2003 | Edlund et al. | |
| 6,553,344 B2 | 4/2003 | Bellegarda et al. | |
| 6,556,983 B1 | 4/2003 | Altschuler et al. | |
| 6,584,464 B1 | 6/2003 | Warthen | |
| 6,598,039 B1 | 7/2003 | Livowsky | |
| 6,601,026 B2 | 7/2003 | Appelt et al. | |
| 6,601,234 B1 | 7/2003 | Bowman-Amuah | |
| 6,604,059 B2 | 8/2003 | Strubbe et al. | |
| 6,615,172 B1 | 9/2003 | Bennett et al. | |
| 6,615,175 B1 | 9/2003 | Gazdzinski | |
| 6,615,220 B1 | 9/2003 | Austin et al. | |
| 6,625,583 B1 | 9/2003 | Silverman et al. | |
| 6,631,346 B1 | 10/2003 | Karaorman et al. | |
| 6,633,846 B1 | 10/2003 | Bennett et al. | |
| 6,647,260 B2 | 11/2003 | Dusse et al. | |
| 6,650,735 B2 | 11/2003 | Burton et al. | |
| 6,654,740 B2 | 11/2003 | Tokuda et al. | |
| 6,665,639 B2 | 12/2003 | Mozer et al. | |
| 6,665,640 B1 | 12/2003 | Bennett et al. | |
| 6,665,641 B1 | 12/2003 | Coorman et al. | |
| 6,684,187 B1 | 1/2004 | Conkie | |
| 6,691,064 B2 | 2/2004 | Vroman | |
| 6,691,111 B2 | 2/2004 | Lazaridis et al. | |
| 6,691,151 B1 | 2/2004 | Cheyer et al. | |
| 6,697,780 B1 | 2/2004 | Beutnagel et al. | |
| 6,697,824 B1 | 2/2004 | Bowman-Amuah | |
| 6,701,294 B1 | 3/2004 | Ball et al. | |
| 6,711,585 B1 | 3/2004 | Copperman et al. | |
| 6,718,324 B2 | 4/2004 | Edlund et al. | |
| 6,721,728 B2 | 4/2004 | McGreevy | |

(56) References Cited

U.S. PATENT DOCUMENTS

| | | | |
|---|---|---|---|
| 6,735,632 B1 | 5/2004 | Kiraly et al. | |
| 6,742,021 B1 | 5/2004 | Halverson et al. | |
| 6,757,362 B1 | 6/2004 | Cooper et al. | |
| 6,757,718 B1 | 6/2004 | Halverson et al. | |
| 6,766,320 B1 | 7/2004 | Want et al. | |
| 6,771,982 B1 * | 8/2004 | Toupin | H04M 1/72588 455/557 |
| 6,778,951 B1 | 8/2004 | Contractor | |
| 6,778,952 B2 | 8/2004 | Bellegarda | |
| 6,778,962 B1 | 8/2004 | Kasai et al. | |
| 6,778,970 B2 | 8/2004 | Au | |
| 6,792,082 B1 | 9/2004 | Levine | |
| 6,807,574 B1 | 10/2004 | Partovi et al. | |
| 6,810,379 B1 | 10/2004 | Vermeulen et al. | |
| 6,813,491 B1 | 11/2004 | McKinney | |
| 6,829,603 B1 | 12/2004 | Chai et al. | |
| 6,832,194 B1 | 12/2004 | Mozer et al. | |
| 6,842,767 B1 | 1/2005 | Partovi et al. | |
| 6,847,966 B1 | 1/2005 | Sommer et al. | |
| 6,847,979 B2 | 1/2005 | Allemang et al. | |
| 6,851,115 B1 | 2/2005 | Cheyer et al. | |
| 6,859,931 B1 | 2/2005 | Cheyer et al. | |
| 6,895,380 B2 | 5/2005 | Sepe, Jr. | |
| 6,895,558 B1 | 5/2005 | Loveland | |
| 6,901,399 B1 | 5/2005 | Corston et al. | |
| 6,912,499 B1 | 6/2005 | Sabourin et al. | |
| 6,924,828 B1 | 8/2005 | Hirsch | |
| 6,928,614 B1 | 8/2005 | Everhart | |
| 6,931,384 B1 | 8/2005 | Horvitz et al. | |
| 6,937,975 B1 | 8/2005 | Elworthy | |
| 6,937,986 B2 | 8/2005 | Denenberg et al. | |
| 6,964,023 B2 | 11/2005 | Maes et al. | |
| 6,978,127 B1 * | 12/2005 | Bulthuis et al. | 455/412.1 |
| 6,980,949 B2 | 12/2005 | Ford | |
| 6,980,955 B2 | 12/2005 | Okutani et al. | |
| 6,985,865 B1 | 1/2006 | Packingham et al. | |
| 6,988,071 B1 | 1/2006 | Gazdzinski | |
| 6,996,531 B2 | 2/2006 | Korall et al. | |
| 6,999,927 B2 | 2/2006 | Mozer et al. | |
| 7,020,685 B1 | 3/2006 | Chen et al. | |
| 7,024,366 B1 | 4/2006 | Deyoe et al. | |
| 7,027,974 B1 | 4/2006 | Busch et al. | |
| 7,036,128 B1 | 4/2006 | Julia et al. | |
| 7,050,977 B1 | 5/2006 | Bennett | |
| 7,058,569 B2 | 6/2006 | Coorman et al. | |
| 7,062,428 B2 | 6/2006 | Hogenhout et al. | |
| 7,069,560 B1 | 6/2006 | Cheyer et al. | |
| 7,092,887 B2 | 8/2006 | Mozer et al. | |
| 7,092,928 B1 | 8/2006 | Elad et al. | |
| 7,093,693 B1 | 8/2006 | Gazdzinski | |
| 7,127,046 B1 | 10/2006 | Smith et al. | |
| 7,127,403 B1 | 10/2006 | Saylor et al. | |
| 7,136,710 B1 | 11/2006 | Hoffberg et al. | |
| 7,137,126 B1 | 11/2006 | Coffman et al. | |
| 7,139,714 B2 | 11/2006 | Bennett et al. | |
| 7,139,722 B2 | 11/2006 | Perrella et al. | |
| 7,152,070 B1 | 12/2006 | Musick et al. | |
| 7,177,798 B2 | 2/2007 | Hsu et al. | |
| 7,197,460 B1 | 3/2007 | Gupta et al. | |
| 7,200,559 B2 | 4/2007 | Wang | |
| 7,203,646 B2 | 4/2007 | Bennett | |
| 7,216,073 B2 | 5/2007 | Lavi et al. | |
| 7,216,080 B2 | 5/2007 | Tsiao et al. | |
| 7,225,125 B2 | 5/2007 | Bennett et al. | |
| 7,233,790 B2 | 6/2007 | Kjellberg et al. | |
| 7,233,904 B2 | 6/2007 | Luisi | |
| 7,266,496 B2 | 9/2007 | Wang et al. | |
| 7,277,854 B2 | 10/2007 | Bennett et al. | |
| 7,290,039 B1 | 10/2007 | Lisitsa et al. | |
| 7,299,033 B2 | 11/2007 | Kjellberg et al. | |
| 7,310,600 B1 | 12/2007 | Garner et al. | |
| 7,324,947 B2 | 1/2008 | Jordan et al. | |
| 7,349,953 B2 | 3/2008 | Lisitsa et al. | |
| 7,376,556 B2 | 5/2008 | Bennett | |
| 7,376,645 B2 | 5/2008 | Bernard | |
| 7,379,874 B2 | 5/2008 | Schmid et al. | |
| 7,386,449 B2 | 6/2008 | Sun et al. | |
| 7,389,224 B1 | 6/2008 | Elworthy | |
| 7,392,185 B2 | 6/2008 | Bennett | |
| 7,398,209 B2 | 7/2008 | Kennewick et al. | |
| 7,403,938 B2 | 7/2008 | Harrison et al. | |
| 7,409,337 B1 | 8/2008 | Potter et al. | |
| 7,415,100 B2 | 8/2008 | Cooper et al. | |
| 7,418,392 B1 | 8/2008 | Mozer et al. | |
| 7,426,467 B2 | 9/2008 | Nashida et al. | |
| 7,427,024 B1 | 9/2008 | Gazdzinski et al. | |
| 7,447,635 B1 | 11/2008 | Konopka et al. | |
| 7,454,351 B2 | 11/2008 | Jeschke et al. | |
| 7,467,087 B1 | 12/2008 | Gillick et al. | |
| 7,475,010 B2 | 1/2009 | Chao | |
| 7,483,894 B2 | 1/2009 | Cao | |
| 7,487,089 B2 | 2/2009 | Mozer | |
| 7,496,498 B2 | 2/2009 | Chu et al. | |
| 7,496,512 B2 | 2/2009 | Zhao et al. | |
| 7,502,738 B2 | 3/2009 | Kennewick et al. | |
| 7,508,373 B2 | 3/2009 | Lin et al. | |
| 7,522,927 B2 | 4/2009 | Fitch et al. | |
| 7,523,108 B2 | 4/2009 | Cao | |
| 7,526,466 B2 | 4/2009 | Au | |
| 7,529,671 B2 | 5/2009 | Rockenbeck et al. | |
| 7,529,676 B2 | 5/2009 | Koyama | |
| 7,536,565 B2 | 5/2009 | Girish et al. | |
| 7,538,685 B1 * | 5/2009 | Cooper et al. | 340/692 |
| 7,539,656 B2 | 5/2009 | Fratkina et al. | |
| 7,546,382 B2 | 6/2009 | Healey et al. | |
| 7,548,895 B2 | 6/2009 | Pulsipher | |
| 7,552,055 B2 | 6/2009 | Lecoeuche | |
| 7,555,431 B2 | 6/2009 | Bennett | |
| 7,558,730 B2 | 7/2009 | Davis et al. | |
| 7,571,106 B2 | 8/2009 | Cao et al. | |
| 7,599,918 B2 | 10/2009 | Shen et al. | |
| 7,620,549 B2 | 11/2009 | Di Cristo et al. | |
| 7,624,007 B2 | 11/2009 | Bennett | |
| 7,634,409 B2 | 12/2009 | Kennewick et al. | |
| 7,636,657 B2 | 12/2009 | Ju et al. | |
| 7,640,160 B2 | 12/2009 | Di Cristo et al. | |
| 7,647,225 B2 | 1/2010 | Bennett et al. | |
| 7,657,424 B2 | 2/2010 | Bennett | |
| 7,672,841 B2 | 3/2010 | Bennett | |
| 7,676,026 B1 | 3/2010 | Baxter, Jr. | |
| 7,684,985 B2 | 3/2010 | Dominach et al. | |
| 7,693,715 B2 | 4/2010 | Hwang et al. | |
| 7,693,720 B2 | 4/2010 | Kennewick et al. | |
| 7,698,131 B2 | 4/2010 | Bennett | |
| 7,702,500 B2 | 4/2010 | Blaedow | |
| 7,702,508 B2 | 4/2010 | Bennett | |
| 7,707,027 B2 | 4/2010 | Balchandran et al. | |
| 7,707,032 B2 | 4/2010 | Wang et al. | |
| 7,707,267 B2 | 4/2010 | Lisitsa et al. | |
| 7,711,565 B1 | 5/2010 | Gazdzinski | |
| 7,711,672 B2 | 5/2010 | Au | |
| 7,716,056 B2 | 5/2010 | Weng et al. | |
| 7,720,674 B2 | 5/2010 | Kaiser et al. | |
| 7,720,683 B1 | 5/2010 | Vermeulen et al. | |
| 7,725,307 B2 | 5/2010 | Bennett | |
| 7,725,318 B2 | 5/2010 | Gavalda et al. | |
| 7,725,320 B2 | 5/2010 | Bennett | |
| 7,725,321 B2 | 5/2010 | Bennett | |
| 7,729,904 B2 | 6/2010 | Bennett | |
| 7,729,916 B2 | 6/2010 | Coffman et al. | |
| 7,734,461 B2 | 6/2010 | Kwak et al. | |
| 7,747,616 B2 | 6/2010 | Yamada et al. | |
| 7,752,152 B2 | 7/2010 | Paek et al. | |
| 7,756,868 B2 | 7/2010 | Lee | |
| 7,774,204 B2 | 8/2010 | Mozer et al. | |
| 7,783,486 B2 | 8/2010 | Rosser et al. | |
| 7,801,729 B2 | 9/2010 | Mozer | |
| 7,809,570 B2 | 10/2010 | Kennewick et al. | |
| 7,809,610 B2 | 10/2010 | Cao | |
| 7,818,176 B2 | 10/2010 | Freeman et al. | |
| 7,822,608 B2 | 10/2010 | Cross, Jr. et al. | |
| 7,826,945 B2 | 11/2010 | Zhang et al. | |
| 7,831,426 B2 | 11/2010 | Bennett | |
| 7,840,400 B2 | 11/2010 | Lavi et al. | |

(56) References Cited

U.S. PATENT DOCUMENTS

| | | |
|---|---|---|
| 7,840,447 B2 | 11/2010 | Kleinrock et al. |
| 7,853,574 B2 | 12/2010 | Kraenzel et al. |
| 7,873,519 B2 | 1/2011 | Bennett |
| 7,873,654 B2 | 1/2011 | Bernard |
| 7,881,936 B2 | 2/2011 | Longé et al. |
| 7,890,652 B2 | 2/2011 | Bull et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,925,525 B2 | 4/2011 | Chin |
| 7,930,168 B2 | 4/2011 | Weng et al. |
| 7,949,529 B2 | 5/2011 | Weider et al. |
| 7,949,534 B2 | 5/2011 | Davis et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,986,431 B2 | 7/2011 | Emori et al. |
| 7,987,151 B2 | 7/2011 | Schott et al. |
| 7,996,228 B2 | 8/2011 | Miller et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,024,195 B2 | 9/2011 | Mozer et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longé et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,131,557 B2 | 3/2012 | Davis et al. |
| 8,140,335 B2 | 3/2012 | Kennewick et al. |
| 8,165,321 B2 | 4/2012 | Paquier et al. |
| 8,165,886 B1 | 4/2012 | Gagnon et al. |
| 8,166,019 B1 | 4/2012 | Lee et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,301,456 B2 | 10/2012 | Gazdzinski |
| 8,311,834 B1 | 11/2012 | Gazdzinski |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,381,107 B2 | 2/2013 | Rottler et al. |
| 8,428,758 B2 | 4/2013 | Naik et al. |
| 8,447,612 B2 | 5/2013 | Gazdzinski |
| 2001/0047264 A1 | 11/2001 | Roundtree |
| 2002/0032564 A1 | 3/2002 | Ehsani et al. |
| 2002/0046025 A1 | 4/2002 | Hain |
| 2002/0069063 A1 | 6/2002 | Buchner et al. |
| 2002/0077817 A1 | 6/2002 | Atal |
| 2002/0103641 A1 | 8/2002 | Kuo et al. |
| 2002/0109709 A1 | 8/2002 | Sagar |
| 2002/0164000 A1 | 11/2002 | Cohen et al. |
| 2002/0198714 A1 | 12/2002 | Zhou |
| 2003/0030645 A1* | 2/2003 | Ribak ............... G06F 17/30905 345/581 |
| 2004/0036715 A1 | 2/2004 | Warren |
| 2004/0120476 A1* | 6/2004 | Harrison ............... H04M 3/493 379/88.18 |
| 2004/0135701 A1 | 7/2004 | Yasuda et al. |
| 2004/0236778 A1 | 11/2004 | Junqua et al. |
| 2005/0015751 A1* | 1/2005 | Grassens ............ G06F 11/3624 717/130 |
| 2005/0055403 A1 | 3/2005 | Brittan |
| 2005/0071332 A1 | 3/2005 | Ortega et al. |
| 2005/0080625 A1 | 4/2005 | Bennett et al. |
| 2005/0091118 A1 | 4/2005 | Fano |
| 2005/0102614 A1 | 5/2005 | Brockett et al. |
| 2005/0108001 A1 | 5/2005 | Aarskog |
| 2005/0114124 A1 | 5/2005 | Liu et al. |
| 2005/0119897 A1 | 6/2005 | Bennett et al. |
| 2005/0143972 A1 | 6/2005 | Gopalakrishnan et al. |
| 2005/0165607 A1 | 7/2005 | DiFabbrizio et al. |
| 2005/0182629 A1 | 8/2005 | Coorman et al. |
| 2005/0196733 A1 | 9/2005 | Budra et al. |
| 2005/0251572 A1* | 11/2005 | McMahan ............ H04L 43/065 709/224 |
| 2005/0288936 A1 | 12/2005 | Busayapongchai et al. |
| 2006/0018492 A1 | 1/2006 | Chiu et al. |
| 2006/0050865 A1 | 3/2006 | Kortum et al. |
| 2006/0095848 A1 | 5/2006 | Naik |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0117002 A1 | 6/2006 | Swen |
| 2006/0122834 A1 | 6/2006 | Bennett |
| 2006/0143007 A1 | 6/2006 | Koh et al. |
| 2006/0153040 A1 | 7/2006 | Girish et al. |
| 2006/0229802 A1* | 10/2006 | Vertelney et al. ............ 701/200 |
| 2007/0050191 A1 | 3/2007 | Weider et al. |
| 2007/0055529 A1 | 3/2007 | Kanevsky et al. |
| 2007/0058832 A1 | 3/2007 | Hug et al. |
| 2007/0080936 A1* | 4/2007 | Tsuk et al. .................... 345/156 |
| 2007/0088556 A1 | 4/2007 | Andrew |
| 2007/0100790 A1 | 5/2007 | Cheyer et al. |
| 2007/0100883 A1 | 5/2007 | Rose et al. |
| 2007/0106674 A1 | 5/2007 | Agrawal et al. |
| 2007/0118377 A1 | 5/2007 | Badino et al. |
| 2007/0135949 A1 | 6/2007 | Snover et al. |
| 2007/0174188 A1 | 7/2007 | Fish |
| 2007/0185917 A1 | 8/2007 | Prahlad et al. |
| 2007/0192027 A1 | 8/2007 | Lee et al. |
| 2007/0255979 A1 | 11/2007 | Deily et al. |
| 2007/0261080 A1 | 11/2007 | Saetti |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0109402 A1* | 5/2008 | Wang et al. .................... 707/3 |
| 2008/0120112 A1 | 5/2008 | Jordan et al. |
| 2008/0129520 A1 | 6/2008 | Lee |
| 2008/0140657 A1 | 6/2008 | Azvine et al. |
| 2008/0221903 A1 | 9/2008 | Kanevsky et al. |
| 2008/0228496 A1 | 9/2008 | Yu et al. |
| 2008/0229185 A1 | 9/2008 | Lynch |
| 2008/0247519 A1 | 10/2008 | Abella et al. |
| 2008/0249770 A1 | 10/2008 | Kim et al. |
| 2008/0300878 A1 | 12/2008 | Bennett |
| 2008/0319763 A1 | 12/2008 | Di Fabbrizio et al. |
| 2009/0006096 A1 | 1/2009 | Badger et al. |
| 2009/0006343 A1 | 1/2009 | Platt et al. |
| 2009/0012748 A1* | 1/2009 | Beish ................... G06F 11/366 702/187 |
| 2009/0030800 A1 | 1/2009 | Grois |
| 2009/0055179 A1 | 2/2009 | Cho et al. |
| 2009/0058823 A1 | 3/2009 | Kocienda |
| 2009/0063974 A1 | 3/2009 | Bull et al. |
| 2009/0064031 A1 | 3/2009 | Bull et al. |
| 2009/0076796 A1 | 3/2009 | Daraselia |
| 2009/0077165 A1 | 3/2009 | Rhodes et al. |
| 2009/0083034 A1* | 3/2009 | Hernandez et al. ............ 704/251 |
| 2009/0100049 A1 | 4/2009 | Cao |

(56) References Cited

U.S. PATENT DOCUMENTS

| | | |
|---|---|---|
| 2009/0112677 A1 | 4/2009 | Rhett |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0172542 A1 | 7/2009 | Girish et al. |
| 2009/0182445 A1 | 7/2009 | Girish et al. |
| 2009/0210232 A1* | 8/2009 | Sanchez ............... 704/275 |
| 2009/0248420 A1* | 10/2009 | Basir ............ H04M 1/6075 704/275 |
| 2009/0287583 A1 | 11/2009 | Holmes |
| 2009/0290718 A1 | 11/2009 | Kahn et al. |
| 2009/0296552 A1 | 12/2009 | Hicks et al. |
| 2009/0299745 A1 | 12/2009 | Kennewick et al. |
| 2009/0299849 A1 | 12/2009 | Cao et al. |
| 2009/0307162 A1 | 12/2009 | Bui et al. |
| 2009/0313544 A1 | 12/2009 | Wood et al. |
| 2009/0313564 A1 | 12/2009 | Rottler et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0088020 A1 | 4/2010 | Sano et al. |
| 2010/0138215 A1 | 6/2010 | Williams |
| 2010/0145700 A1 | 6/2010 | Kennewick et al. |
| 2010/0169075 A1 | 7/2010 | Raffa et al. |
| 2010/0169097 A1 | 7/2010 | Nachman et al. |
| 2010/0199215 A1* | 8/2010 | Seymour et al. ............ 715/808 |
| 2010/0204986 A1 | 8/2010 | Kennewick et al. |
| 2010/0211199 A1 | 8/2010 | Naik et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0262599 A1 | 10/2010 | Nitz |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0332235 A1 | 12/2010 | David |
| 2010/0332348 A1 | 12/2010 | Cao |
| 2011/0035434 A1* | 2/2011 | Lockwood ........... H04L 12/581 709/203 |
| 2011/0047072 A1 | 2/2011 | Ciurea |
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131045 A1 | 6/2011 | Cristo et al. |
| 2011/0143811 A1 | 6/2011 | Rodriguez |
| 2011/0144901 A1* | 6/2011 | Wang ............... G01C 21/3629 701/533 |
| 2011/0144999 A1 | 6/2011 | Jang et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0184730 A1 | 7/2011 | LeBeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0137367 A1 | 5/2012 | Dupont et al. |
| 2012/0173464 A1 | 7/2012 | Tur et al. |
| 2012/0265528 A1 | 10/2012 | Gruber et al. |
| 2012/0271676 A1 | 10/2012 | Aravamudan et al. |
| 2012/0311583 A1 | 12/2012 | Gruber et al. |
| 2013/0110518 A1 | 5/2013 | Gruber et al. |
| 2013/0110520 A1 | 5/2013 | Cheyer et al. |

FOREIGN PATENT DOCUMENTS

| | | |
|---|---|---|
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 0863453 A1 | 9/1998 |
| EP | 1245023 A1 | 10/2002 |
| EP | 1 818 786 A1 | 8/2007 |
| EP | 2 109 295 A1 | 10/2009 |
| GB | 2293667 A | 4/1996 |
| JP | 06 019965 | 1/1994 |
| JP | 2001 125896 | 5/2001 |
| JP | 2002 024212 | 1/2002 |
| JP | 2003 517158 A | 5/2003 |
| JP | 2009 036999 | 2/2009 |
| KR | 10-2007-0057496 | 6/2007 |
| KR | 10-0776800 B1 | 11/2007 |
| KR | 10-2008-001227 | 2/2008 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10-2010-0032792 | 4/2010 |
| KR | 10 2011 0113414 A | 10/2011 |
| WO | WO 95/02221 | 1/1995 |
| WO | WO 97/26612 | 7/1997 |
| WO | WO 98/41956 | 9/1998 |
| WO | WO 99/01834 | 1/1999 |
| WO | WO 99/08238 | 2/1999 |
| WO | WO 99/56227 | 11/1999 |
| WO | WO 00/60435 | 10/2000 |
| WO | WO 00/60435 A3 | 10/2000 |
| WO | WO 02/073603 A1 | 9/2002 |
| WO | WO 2006/101649 A2 | 9/2006 |
| WO | WO 2006/129967 A1 | 12/2006 |
| WO | WO 2008/085742 A2 | 7/2008 |
| WO | WO 2008/109835 A2 | 9/2008 |
| WO | WO 2011/088053 A2 | 7/2011 |

OTHER PUBLICATIONS

Acero, A., et al., "Robust Speech Recognition by Normalization of The Acoustic Space," International Conference on Acoustics, Speech, and Signal Processing, 1991, 4 pages.

(56) References Cited

OTHER PUBLICATIONS

Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.
Aikawa, K., "Speech Recognition Using Time-Warping Neural Networks," Proceedings of the 1991 IEEE Workshop on Neural Networks for Signal Processing, Sep. 30-Oct. 1, 1991, 10 pages.
Anastasakos, A., et al., "Duration Modeling in Large Vocabulary Speech Recognition," International Conference on Acoustics, Speech, and Signal Processing (ICASSP'95), May 9-12, 1995, 4 pages.
Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.
Ansari, R., et al., "Pitch Modification of Speech using a Low-Sensitivity Inverse Filter Approach," IEEE Signal Processing Letters, vol. 5, No. 3, Mar. 1998, 3 pages.
Anthony, N. J., et al., "Supervised Adaption for Signature Verification System," Jun. 1, 1978, IBM Technical Disclosure, 3 pages.
Apple Computer, "Guide Maker User's Guide," © Apple Computer, Inc., Apr. 27, 1994, 8 pages.
Apple Computer, "Introduction to Apple Guide," © Apple Computer, Inc., Apr. 28, 1994, 20 pages.
Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley.EDU, 7 pages.
Atal, B. S., "Efficient Coding of LPC Parameters by Temporal Decomposition," IEEE International Conference on Acoustics, Speech, and Signal Processing (ICASSP'83), Apr. 1983, 4 pages.
Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.
Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.
Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.
Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.
Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.
Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.
Banbrook, M., "Nonlinear Analysis of Speech from a Synthesis Perspective," A thesis submitted for the degree of Doctor of Philosophy, The University of Edinburgh, Oct. 15, 1996, 35 pages.
Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.
Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris-France, Jul. 1993, 11 pages.
Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.

Bellegarda, J. R., "A Multispan Language Modeling Framework for Large Vocabulary Speech Recognition," IEEE Transactions on Speech and Audio Processing, vol. 6, No. 5, Sep. 1998, 12 pages.
Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.
Bellegarda, J. R., et al., "Experiments Using Data Augmentation for Speaker Adaptation," International Conference on Acoustics, Speech, and Signal Processing (ICASSP'95), May 9-12, 1995, 4 pages.
Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.
Bellegarda, J. R., "Exploiting Latent Semantic Information in Statistical Language Modeling," In Proceedings of the IEEE, Aug. 2000, vol. 88, No. 8, 18 pages.
Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.
Bellegarda, J. R., "Large Vocabulary Speech Recognition with Multispan Statistical Language Models," IEEE Transactions on Speech and Audio Processing, vol. 8, No. 1, Jan. 2000, 9 pages.
Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.
Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.
Black, A. W., et al., "Automatically Clustering Similar Units for Unit Selection in Speech Synthesis," In Proceedings of Eurospeech 1997, vol. 2, 4 pages.
Blair, D. C., et al., "An Evaluation of Retrieval Effectiveness for a Full-Text Document-Retrieval System," Communications of the ACM, vol. 28, No. 3, Mar. 1985, 11 pages.
Briner, L. L., "Identifying Keywords in Text Data Processing," In Zelkowitz, Marvin V., ED, Directions and Challenges, 15th Annual Technical Symposium, Jun. 17, 1976, Gaithersbury, Maryland, 7 pages.
Bulyko, I., et al., "Joint Prosody Prediction and Unit Selection for Concatenative Speech Synthesis," Electrical Engineering Department, University of Washington, Seattle, 2001, 4 pages.
Bussey, H. E., et al., "Service Architecture, Prototype Description, and Network Implications of A Personalized Information Grazing Service," INFOCOM'90, Ninth Annual Joint Conference of the IEEE Computer and Communication Societies, Jun. 3-7, 1990, http://slrohall.com/publications/, 8 pages.
Buzo, A., et al., "Speech Coding Based Upon Vector Quantization," IEEE Transactions on Acoustics, Speech, and Signal Processing, vol. Assp-28, No. 5, Oct. 1980, 13 pages.
Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.
Cawley, G. C., "The Application of Neural Networks to Phonetic Modelling," PhD Thesis, University of Essex, Mar. 1996, 13 pages.
Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.
Conklin, J., "Hypertext: An Introduction and Survey," COMPUTER Magazine, Sep. 1987, 25 pages.
Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.
Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals," © 1987 Prentice Hall, ISBN: 0-02-328301-7, 14 pages.

(56) References Cited

OTHER PUBLICATIONS

Digital Equipment Corporation, "Open VMS Software Overview," Dec. 1995, software manual, 159 pages.

Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.

Frisse, M. E., "Searching for Information in a Hypertext Medical Handbook," Communications of the ACM, vol. 31, No. 7, Jul. 1988, 8 pages.

Goldberg, D., et al., "Using Collaborative Filtering to Weave an Information Tapestry," Communications of the ACM, vol. 35, No. 12, Dec. 1992, 10 pages.

Gorin, A. L., et al., "On Adaptive Acquisition of Language," International Conference on Acoustics, Speech, and Signal Processing (ICASSP'90), vol. 1, Apr. 3-6, 1990, 5 pages.

Gotoh, Y., et al., "Document Space Models Using Latent Semantic Analysis," In Proceedings of Eurospeech, 1997, 4 pages.

Gray, R. M., "Vector Quantization," IEEE ASSP Magazine, Apr. 1984, 26 pages.

Harris, F. J., "On the Use of Windows for Harmonic Analysis with the Discrete Fourier Transform," In Proceedings of the IEEE, vol. 66, No. 1, Jan. 1978, 34 pages.

Helm, R., et al., "Building Visual Language Parsers," In Proceedings of CHI'91 Proceedings of the SIGCHI Conference on Human Factors in Computing Systems, 8 pages.

Hermansky, H., "Perceptual Linear Predictive (PLP) Analysis of Speech," Journal of the Acoustical Society of America, vol. 87, No. 4, Apr. 1990, 15 pages.

Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.

Hoehfeld M., et al., "Learning with Limited Numerical Precision Using the Cascade-Correlation Algorithm," IEEE Transactions on Neural Networks, vol. 3, No. 4, Jul. 1992, 18 pages.

Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.

Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.

IBM Technical Disclosure Bulletin, "Speech Editor," vol. 29, No. 10, Mar. 10, 1987, 3 pages.

IBM Technical Disclosure Bulletin, "Integrated Audio-Graphics User Interface," vol. 33, No. 11, Apr. 1991, 4 pages.

IBM Technical Disclosure Bulletin, "Speech Recognition with Hidden Markov Models of Speech Waveforms," vol. 34, No. 1, Jun. 1991, 10 pages.

Iowegian International, "FIR Filter Properties," dspGuro, Digital Signal Processing Central, http://www.dspguru.com/dsp/taqs/fir/properties, downloaded on Jul. 28, 2010, 6 pages.

Jacobs, P. S., et al., "Scisor: Extracting Information from On-Line News," Communications of the ACM, vol. 33, No. 11, Nov. 1990, 10 pages.

Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.

Jennings, A., et al., "A Personal News Service Based on a User Model Neural Network," IEICE Transactions on Information and Systems, vol. E75-D, No. 2, Mar. 1992, Tokyo, JP, 12 pages.

Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.

Jones, J., "Speech Recognition for Cyclone," Apple Computer, Inc., E.R.S., Revision 2.9, Sep. 10, 1992, 93 pages.

Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.

Kitano, H., "PhiDM-Dialog, An Experimental Speech-to-Speech Dialog Translation System," Jun. 1991 COMPUTER, vol. 24, No. 6, 13 pages.

Klabbers, E., et al., "Reducing Audible Spectral Discontinuities," IEEE Transactions on Speech and Audio Processing, vol. 9, No. 1, Jan. 2001, 13 pages.

Klatt, D. H., "Linguistic Uses of Segmental Duration in English: Acoustic and Perpetual Evidence," Journal of the Acoustical Society of America, vol. 59, No. 5, May 1976, 16 pages.

Kominek, J., et al., "Impact of Durational Outlier Removal from Unit Selection Catalogs," 5th ISCA Speech Synthesis Workshop, Jun. 14-16, 2004, 6 pages.

Kubala, F., et al., "Speaker Adaptation from a Speaker-Independent Training Corpus," International Conference on Acoustics, Speech, and Signal Processing (ICASSP'90), Apr. 3-6, 1990, 4 pages.

Kubala, F., et al., "The Hub and Spoke Paradigm for CSR Evaluation," Proceedings of the Spoken Language Technology Workshop, Mar. 6-8, 1994, 9 pages.

Lee, K.F., "Large-Vocabulary Speaker-Independent Continuous Speech Recognition: The Sphinx System," Apr. 18, 1988, Partial fulfillment of the requirements for the degree of Doctor of Philosophy, Computer Science Department, Carnegie Mellon University, 195 pages.

Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.

Lee, L, et al., "Golden Mandarin(II)—An Improved Single-Chip Real-Time Mandarin Dictation Machine for Chinese Language with Very Large Vocabulary," 0-7803-0946-4/93 © 1993IEEE, 4 pages.

Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.

Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.

Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.

Linde, Y., et al., "An Algorithm for Vector Quantizer Design," IEEE Transactions on Communications, vol. 28, No. 1, Jan. 1980, 12 pages.

Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.

Logan, B., "Mel Frequency Cepstral Coefficients for Music Modeling," In International Symposium on Music Information Retrieval, 2000, 2 pages.

Lowerre, B. T., "The-HARPY Speech Recognition System," Doctoral Dissertation, Department of Computer Science, Carnegie Mellon University, Apr. 1976, 20 pages.

Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.

Markel, J. D., et al., "Linear Prediction of Speech," Springer-Verlag, Berlin Heidelberg New York 1976, 12 pages.

Morgan, B., "Business Objects," (Business Objects for Windows) Business Objects Inc., DBMS Sep. 1992, vol. 5, No. 10, 3 pages.

Mountford, S. J., et al., "Talking and Listening to Computers," The Art of Human-Computer Interface Design, Copyright © 1990 Apple Computer, Inc. Addison-Wesley Publishing Company, Inc., 17 pages.

Murty, K. S. R., et al., "Combining Evidence from Residual Phase and MFCC Features for Speaker Recognition," IEEE Signal Processing Letters, vol. 13, No. 1, Jan. 2006, 4 pages.

(56) References Cited

OTHER PUBLICATIONS

Murveit H. et al., "Integrating Natural Language Constraints into HMM-based Speech Recognition," 1990 International Conference on Acoustics, Speech, and Signal Processing, Apr. 3-6, 1990, 5 pages.
Nakagawa, S., et al., "Speaker Recognition by Combining MFCC and Phase Information," IEEE International Conference on Acoustics Speech and Signal Processing (ICASSP), Mar. 14-19, 2010, 4 pages.
Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.
Papadimitriou, C. H., et al., "Latent Semantic Indexing: A Probabilistic Analysis," Nov. 14, 1997, http://citeseerx.ist.psu.edu/messages/downloadsexceeded.html, 21 pages.
Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.
Parsons, T. W., "Voice and Speech Processing," Pitch and Formant Estimation, © 1987 McGraw-Hill, Inc., ISBN: 0-07-0485541-0, 15 pages.
Picone, J., "Continuous Speech Recognition Using Hidden Markov Models," IEEE ASSP Magazine, vol. 7, No. 3, Jul. 1990, 16 pages.
Rabiner, L. R., et al., "Fundamental of Speech Recognition," © 1993 AT&T, Published by Prentice-Hall, Inc., ISBN: 0-13-285826-6, 17 pages.
Rabiner, L. R., et al., "Note on the Properties of a Vector Quantizer for LPC Coefficients," The Bell System Technical Journal, vol. 62, No. 8, Oct. 1983, 9 pages.
Ratcliffe, M., "ClearAccess 2.0 allows SQL searches off-line," (Structured Query Language), ClearAcess Corp., MacWeek Nov. 16, 1992, vol. 6, No. 41, 2 pages.
Remde, J. R., et al., "SuperBook: An Automatic Tool for Information Exploration-Hypertext?," In Proceedings of Hypertext'87 papers, Nov. 13-15, 1987, 14 pages.
Reynolds, C. F., "On-Line Reviews: A New Application of the HICOM Conferencing System," IEE Colloquium on Human Factors in Electronic Mail and Conferencing Systems, Feb. 3, 1989, 4 pages.
Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.
Riley, M. D., "Tree-Based Modelling of Segmental Durations," Talking Machines Theories, Models, and Designs, 1992 © Elsevier Science Publishers B.V., North-Holland, ISBN: 08-44489115.3, 15 pages.
Rivoira, S., et al., "Syntax and Semantics in a Word-Sequence Recognition System," IEEE International Conference on Acoustics, Speech, and Signal Processing (ICASSP'79), Apr. 1979, 5 pages.
Rosenfeld, R., "A Maximum Entropy Approach to Adaptive Statistical Language Modelling," Computer Speech and Language, vol. 10, No. 3, Jul. 1996, 25 pages.
Roszkiewicz, A., "Extending your Apple," Back Talk—Lip Service, A+ Magazine, The Independent Guide for Apple Computing, vol. 2, No. 2, Feb. 1984, 5 pages.
Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.
Salton, G., et al., "On the Application of Syntactic Methodologies in Automatic Text Analysis," Information Processing and Management, vol. 26, No. 1, Great Britain 1990, 22 pages.
Savoy, J., "Searching Information in Hypertext Systems Using Multiple Sources of Evidence," International Journal of Man-Machine Studies, vol. 38, No. 6, Jun. 1993, 15 pages.
Scagliola, C., "Language Models and Search Algorithms for Real-Time Speech Recognition," International Journal of Man-Machine Studies, vol. 22, No. 5, 1985, 25 pages.
Schmandt, C., et al., "Augmenting a Window System with Speech Input," IEEE Computer Society, Computer Aug. 1990, vol. 23, No. 8, 8 pages.

Schütze, H., "Dimensions of Meaning," Proceedings of Supercomputing'92 Conference, Nov. 16-20, 1992, 10 pages.
Sheth B., et al., "Evolving Agents for Personalized Information Filtering," In Proceedings of the Ninth Conference on Artificial Intelligence for Applications, Mar. 1-5, 1993, 9 pages.
Shikano, K., et al., "Speaker Adaptation Through Vector Quantization," IEEE International Conference on Acoustics, Speech, and Signal Processing (ICASSP'86), vol. 11, Apr. 1986, 4 pages.
Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.
Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.
Tenenbaum, A.M., et al., "Data Structure Using Pascal," 1981 Prentice-Hall, Inc., 34 pages.
Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.
Udell, J., "Computer Telephony," BYTE, vol. 19, No. 7, Jul. 1, 1994, 9 pages.
van Santen, J. P. H., "Contextual Effects on Vowel Duration," Journal Speech Communication, vol. 11, No. 6, Dec. 1992, 34 pages.
Vepa, J., et al., "New Objective Distance Measures for Spectral Discontinuities in Concatenative Speech Synthesis," In Proceedings of the IEEE 2002 Workshop on Speech Synthesis, 4 pages.
Verschelde, J., "MATLAB Lecture 8. Special Matrices in MATLAB," Nov. 23, 2005, UIC Dept. of Math., Stat.. & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.
Wikipedia, "Mel Scale," Wikipedia, the free encyclopedia, http://en.wikipedia.org/wiki/Mel_scale, 2 pages.
Wikipedia, "Minimum Phase," Wikipedia, the free encyclopedia, http://en.wikipedia.org/wiki/Minimum_phase, 8 pages.
Wolff, M., "Poststructuralism and the ARTFUL Database: Some Theoretical Considerations," Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture-2 course presentation, University of Maryland, College Park, 8 pages.
Wu, M., "Speech Recognition, Synthesis, and H.C.I.," ENEE408G Capstone-Multimedia Signal Processing, Spring 2003, Lecture-3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," COMPUTER Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Zovato, E., et al., "Towards Emotional Speech Synthesis: A Rule Based Approach," 2 pages.
International Search Report dated Nov. 9, 1994, received in International Application No. PCT/US1993/12666, which corresponds to U.S. Appl. No. 07/999,302, 8 pages. (Robert Don Strong).
International Preliminary Examination Report dated Mar. 1, 1995, received in International Application No. PCT/US1993/12666, which corresponds to U.S. Appl. No. 07/999,302, 5 pages. (Robert Don Strong).

(56) References Cited

OTHER PUBLICATIONS

International Preliminary Examination Report dated Apr. 10, 1995, received in International Application No. PCT/US1993/12637, which corresponds to U.S. Appl. No. 07/999,354, 7 pages. (Alejandro Acero).
International Search Report dated Feb. 8, 1995, received in International Application No. PCT/US1994/11011, which corresponds to U.S. Appl. No. 08/129,679, 7 pages. (Yen-Lu Chow).
International Preliminary Examination Report dated Feb. 28, 1996, received in International Application No. PCT/US1994/11011, which corresponds to U.S. Appl. No. 08/129,679, 4 pages. (Yen-Lu Chow).
Written Opinion dated Aug. 21, 1995, received in International Application No. PCT/US1994/11011, which corresponds to U.S. Appl. No. 08/129,679, 4 pages. (Yen-Lu Chow).
International Search Report dated Nov. 8, 1995, received in International Application No. PCT/US1995/08369, which corresponds to U.S. Appl. No. 08/271,639, 6 pages. (Peter V. De Souza).
International Preliminary Examination Report dated Oct. 9, 1996, received in International Application No. PCT/US1995/08369, which corresponds to U.S. Appl. No. 08/271,639, 4 pages. (Peter V. De Souza).
Alfred App, 2011, http://www.alfredapp.com/, 5 pages.
Ambite, JL., et al., "Design and Implementation of the CALO Query Manager," Copyright © 2006, American Association for Artificial Intelligence, (www.aaai.org), 8 pages.
Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.
Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.
Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.
Bussler, C., et al., "Web Service Execution Environment (WSMX)," Jun. 3, 2005, W3C Member Submission, http://www.w3.org/Submission/WSMX, 29 pages.
Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.
Chen, Y., "Multimedia Siri Finds And Plays Whatever You Ask For," Feb. 9, 2012, http://www.psfk.com/2012/02/multimedia-siri.html, 9 pages.
Cheyer, A., "About Adam Cheyer," Sep. 17, 2012, http://www.adam.cheyer.com/about.html, 2 pages.
Cheyer, A., "A Perspective on AI & Agent Technologies for SCM," VerticalNet, 2001 presentation, 22 pages.
Cheyer, A. et al., "Spoken Language and Multimodal Applications for Electronic Realties," © Springer-Verlag London Ltd, Virtual Reality 1999, 3:1-15, 15 pages.
Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.
Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.
Elio, R. et al., "On Abstract Task Models and Conversation Policies," http://webdocs.cs.ualberta.ca/~ree/publications/papers2/ATS.AA99.pdf, May 1999, 10 pages.
Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.
Eslambolchilar et al., "Multimodal Feedback for Tilt Controlled Speed Dependent Automatic Zooming," UIST'04, Oct. 24-27, 2004, Universityof Glasgow, 3 pages.
Evi, "Meet Evi: the one mobile app that provides solutions for your everyday problems," Feb. 8, 2012, http://www.evi.com/, 3 pages.
Feigenbaum, E., et al., "Computer-assisted Semantic Annotation of Scientific Life Works," 2007, http://tomgruber.org/writing/stanford-cs300.pdf, 22 pages.
Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.
Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.
Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.
Glass, A., "Explaining Preference Learning," 2006, http://cs229.stanford.edu/proj2006/Glass-ExplainingPreferenceLearning.pdf, 5 pages.
Glass, J., et al., "Multilingual Spoken-Language Understanding in the MIT Voyager System," Aug. 1995, http://groups.csail.mit.edu/sls/publications/1995/speechcomm95-voyager.pdf, 29 pages.
Goddeau, D., et al., "A Form-Based Dialogue Manager for Spoken Language Applications," Oct. 1996, http://phasedance.com/pdf/icslp96.pdf, 4 pages.
Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.
Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.
Gruber, T. R., "A Translation Approach to Portable Ontology Specifications," Knowledge Systems Laboratory, Stanford University, Sep. 1992, Technical Report KSL 92-71, Revised Apr. 1993, 27 pages.
Gruber, T. R., "Automated Knowledge Acquisition for Strategic Knowledge," Knowledge Systems Laboratory, Machine Learning, 4, 293-336 (1989), 44 pages.
Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.
Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.
Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.
Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.
Gruber, T. R., "Where the Social Web meets the Semantic Web," Presentation at the 5th International Semantic Web Conference, Nov. 7, 2006, 38 pages.
Gruber, T. R., "Despite our Best Efforts, Ontologies are not the Problem," AAAI Spring Symposium, Mar. 2008, http://tomgruber.org/writing/aaai-ss08.htm, 40 pages.
Gruber, T. R., "Enterprise Collaboration Management with Intraspect," Intraspect Software, Inc., Instraspect Technical White Paper Jul. 2001, 24 pages.

(56) References Cited

OTHER PUBLICATIONS

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.
Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.
Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.
Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.
Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.
Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.
Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.
Gruber, T. R., "2021: Mass Collaboration and the Really New Economy," TNTY Futures, the newsletter of The Next Twenty Years series, vol. 1, Issue 6, Aug. 2001, http://www.tnty.com/newsletter/futures/archive/v01-05business.html, 5 pages.
Gruber, T. R., et al.,"NIKE: A National Infrastructure for Knowledge Exchange," Oct. 1994, http://www.eit.com/papers/nike/nike.html and nike.ps, 10 pages.
Gruber, T. R., "Ontologies, Web 2.0 and Beyond," Apr. 24, 2007, Ontology Summit 2007, http://tomgruber.org/writing/ontolog-social-web-keynote.pdf, 17 pages.
Gruber, T. R., "Ontology of Folksonomy: A Mash-up of Apples and Oranges," Originally published to the web in 2005, Int'l Journal on Semantic Web & Information Systems, 3(2), 2007, 7 pages.
Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.
Gruber, T. R., "TagOntology," Presentation to Tag Camp, www.tagcamp.org, Oct. 29, 2005, 20 pages.
Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.
Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.
Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.
Guzzoni, D., et al., "Active, A Tool for Building Intelligent User Interfaces," ASC 2007, Palma de Mallorca, http://lsro.epfl.ch/page-34241.html, 6 pages.
Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.
Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.
Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.
Intraspect Software, "The Intraspect Knowledge Management Solution: Technical Overview," http://tomgruber.org/writing/intraspect-whitepaper-1998.pdf, 18 pages.
Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.
Karp, P. D., "A Generic Knowledge-Base Access Protocol," May 12, 1994, http://lecture.cs.buu.ac.th/~f50353/Document/gfp.pdf, 66 pages.
Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.
Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
Martin, D., et al., "The Open Agent Architecture: A Framework for building distributed software systems," Jan.-Mar. 1999, Applied-Artificial Intelligence: An International Journal, vol. 13, No. 1-2, http://adam.cheyer.com/papers/oaa.pdf, 38 pages.
McGuire, J., et al., "SHADE: Technology for Knowledge-Based Collaborative Engineering," 1993, Journal of Concurrent Engineering: Applications and Research (CERA), 18 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IUI97), 8 pages.
Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, AI Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
*Phoenix Solutions, Inc.* v. *West Interactive Corp.*, Document 40, Declaration of Christopher Schmandt Regarding the MIT Galaxy System dated Jul. 2, 2010, 162 pages.

(56) References Cited

OTHER PUBLICATIONS

Rice, J., et al., "Monthly Program: Nov. 14, 1995," The San Francisco Bay Area Chapter of ACM SIGCHI, http://www.baychi.org/calendar/19951114/, 2 pages.

Rice, J., et al., "Using the Web Instead of a Window System," Knowledge Systems Laboratory, Stanford University, (http://tomgruber.org/writing/ks1-95-69.pdf, Sep. 1995.) CHI '96 Proceedings: Conference on Human Factors in Computing Systems, Apr. 13-18, 1996, Vancouver, BC, Canada, 14 pages.

Rivlin, Z., et al., "Maestro: Conductor of Multimedia Analysis Technologies," 1999 SRI International, Communications of the Association for Computing Machinery (CACM), 7 pages.

Roddy, D., et al., "Communication and Collaboration in a Landscape of B2B eMarketplaces," VerticalNet Solutions, white paper, Jun. 15, 2000, 23 pages.

Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16 . . . rep . . . , 4 pages.

Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.

Simonite, T., "One Easy Way to Make Siri Smarter," Oct. 18, 2011, Technology Review, http:// www.technologyreview.com/printer_friendly_article.aspx?id=38915, 2 pages.

Stent, A., et al., "The CommandTalk Spoken Dialogue System," 1999, http://acl.ldc.upenn.edu/P/P99/P99-1024.pdf, 8 pages.

Tofel, K., et al., "SpeakToIt: A personal assistant for older iPhones, iPads," Feb. 9, 2012, http://gigaom.com/apple/speaktoit-siri-for-older-iphones-ipads/, 7 pages.

Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.

Tur, G., et al., "The CALO Meeting Speech Recognition and Understanding System," 2008, Proc. IEEE Spoken Language Technology Workshop, 4 pages.

Tur, G., et al., "The-CALO-Meeting-Assistant System," IEEE Transactions on Audio, Speech, and Language Processing, vol. 18, No. 6, Aug. 2010, 11 pages.

Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.

Vlingo, "Vlingo Launches Voice Enablement Application on Apple App Store," Vlingo press release dated Dec. 3, 2008, 2 pages.

YouTube, "Knowledge Navigator," 5:34 minute video uploaded to YouTube by Knownav on Apr. 29, 2008, http://www.youtube.com/watch?v=QRH8eimU_20, 1 page.

YouTube,"Send Text, Listen To and Send E-Mail 'By Voice' www.voiceassist.com," 2:11 minute video uploaded to YouTube by VoiceAssist on Jul. 30, 2009, http://www.youtube.com/watch?v=0tEU61nHHA4, 1 page.

YouTube,"Text'nDrive App Demo—Listen and Reply to your Messages by Voice while Driving!," 1:57 minute video uploaded to YouTube by TextnDrive on Apr. 27, 2010, http://www.youtube.com/watch?v=WaGfzoHsAMw, 1 page.

YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.

Zue, V., "Conversational Interfaces: Advances and Challenges," Sep. 1997, http://www.cs.cmu.edu/~dod/papers/zue97.pdf, 10 pages.

Zue, V. W., "Toward Systems that Understand Spoken Language," Feb. 1994, ARPA Strategic Computing Institute, © 1994 IEEE, 9 pages.

Notice of Allowance dated Sep. 5, 2012, received in U.S. Appl. No. 12/686,876, 15 pages. (Rottler).

Korean Office Action dated Jan. 3, 2013 for Application No. 10-2012-7021094, 16 pages.

Office Action dated May 3, 2012, received in U.S. Appl. No. 12/686,876, 43 pages. (Rottler).

International Search Report and Written Opinion dated Jun. 30, 2011, received in International Application No. PCT/US2011/020350, which corresponds to U.S. Appl. No. 12/686,876, 18 pages. (Benjamin Rottler).

Partial International Search Report and Invitation to Pay Additional Fees, received in International Application No. PCT/US2011/020350, which corresponds to U.S. Appl. No. 12/686,876, 7 pages. (Benjamin Rottler).

International Search Report and Written Opinion dated Nov. 29, 2011, received in International Application No. PCT/US2011/20861, which corresponds to U.S. Appl. No. 12/987,982, 15 pages. (Thomas Robert Gruber).

Agnäs, MS., et al., "Spoken Language Translator: First-Year Report," Jan. 1994, SICS (ISSN 0283-3638), SRI and Telia Research AB, 161 pages.

Allen, J., "Natural Language Understanding," 2nd Edition, Copyright © 1995 by The Benjamin/Cummings Publishing Company, Inc., 671 pages.

Alshawi, H., et al., "CLARE: A Contextual Reasoning and Cooperative Response Framework for the Core Language Engine," Dec. 1992, SRI International, Cambridge Computer Science Research Centre, Cambridge, 273 pages.

Alshawi, H., et al., "Declarative Derivation of Database Queries from Meaning Representations," Oct. 1991, Proceedings of the BANKAI Workshop on Intelligent Information Access, 12 pages.

Alshawi H., et al., "Logical Forms in The Core Language Engine," 1989, Proceedings of the 27th Annual Meeting of the Association for Computational Linguistics, 8 pages.

Alshawi, H., et al., "Overview of the Core Language Engine," Sep. 1988, Proceedings of Future Generation Computing Systems, Tokyo, 13 pages.

Alshawi, H., "Translation and Monotonic Interpretation/Generation," Jul. 1992, SRI International, Cambridge Computer Science Research Centre, Cambridge, 18 pages, http://www.cam.sri.com/tr/crc024/paper.ps. Z_1992.

Appelt, D., et al., "Fastus: A Finite-state Processor for Information Extraction from Real-world Text," 1993, Proceedings of IJCAI, 8 pages.

Appelt, D., et al., "SRI: Description of the JV-FASTUS System Used for MUC-5," 1993, SRI International, Artificial Intelligence Center, 19 pages.

Appelt, D., et al., SRI International Fastus System MUC-6 Test Results and Analysis, 1995, SRI International, Menlo Park, California, 12 pages.

Archbold, A., et al., "A Team User's Guide," Dec. 21, 1981, SRI International, 70 pages.

Bear, J., et al., "A System for Labeling Self-Repairs in Speech," Feb. 22, 1993, SRI International, 9 pages.

Bear, J., et al., "Detection and Correction of Repairs in Human-Computer Dialog," May 5, 1992, SRI International, 11 pages.

Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.

Bear, J., et al., "Using Information Extraction to Improve Document Retrieval," 1998, SRI International, Menlo Park, California, 11 pages.

Berry, P., et al., "Task Management under Change and Uncertainty Constraint Solving Experience with the CALO Project," 2005, Proceedings of CP'05 Workshop on Constraint Solving under Change, 5 pages.

Bobrow, R. et al., "Knowledge Representation for Syntactic/Semantic Processing," From: AAA-80 Proceedings. Copyright © 1980, AAAI, 8 pages.

Bouchou, B., et al., "Using Transducers in Natural Language Database Query," Jun. 17-19, 1999, Proceedings of 4th International Conference on Applications of Natural Language to Information Systems, Austria, 17 pages.

Bratt, H., et al., "The SRI Telephone-based ATIS System," 1995, Proceedings of ARPA Workshop on Spoken Language Technology, 3 pages.

(56) References Cited

OTHER PUBLICATIONS

Bulyko, I. et al., "Error-Correction Detection and Response Generation in a Spoken Dialogue System," © 2004 Elsevier B.V., specom. 2004.09.009, 18 pages.
Burke, R., et al., "Question Answering from Frequently Asked Question Files," 1997, AI Magazine, vol. 18, No. 2, 10 pages.
Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.
Carter, D., "Lexical Acquisition in the Core Language Engine," 1989, Proceedings of the Fourth Conference of the European Chapter of the Association for Computational Linguistics, 8 pages.
Carter, D., et al., "The Speech-Language Interface in the Spoken Language Translator," Nov. 23, 1994, SRI International, 9 pages.
Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.
Cheyer, A., et al., "Multimodal Maps: An Agent-based Approach," International Conference on Cooperative Multimodal Communication, 1995, 15 pages.
Cheyer, A., et al., "The Open Agent Architecture," Autonomous Agents and Multi-Agent systems, vol. 4, Mar. 1, 2001, 6 pages.
Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.
Codd, E. F., "Databases: Improving Usability and Responsiveness—'How About Recently'," Copyright © 1978, by Academic Press, Inc., 28 pages.
Cohen, P.R., et al., "An Open Agent Architecture," 1994, 8 pages. http://citeseerx.ist.psu.edu/viewdoc/summary?doi=10.1.1.30.480.
Coles, L. S., et al., "Chemistry Question-Answering," Jun. 1969, SRI International, 15 pages.
Coles, L. S., "Techniques for Information Retrieval Using an Inferential Question-Answering System with Natural-Language Input," Nov. 1972, SRI International, 198 pages.
Coles, L. S., "The Application of Theorem Proving to Information Retrieval," Jan. 1971, SRI International, 21 pages.
Constantinides, P., et al., "A Schema Based Approach to Dialog Control," 1998, Proceedings of the International Conference on Spoken Language Processing, 4 pages.
Cox, R. V., et al., "Speech and Language Processing for Next-Millennium Communications Services," Proceedings of the IEEE, vol. 88, No. 8, Aug. 2000, 24 pages.
Craig, J., et al., "Deacon: Direct English Access and Control," Nov. 7-10, 1966 AFIPS Conference Proceedings, vol. 19, San Francisco, 18 pages.
Dar, S., et al., "DTL's DataSpot: Database Exploration Using Plain Language," 1998 Proceedings of the 24th VLDB Conference, New York, 5 pages.
Davis, Z., et al., "A Personal Handheld Multi-Modal Shopping Assistant," 2006 IEEE, 9 pages.
Decker, K., et al., "Designing Behaviors for Information Agents," The Robotics Institute, Carnegie-Mellon University, paper, Jul. 6, 1996, 15 pages.
Decker, K., et al., "Matchmaking and Brokering," The Robotics Institute, Carnegie-Mellon University, paper, May 16, 1996, 19 pages.
Dowding, J., et al., "Gemini: A Natural Language System for Spoken-Language Understanding," 1993, Proceedings of the Thirty-First Annual Meeting of the Association for Computational Linguistics, 8 pages.
Dowding, J., et al., "Interleaving Syntax and Semantics in An Efficient Bottom-Up Parser," 1994, Proceedings of the 32nd Annual Meeting of the Association for Computational Linguistics, 7 pages.
Epstein, M., et al., "Natural Language Access to a Melanoma Data Base," Sep. 1978, SRI International, 7 pages.

Exhibit 1, "Natural Language Interface Using Constrained Intermediate Dictionary of Results," Classes/Subclasses Manually Reviewed for the Search of U.S. Pat. No. 7,177,798, Mar. 22, 2013, 1 page.
Exhibit 1, "Natural Language Interface Using Constrained Intermediate Dictionary of Results," List of Publications Manually reviewed for the Search of U.S. Pat. No. 7,177,798, Mar. 22, 2013, 1 page.
Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.
Fikes, R., et al., "A Network-based knowledge Representation and its Natural Deduction System," Jul. 1977, SRI International, 43 pages.
Gamback, B., et al., "The Swedish Core Language Engine," 1992 NOTEX Conference, 17 pages.
Glass, J., et al., "Multilingual Language Generation Across Multiple Domains," Sep. 18-22, 1994, International Conference on Spoken Language Processing, Japan, 5 pages.
Green, C. "The Application of Theorem Proving to Question-Answering Systems," Jun. 1969, SRI Stanford Research Institute, Artificial Intelligence Group, 169 pages.
Gregg, D. G., "DSS Access on the WWW: An Intelligent Agent Prototype," 1998 Proceedings of the Americas Conference on Information Systems-Association for Information Systems, 3 pages.
Grishman, R., "Computational Linguistics: An Introduction," © Cambridge University Press 1986, 172 pages.
Grosz, B. et al., "Dialogic: A Core Natural-Language Processing System," Nov. 9, 1982, SRI International, 17 pages.
Grosz, B. et al., "Research on Natural-Language Processing at SRI," Nov. 1981, SRI International, 21 pages.
Grosz, B., et al., "Team: An Experiment in the Design of Transportable Natural-Language Interfaces," Artificial Intelligence, vol. 32, 1987, 71 pages.
Grosz, B., "Team: A Transportable Natural-Language Interface System," 1983, Proceedings of the First Conference on Applied Natural Language Processing, 7 pages.
Guida, G., et al., "NLI: A Robust Interface for Natural Language Person-Machine Communication," Int. J. Man-Machine Studies, vol. 17, 1982, 17 pages.
Guzzoni, D., et al., "Active, A platform for Building Intelligent Software," Computational Intelligence 2006, 5 pages. http://www.informatik.uni-trier.de/~ley/pers/hd/g/Guzzoni:Didier.
Guzzoni, D., "Active: A unified platform for building intelligent assistant applications," Oct. 25, 2007, 262 pages.
Guzzoni, D., et al., "Many Robots Make Short Work," 1996 AAAI Robot Contest, SRI International, 9 pages.
Haas, N., et al., "An Approach to Acquiring and Applying Knowledge," Nov. 1980, SRI International, 22 pages.
Hadidi, R., et al., "Students' Acceptance of Web-Based Course Offerings: An Empirical Assessment," 1998 Proceedings of the Americas Conference on Information Systems (AMCIS), 4 pages.
Hawkins, J., et al., "Hierarchical Temporal Memory: Concepts, Theory, and Terminology," Mar. 27, 2007, Numenta, Inc., 20 pages.
He, Q., et al., "Personal Security Agent: KQML-Based PKI," The Robotics Institute, Carnegie-Mellon University, paper, Oct. 1, 1997, 14 pages.
Hendrix, G. et al., "Developing a Natural Language Interface to Complex Data," ACM Transactions on Database Systems, vol. 3, No. 2, Jun. 1978, 43 pages.
Hendrix, G., "Human Engineering for Applied Natural Language Processing," Feb. 1977, SRI International, 27 pages.
Hendrix, G., "Klaus: A System for Managing Information and Computational Resources," Oct. 1980, SRI International, 34 pages.
Hendrix, G., "Lifer: A Natural Language Interface Facility," Dec. 1976, SRI Stanford Research Institute, Artificial Intelligence Center, 9 pages.
Hendrix, G., "Natural-Language Interface," Apr.-Jun. 1982, American Journal of Computational Linguistics, vol. 8, No. 2, 7 pages. Best Copy Available.
Hendrix, G., "The Lifer Manual: A Guide to Building Practical Natural Language Interfaces," Feb. 1977, SRI International, 76 pages.

(56) References Cited

OTHER PUBLICATIONS

Hendrix, G., et al., "Transportable Natural-Language Interfaces to Databases," Apr. 30, 1981, SRI International, 18 pages.
Hirschman, L., et al., "Multi-Site Data Collection and Evaluation in Spoken Language Understanding," 1993, Proceedings of the workshop on Human Language Technology, 6 pages.
Hobbs, J., et al., "Fastus: A System for Extracting Information from Natural-Language Text," Nov. 19, 1992, SRI International, Artificial Intelligence Center, 26 pages.
Hobbs, J., et al.,"Fastus: Extracting Information from Natural-Language Texts," 1992, SRI International, Artificial Intelligence Center, 22 pages.
Hobbs, J., "Sublanguage and Knowledge," Jun. 1984, SRI International, Artificial Intelligence Center, 30 pages.
Hodjat, B., et al., "Iterative Statistical Language Model Generation for Use with an Agent-Oriented Natural Language Interface," Volume 4 of the Proceedings of HCI International 2003, 7 pages.
Huang, X., et al., "The Sphinx-II Speech Recognition System: An Overview," Jan. 15, 1992, Computer, Speech and Language, 14 pages.
Issar, S., et al., "CMU's Robust Spoken Language Understanding System," 1993, Proceedings of EUROSPEECH, 4 pages.
Issar, S., "Estimation of Language Models for New Spoken Language Applications," Oct. 3-6, 1996, Proceedings of 4th International Conference on Spoken language Processing, Philadelphia, 4 pages.
Janas, J., "The Semantics-Based Natural Language Interface to Relational Databases," © Springer-Verlag Berlin Heidelberg 1986, Germany, 48 pages.
Johnson, J., "A Data Management Strategy for Transportable Natural Language Interfaces," Jun. 1989, doctoral thesis submitted to the Department of Computer Science, University of British Columbia, Canada, 285 pages.
Julia, L., et al., "HTTP://WWW.SPEECH.SRI.COM/DEMOS/ATIS.HTML," 1997, Proceedings of AAAI, Spring Symposium, 5 pages.
Kahn, M., et al., "CoABS Grid Scalability Experiments," 2003, Autonomous Agents and Multi-Agent Systems, vol. 7, 8 pages.
Kamel, M., et al., "A Graph Based Knowledge Retrieval System," © 1990 IEEE, 7 pages.
Katz, B., "Annotating the World Wide Web Using Natural Language," 1997, Proceedings of the 5th RIAO Conference on Computer Assisted Information Searching on the Internet, 7 pages.
Katz, B., "A Three-Step Procedure for Language Generation," Dec. 1980, Massachusetts Institute of Technology, Artificial Intelligence Laboratory, 42 pages.
Kats, B., et al., "Exploiting Lexical Regularities in Designing Natural Language Systems," 1988, Proceedings of the 12th International Conference on Computational Linguistics, Coling'88, Budapest, Hungary, 22 pages.
Katz, B., et al., "REXTOR: A System for Generating Relations from Natural Language," In Proceedings of the ACL Oct. 2000 Workshop on Natural Language Processing and Information Retrieval (NLP &IR), 11 pages.
Katz, B., "Using English for Indexing and Retrieving," 1988 Proceedings of the 1st RIAO Conference on User-Oriented Content-Based Text and Image (RIAO'88), 19 pages.
Konolige, K., "A Framework for a Portable Natural-Language Interface to Large Data Bases," Oct. 12, 1979, SRI International, Artificial Intelligence Center, 54 pages.
Laird, J., et al., "SOAR: An Architecture for General Intelligence," 1987, Artificial Intelligence vol. 33, 64 pages.
Langly, P., et al.,"A Design for the Icarus Architechture," SIGART Bulletin, vol. 2, No. 4, 6 pages.
Larks, "Intelligent Software Agents: Larks," 2006, downloaded on Mar. 15, 2013 from http://www.cs.cmu.edu/larks.html, 2 pages.
Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.
Martin, D., et al., "Development Tools for the Open Agent Architecture," Apr. 1996, Proceedings of the International Conference on the Practical Application of Intelligent Agents and Multi-Agent Technology, 17 pages.
Martin, D., et al., "Information Brokering in an Agent Architecture," Apr. 1997, Proceedings of the second International Conference on the Practical Application of Intelligent Agents and Multi-Agent Technology, 20 pages.
Martin, D., et al., "PAAM '98 Tutorial: Building and Using Practical Agent Applications," 1998, SRI International, 78 pages.
Martin, P., et al., "Transportability and Generality in a Natural-Language Interface System," Aug. 8-12, 1983, Proceedings of the Eight International Joint Conference on Artificial Intelligence, West Germany, 21 pages.
Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.
Michos, S.E., et al., "Towards an adaptive natural language interface to command languages," Natural Language Engineering 2 (3), © 1994 Cambridge University Press, 19 pages. Best Copy Available.
Milstead, J., et al., "Metadata: Cataloging by Any Other Name . . . ." Jan. 1999, Online, Copyright © 1999 Information Today, Inc., 18 pages.
Minker, W., et al., "Hidden Understanding Models for Machine Translation," 1999, Proceedings of ETRW on Interactive Dialogue in Multi-Modal Systems, 4 pages.
Modi, P. J., et al., "CMRadar: A Personal Assistant Agent for Calendar Management," © 2004, American Association for Artificial Intelligence, Intelligent Systems Demonstrations, 2 pages.
Moore, R., et al., "Combining Linguistic and Statistical Knowledge Sources in Natural-Language Processing for ATIS," 1995, SRI International, Artificial Intelligence Center, 4 pages.
Moore, R., "Handling Complex Queries in a Distributed Data Base," Oct. 8, 1979, SRI International, Artificial Intelligence Center, 38 pages.
Moore, R., "Practical Natural-Language Processing by Computer," Oct. 1981, SRI International, Artificial Intelligence Center, 34 pages.
Moore, R., et al., "SRI's Experience with the ATIS Evaluation," Jun. 24-27, 1990, Proceedings of a workshop held at Hidden Valley, Pennsylvania, 4 pages. Best Copy Available.
Moore, et al., "The Information Warefare Advisor: An Architecture for Interacting with Intelligent Agents Across the Web," Dec. 31, 1998 Proceedings of Americas Conference on Information Systems (AMCIS), 4 pages.
Moore, R., "The Role of Logic in Knowledge Representation and Commonsense Reasoning," Jun. 1982, SRI International, Artificial Intelligence Center, 19 pages.
Moore, R., "Using Natural-Language Knowledge Sources in Speech Recognition," Jan. 1999, SRI International, Artificial Intelligence Center, 24 pages.
Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.
Moran, D., "Quantifier Scoping in the SRI Core Language Engine," 1988, Proceedings of the 26th annual meeting on Association for Computational Linguistics, 8 pages.
Motro, a., "Flex: A Tolerant and Cooperative User Interface to Databases," IEEE Transactions on Knowledge and Data Engineering, vol. 2, No. 2, Jun. 1990, 16 pages.
Murveit, H., et al., "Speech Recognition in SRI's Resource Management and ATIS Systems," 1991, Proceedings of the workshop on Speech and Natural Language (HTL'91), 7 pages.
OAA, "The Open Agent Architecture 1.0 Distribution Source Code," Copyright 1999, SRI International, 2 pages.
Odubiyi, J., et al., "SAIRE—A scalable agent-based information retrieval engine," 1997 Proceedings of the First International Conference on Autonomous Agents, 12 pages.
Owei, V., et al., "Natural Language Query Filtration in the Conceptual Query Language," © 1997 IEEE, 11 pages.

(56) References Cited

OTHER PUBLICATIONS

Pannu, A., et al., "A Learning Personal Agent for Text Filtering and Notification," 1996, The Robotics Institute School of Computer Science, Carnegie-Mellon University, 12 pages.
Pereira, "Logic for Natural Language Analysis," Jan. 1983, SRI International, Artificial Intelligence Center, 194 pages.
Perrault, C.R., et al., "Natural-Language Interfaces," Aug. 22, 1986, SRI International, 48 pages.
Pulman, S.G., et al., "Clare: A Combined Language and Reasoning Engine," 1993, Proceedings of JFIT Conference, 8 pages. URL: http://www.cam.sri.com/tr/crc042/paper.ps.Z.
Ravishankar, "Efficient Algorithms for Speech Recognition," May 15, 1996, Doctoral Thesis submitted to School of Computer Science, Computer Science Division, Carnegie Mellon University, Pittsburg, 146 pages.
Rayner, M., "Abductive Equivalential Translation and its application to Natural Language Database Interfacing," Sep. 1993 Dissertation paper, SRI International, 163 pages.
Rayner, M., et al., "Adapting the Core Language Engine to French and Spanish," May 10, 1996, Cornell University Library, 9 pages. http://arxiv.org/abs/cmp-lg/9605015.
Rayner, M., et al., "Deriving Database Queries from Logical Forms by Abductive Definition Expansion," 1992, Proceedings of the Third Conference on Applied Natural Language Processing, ANLC'92, 8 pages.
Rayner, M., "Linguistic Domain Theories: Natural-Language Database Interfacing from First Principles," 1993, SRI International, Cambridge, 11 pages.
Rayner, M., et al., "Spoken Language Translation With Mid-90's Technology: A Case Study," 1993, EUROSPEECH, ISCA, 4 pages. http://dblp.uni-trier.de/db/conf/interspeech/eurospeech1993.html#RaynerBCCDGKKLPPS93.
Rudnicky, A.I., et al., "Creating Natural Dialogs in the Carnegie Mellon Communicator System,".
Russell, S., et al., "Artificial Intelligence, A Modern Approach," © 1995 Prentice Hall, Inc., 121 pages.
Sacerdoti, E., et al., "A Ladder User's Guide (Revised)," Mar. 1980, SRI International, Artificial Intelligence Center, 39 pages.
Sagalowicz, D., "A D-Ladder User's Guide," Sep. 1980, SRI International, 42 pages.
Sameshima, Y., et al., "Authorization with security attributes and privilege delegation Access control beyond the ACL," Computer Communications, vol. 20, 1997, 9 pages.
San-Segundo, R., et al., "Confidence Measures for Dialogue Management in the CU Communicator System," Jun. 5-9, 2000, Proceedings of Acoustics, Speech, and Signal Processing (ICASSP'00), 4 pages.
Sato, H., "A Data Model, Knowledge Base, and Natural Language Processing for Sharing a Large Statistical Database," 1989, Statistical and Scientific Database Management, Lecture Notes in Computer Science, vol. 339, 20 pages.
Schnelle, D., "Context Aware Voice User Interfaces for Workflow Support," Aug. 27, 2007, Dissertation paper, 254 pages.
Sharoff, S., et al., "Register-domain Separation as a Methodology for Development of Natural Language Interfaces to Databases," 1999, Proceedings of Human-Computer Interaction (INTERACT'99), 7 pages.
Shimazu, H., et al., "CAPIT: Natural Language Interface Design Tool with Keyword Analyzer and Case-Based Parser," NEC Research & Development, vol. 33, No. 4, Oct. 1992, 11 pages.
Shinkle, L., "Team User's Guide," Nov. 1984, SRI International, Artificial Intelligence Center, 78 pages.
Shklar, L., et al., "Info Harness: Use of Automatically Generated Metadata for Search and Retrieval of Heterogeneous Information," 1995 Proceedings of CAiSE'95, Finland.
Singh, N., "Unifying Heterogeneous Information Models," 1998 Communications of the ACM, 13 pages.
SRI2009, "SRI Speech: Products: Software Development Kits: EduSpeak," 2009, 2 pages, available at http://web.archive.org/web/20090828084033/http://wmv.speechatsri.com/products/eduspeak.shtml.
Starr, B., et al., "Knowledge-Intensive Query Processing," May 31, 1998, Proceedings of the 5th KRDB Workshop, Seattle, 6 pages.
Stern, R., et al. "Multiple Approaches to Robust Speech Recognition," 1992, Proceedings of Speech and Natural Language Workshop, 6 pages.
Stickel, "A Nonclausal Connection-Graph Resolution Theorem-Proving Program," 1982, Proceedings of AAAI'82, 5 pages.
Sugumaran, V., "A Distributed Intelligent Agent-Based Spatial Decision Support System," Dec. 31, 1998, Proceedings of the Americas Conference on Information systems (AMCIS), 4 pages.
Sycara, K., et al., "Coordination of Multiple Intelligent Software Agents," International Journal of Cooperative Information Systems (IJCIS), vol. 5, Nos. 2 & 3, Jun. & Sep. 1996, 33 pages.
Sycara, K., et al., "Distributed Intelligent Agents," IEEE Expert, vol. 11, No. 6, Dec. 1996, 32 pages.
Sycara, K., et al., "Dynamic Service Matchmaking Among Agents in Open Information Environments ," 1999, Sigmod Record, 7 pages.
Sycara, K., et al., "The RETSINA MAS Infrastructure," 2003, Autonomous Agents and Multi-Agent Systems, vol. 7, 20 pages.
Tyson, M., et al., "Domain-Independent Task Specification in the TACITUS Natural Language System," May 1990, SRI International, Artificial Intelligence Center, 16 pages.
Wahlster, W., et al., "Smartkom: multimodal communication with a life-like character," 2001 EUROSPEECH-Scandinavia, 7th European Conference on Speech Communication and Technology, 5 pages.
Waldinger, R., et al., "Deductive Question Answering from Multiple Resources," 2003, New Directions in Question Answering, published by AAAI, Menlo Park, 22 pages.
Walker, D., et al., "Natural Language Access to Medical Text," Mar. 1981, SRI International, Artificial Intelligence Center, 23 pages.
Waltz, D., "An English Language Question Answering System for a Large Relational Database," © 1978 ACM, vol. 21, No. 7, 14 pages.
Ward, W., et al., "A Class Based Language Model for Speech Recognition," © 1996 IEEE, 3 pages.
Ward, W., et al., "Recent Improvements in the CMU Spoken Language Understanding System," 1994, ARPA Human Language Technology Workshop, 4 pages.
Ward, W., "The CMU Air Travel Information Service: Understanding Spontaneous Speech," 3 pages.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages. Best Copy Available.
Weizenbaum, J., "ELIZA—A Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.
Yang, J., et al., "Smart Sight: A Tourist Assistant System," 1999 Proceedings of Third International Symposium on Wearable Computers, 6 pages.
Zeng, D., et al., "Cooperative Intelligent Software Agents," The Robotics Institute, Carnegie-Mellon University, Mar. 1995, 13 pages.
Zhao, L., "Intelligent Agents for Flexible Workflow Systems," Oct. 31, 1998 Proceedings of the Americas Conference on Information Systems (AMCIS), 4 pages.
Zue, V., et al., "From Interface to Content: Translingual Access and Delivery of On-Line Information," 1997, EUROSPEECH, 4 pages.
Zue, V., et al., "Jupiter: A Telephone-Based Conversational Interface for Weather Information," Jan. 2000, IEEE Transactions on Speech and Audio Processing, 13 pages.

(56) References Cited

OTHER PUBLICATIONS

Zue, V., et al., "Pegasus: A Spoken Dialogue Interface for On-Line Air Travel Planning," 1994 Elsevier, Speech Communication 15 (1994), 10 pages.

Zue, V., et al., "The Voyager Speech Understanding System: Preliminary Development and Evaluation," 1990, Proceedings of IEEE 1990 International Conference on Acoustics, Speech, and Signal Processing, 4 pages.

* cited by examiner

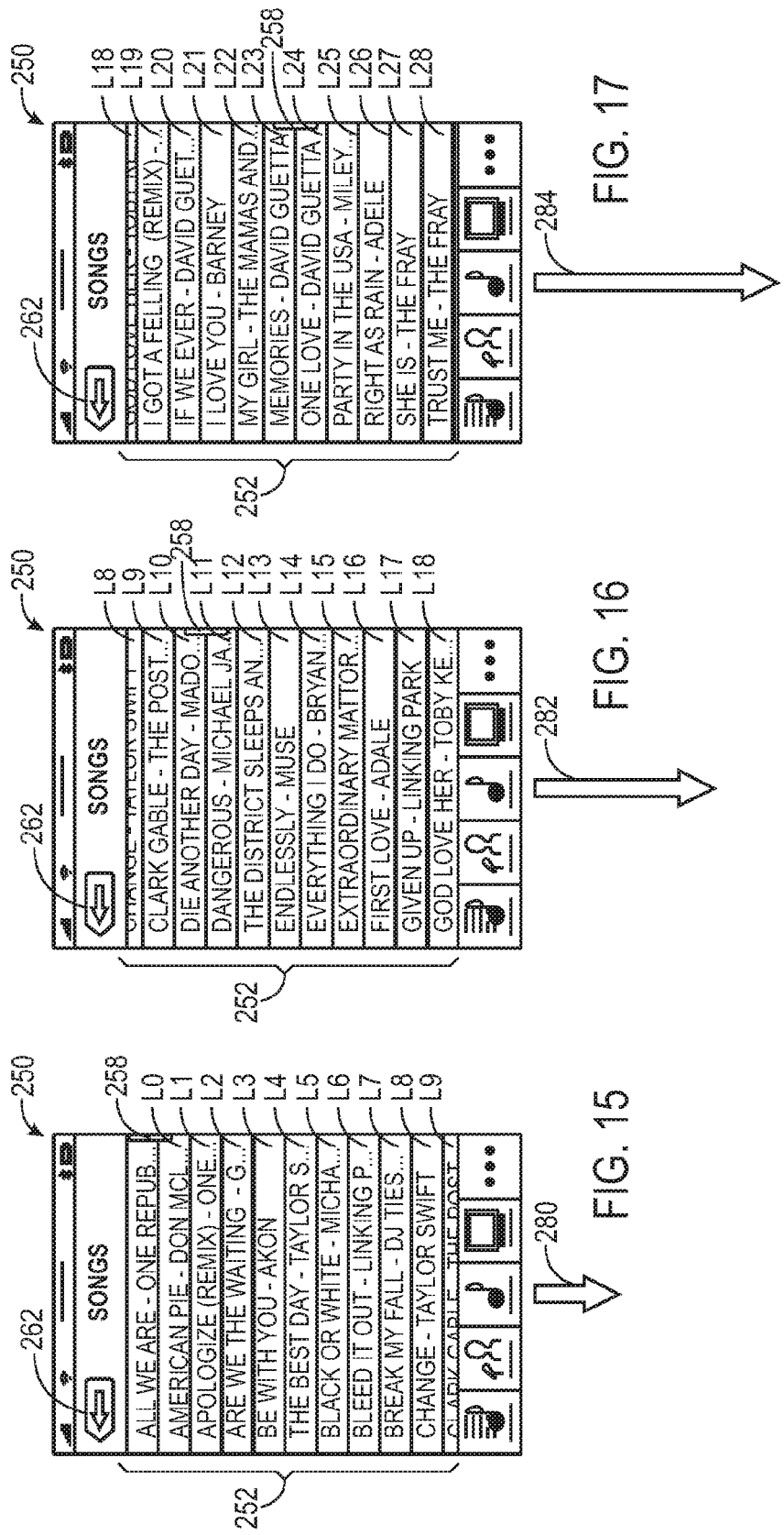

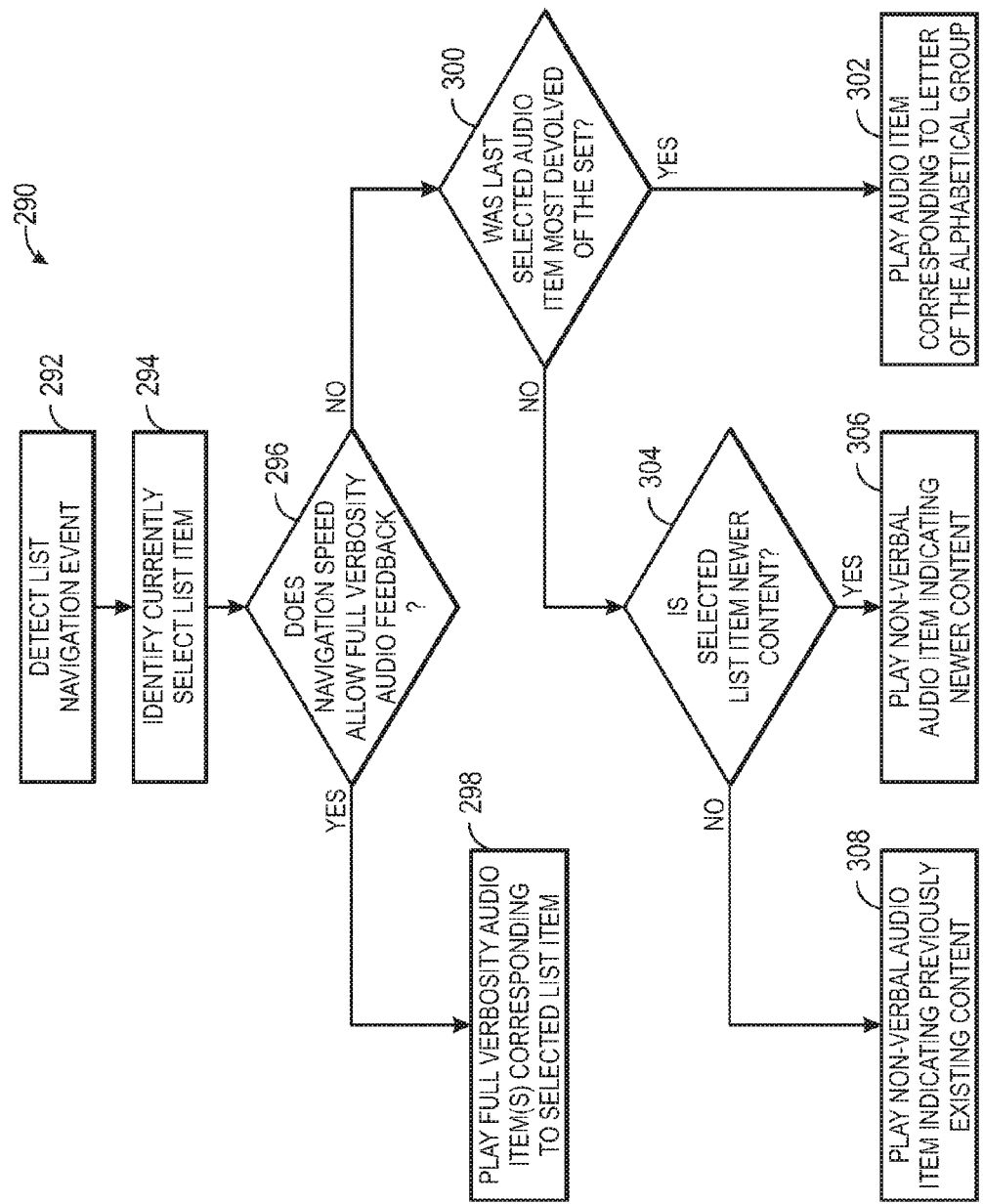

ADAPTIVE AUDIO FEEDBACK SYSTEM AND METHOD

RELATED APPLICATIONS

This application is a continuation of U.S. patent application Ser. No. 12/686,876, filed Jan. 13, 2010 and now U.S. Pat. No. 8,381,107, which is hereby incorporated by reference in its entirety.

TECHNICAL FIELD

The present disclosure relates generally to user interfaces on electronic devices and, more particularly, to user interfaces capable of providing audio feedback to a user of an electronic device.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic computing devices, such as computer systems, mobile phones, digital media players, personal digital assistants (PDAs), and the like, are commonly used for various personal and/or work-related purposes. Such electronic devices typically include some type of user interface that enables a user to interact with various applications (e.g., e-mail programs, internet browsers, media players, games, etc.) on the device to perform a variety of functions. In other words, the user interface may provide a gateway through which users may interact with applications to receive content, information, as well as responses to user inputs. The user interface, therefore, is an integral part in the design of these applications and helps determine the ease of use, and thus the quality of the overall user experience, of such devices.

Historically, many electronic devices have relied upon a graphical user interface to allow a user to interact with the device by way of a visual display. For instance, as the user interacts with the device, the device may display visual feedback in response to the user's actions. However, as some types of electronic devices have migrated towards smaller form factors having relatively small visual displays, graphical user interfaces are becoming not only more difficult to use and navigate, but also more limited in the amount of information they are able to convey.

More recently, audio user interfaces have experienced a rise in popularity. For instance, an audio user interface may supply audio feedback data, instead of or in addition to visual feedback, to convey information and content to a user and, thus, are particularly well suited for use in electronic devices having limited visual display capabilities or, in some instances, no visual display capabilities at all. For instance, upon the occurrence of an event that requests audio feedback, a corresponding audio clip may be played to convey audio information about the occurring event to the user. Unfortunately, some events may be associated with large amounts of audio information, which may overwhelm a user and, therefore, negatively impact the user experience, particularly when such events occur repeatedly in close proximity within a relatively short time period. Additionally, audio feedback provided by conventional audio user interfaces may not adequately enable a user to distinguish between events of high or low contextual importance. Accordingly, there are continuing efforts to further improve the user experience with respect to audio user interfaces in electronic devices.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to techniques for adaptively varying audio feedback provided by an audio user interface on an electronic device. In accordance with one embodiment, an audio user interface may be configured to devolve or evolve the verbosity of audio feedback in response to user interface events based at least partially upon the verbosity level of audio feedback provided during previous occurrences of the user interface event. As will be discussed further below, the term "verbosity," as used herein, refers to the "wordiness" of the audio information provided by the audio feedback, and may also encompass non-verbal types of audio feedback, such as tones, clicks, beeps, chirps, etc. For instance, if a subsequent occurrence of the user interface event occurs in relatively close proximity to a previous occurrence of the user interface event, the audio user interface may devolve the audio feedback (e.g., by reducing verbosity), such as to avoid overwhelming a user with repetitive and highly verbose information.

In another embodiment, an audio user interface may be configured to adaptively vary audio feedback associated with a navigable list of data items based at least partially upon the speed at which a user navigates the list. In a further embodiment, an audio user interface may be configured to provide audio feedback that is more audibly distinct to indicate where newer data content is located in the navigable list, and to provide audio feedback that is less audibly distinct for older data content. In yet another embodiment, an audio user interface may be configured to vary the verbosity and/or distinctiveness of the audio feedback based upon the contextual importance of a user interface event. The various audio feedback techniques disclosed herein, when implemented alone or in combination, may enhance the user experience with regard to audio user interfaces.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIGS. 15-17 are screen images, each showing the navigable list of FIG. 14 and depicting the navigation of the list by a user at varying speeds, in accordance with aspects of the present disclosure;

FIG. 18 is a flowchart depicting a method for varying audio feedback associated with the navigation of a list of items displayed on the electronic device of FIG. 1 based upon a speed at which the list is navigated.

DETAILED DESCRIPTION OF SPECIFIC EMBODIMENTS

Figure 1:
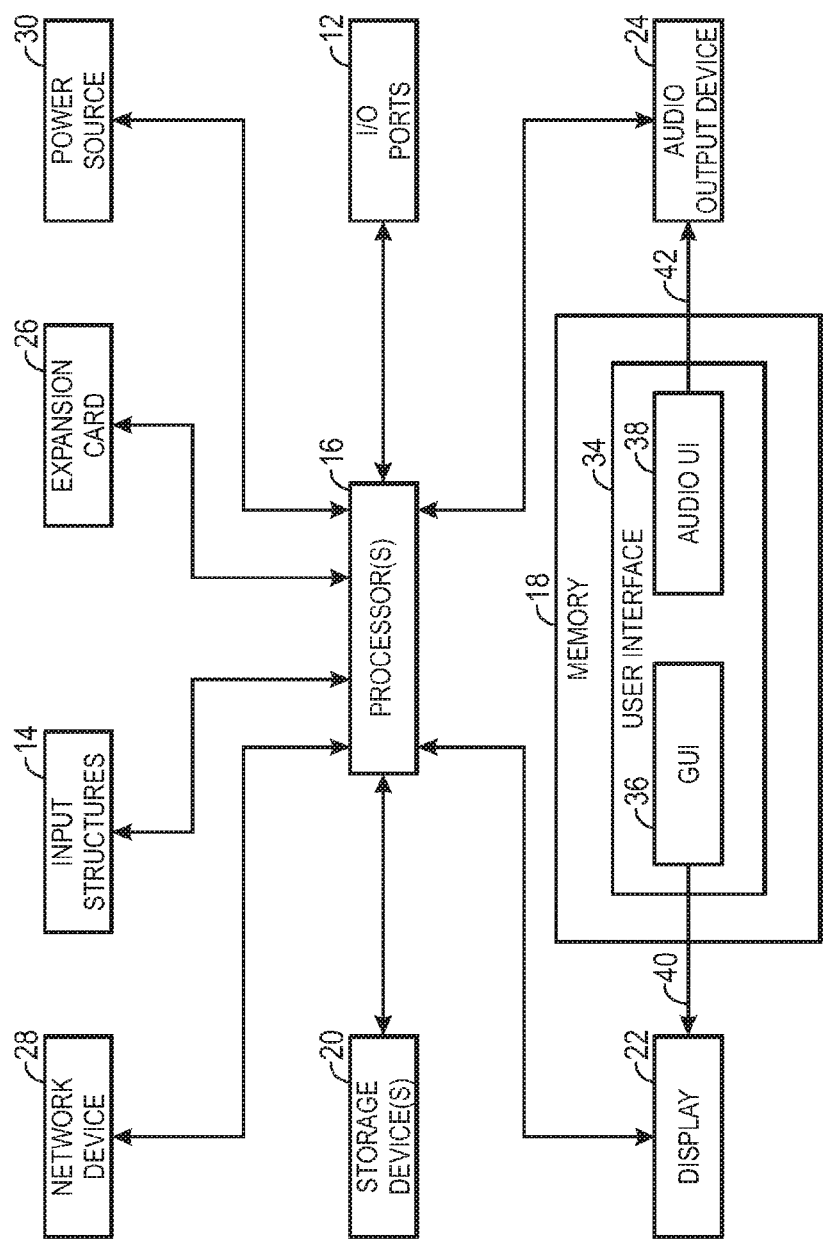
FIG. 1 is a block diagram of an electronic device that includes an audio user interface configured to adaptively vary audio feedback, in accordance with aspects of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As will be discussed below, the present disclosure relates generally to techniques for adaptively varying audio feedback provided by an audio user interface on an electronic device. As will be appreciated, an audio user interface may be particularly useful where an electronic device has either limited or no display capabilities. Further, even if the electronic device includes a visual display, there are times when a user may have difficulty navigating a graphical user interface, such as in "eyes-busy" situations where it is impractical to shift visual focus away from an important activity and towards the graphical user interface. Such activities may include, for example, driving an automobile, exercising, and crossing a busy street. Additionally, audio feedback is a practical substitute to visual feedback if the device is being used by a visually impaired user.

In accordance with one embodiment, an audio user interface may devolve or evolve the verbosity of audio feedback. As mentioned above, the term "verbosity," as used herein, shall be understood to refer to the "wordiness" of the audio information provided by the audio feedback, and may encompass non-verbal types of audio feedback, such as clicks, beeps, chirps, or other various types of non-verbal sound effects. For example, audio feedback having a high level of verbosity may output several spoken words (e.g., playing a previously stored audio file containing the spoken words, or using text-to-speech synthesis in real time), while audio feedback having a lower level of verbosity may output fewer spoken words or, in some cases, a non-verbal tone (e.g., no spoken words). In one embodiment, the verbosity of the audio feedback provided in response to user interface events is varied based at least partially upon the verbosity level of audio feedback provided during one or more previous occurrences of the user interface event. Thus, when subsequent occurrences of the user interface event occurs in relatively close proximity to a previous occurrence of the user interface event, the audio user interface may devolve the audio feedback (e.g., by reducing verbosity), such as to avoid overwhelming a user with repetitive and highly verbose information.

In another embodiment, an audio user interface may be configured to adaptively vary audio feedback associated with a navigable list of data items based at least partially upon the speed at which a user navigates the list. In a further embodiment, an audio user interface may be configured to provide audio feedback that is more audibly distinct to indicate where newer data content is located in the navigable list, and to provide audio feedback that is less audibly distinct for older data content. In yet another embodiment, an audio user interface may be configured to vary the verbosity and/or distinctiveness of the audio feedback based upon the contextual importance of a user interface event. The various audio feedback techniques disclosed herein, when implemented alone or in combination, may enhance the user experience with regard to audio user interfaces.

Before continuing, several additional terms used extensively throughout the present disclosure will be first defined in order to facilitate a better understanding of disclosed subject matter. For instance, events that occur during operation of an electronic device may be generally categorized as "user events" or "system events." As used herein, the term "user event" and the like shall be understood to refer to an event that occurs as a result of a user's interaction with the device. To provide an example, a user event may be a notification indicating the availability of a particular device function requested by a user. In contrast, the term "system event" or the like shall be understood to events that are generally initiated by the device itself during operation to provide information pertaining to the status of the device, regardless of whether a user is actively interacting with or issuing requests and/or commands to the device. By way of example only, a system event may include a low battery notification. Thus, it should be understood the term "event," as used herein, may refer to a user event or a system event, as defined above.

In the context of audio user interfaces, an electronic device may initiate the playback of an "audio item" to provide audio feedback upon the occurrence of certain events. As used herein, the term "audio item" or the like shall be understood to refer to audio information provided by an audio user interface of an electronic device. For instance, audio items may be an audio file stored on the device (e.g., in memory or non-volatile storage, and may contain verbal (e.g., speech data) audio information or non-verbal audio cues, such as beeps, clicks, chirps, chimes, rings, and other various tones or sound effects. Additionally, some audio items may not be stored locally on a device, but instead may be generated using synthesized speech applications (e.g., text-to-speech) in connection with an occurrence of a particular event that requests audio feedback.

In accordance with the techniques described below, certain events may be associated with a set of audio items having different verbosity levels. For instance, a set of audio items may include a non-verbal audio item (e.g., no wordiness content) and an audio item having a highest verbosity level (e.g., "full verbosity"), as well as one or more audio items of intermediate verbosity levels. As used herein, the terms "devolve," "step down," or the like, shall be understood to refer to the act of decreasing the verbosity of audio feedback associated with a particular event by selecting and playing back an audio item that is less verbose relative to the verbosity of the audio item selected during the previous occurrence of the event. Similarly, the term "evolve," "step up," or the like shall be understood to refer to the act of increasing the verbosity of audio feedback associated with a particular event by selecting and playing back an audio item that is more verbose relative to the verbosity of the audio item selected during the previous occurrence of the event. Various techniques for determining how to devolve or evolve audio feedback are disclosed below.

Further, the term "contextual importance" or the like, as applied to user interfaces, shall be understood to refer to the importance of the information provided in response to an event on a device relative to the context in which the information is provided. For instance, events of higher contextual importance may provide more distinct sounding audio feedback relative to events of lower contextual importance. To provide one example, events which may require a user response, such as an event prompting a user to allow or deny an incoming network connection, may have relatively high contextual importance, as the device may require the use to provide a decision in response to the event in order determine how to address the incoming network connection request. To provide another example, a first occurrence of a low battery warning notification event may have relatively low contextual importance, as such a notification is generally meant to be informative and does not necessarily require a user response or immediate user action. However, the contextual importance of a low battery notification may gradually increase if a user either intentionally or inadvertently disregards the low battery notification over several repeated occurrences, resulting in the device approaching a critical power threshold required for continued operation.

In other embodiments, the contextual importance of a user interface event may also be determined based upon pre-programmed information (e.g., events may be programmed as having high or low contextual importance characteristics). In other embodiments, the contextual importance of a user interface event may be adaptive or learned based upon previous device behavior and/or how a user interacts with the device during pervious occurrence(s) of the user interface event. Additionally, in some embodiments, the contextual importance may be user-specified, such as via set of configurable user preference settings on the electronic device. Various embodiments are discussed for varying audio feedback to indicate contextual importance of events. Thus, it should be understood that the evolving and devolving of audio feedback verbosity may be an intelligent adaptive activity performed by an electronic device in response to user inputs (e.g., direct user inputs, user preference settings, etc.) and/or in response to external stimuli (e.g., device operation events—low power, low memory, etc.). Indeed, as will be shown in the various embodiments below, the evolution and devolution of audio feedback verbosity may be dynamic and may be tailored based on specific user preferences and/or settings stored on the device.

Turning now to the drawings, FIG. 1 is a block diagram illustrating an example of an electronic device 10 that may include a user interface configured to vary audio feedback using one or more of the techniques briefly mentioned above. The electronic device 10 may be any type of electronic device, such as a laptop or desktop computer, a mobile phone, a digital media player, or the like, that includes an audio user interface configured to provide audio feedback using an audio output device. By way of example only, the electronic device 10 may be a desktop or laptop computer, such as a model of a MacBook®, MacBook® Pro, MacBook Air®, iMac®, Mac® Mini, or Mac Pro®, available from Apple Inc. of Cupertino, Calif. Additionally, the electronic device 10 may be a portable electronic device, such as a model of an iPod® or iPhone®, also available from Apple Inc. In other embodiments, the electronic device 10 may also be a model of an electronic device from another manufacturer that includes an audio user interface capable of providing audio feedback.

As shown in FIG. 1, the electronic device 10 may include various internal and/or external components which contribute to the function of the device 10. Those of ordinary skill in the art will appreciate that the various functional blocks shown in FIG. 1 may comprise hardware elements (including circuitry), software elements (including computer code, such as programs and/or firmware, stored on a computer-readable medium) or a combination of both hardware and software elements. For example, in the presently illustrated embodiment, the electronic device 10 may include the following components: input/output (I/O) ports 12, input structures 14, one or more processors 16, memory device 18, non-volatile storage device(s) 20, display 22, audio output device 24, expansion card(s) 26, networking device 28, and power source 30. Additionally, the electronic device 10 may also include a user interface 34 having both a graphical user interface 36 (a "GUI") and an audio user interface 38. As will be discussed further below, the audio user interface 38 may be configured implement one or more of the above-discussed techniques for varying audio feedback.

With regard to each of the illustrated components in FIG. 1, the I/O ports 12 may include various ports configured to connect to a variety of external devices, such as a power source, or other electronic devices (such as handheld devices and/or computers, printers, projectors, external displays, modems, docking stations, and so forth). The I/O ports 12 may support any interface type, such as a universal serial bus (USB) port, a video port, a serial connection port, an IEEE-1394 port, an Ethernet or modem port, and/or an AC/DC power connection port. In one embodiment, the I/O ports 12 may include a proprietary port from Apple Inc. that may function to charge the power source 30 (which may include one or more rechargeable batteries) of the device 10, or to transfer data between the device 10 and an external source. Further, where the audio output device 24 includes an external audio output device (e.g., headphones or external speakers), the I/O ports 12 may include an audio connector port for connecting the audio output device 24 to the device 10.

The input structures 14 may provide user input or feedback to the processor(s) 16. For instance, the input structures 14 may be configured to control one or more functions of the electronic device 10, such as applications running on the device 10. By way of example only, the input structures 14 may include buttons, sliders, switches, control pads, keys, knobs, scroll wheels, keyboards, mice, touchpads, and so forth, or some combination thereof. In one embodiment, the input structures 14 may allow a user to navigate the GUI 36 displayed on the device 10. Additionally, the input structures 14 may include a touch sensitive mechanism provided in conjunction with the display 22. In such embodiments, a user may select or interact with displayed interface elements via the touch sensitive mechanism.

The operation of the device 10 may be generally controlled by one or more processors 16, which may provide the processing capability required to execute an operating system, application programs, the GUI 36, the audio user interface 38, and any other functions provided on the device 10. The processor(s) 16 may include a single processor or, in other embodiments, it may include multiple processors. By way of example, the processor 16 may include "general purpose" microprocessors, application-specific processors (ASICs), custom processors, or a combination of such processing components. For example, processor(s) 16 may include instruction set processors (e.g., RISC), graphics/video processors, audio processors, and/or other related chipsets. The processor(s) 16 may be coupled to one or more data buses for transferring data and instructions between various components of the device 10.

Instructions or data to be processed by the processor(s) 16 may be stored in a computer readable medium, such as the memory 18, which may be a volatile memory, such as random access memory (RAM), or as a non-volatile memory, such as read-only memory (ROM), or as a combination of RAM and ROM devices. For example, the memory 18 may store firmware for the device 10, such as an operating system, applications, graphical and audio user interface functions, or any other routines that may be executed on the device 10. While the user interface 34 (including the GUI 36 and audio user interface 38) are shown as being components of the memory 18, it should be understood that the encoded instructions (e.g., machine-readable code) defining the GUI 36 and audio user interface 38 may actually reside in the non-volatile storage 20, and may be loaded into the memory 18 for execution at run time.

The non-volatile storage device 20 may include flash memory, a hard drive, or any other optical, magnetic, and/or solid-state storage media, for persistent storage of data and/or instructions. By way of example, the non-volatile storage 20 may be used to store data files, including audio data, video data, pictures, as well as any other suitable data. As will be discussed further below, non-volatile storage 20 may be utilized by device 10 to store various audio items that may be selected and played back via the audio user interface 38 to provide audio feedback to a user of the device 10.

The display 22 may be used to display various images generated by device 10. For instance, the display 22 may receive and display images 40 generated by the GUI 36. In various embodiments, the display 22 may be any suitable display, such as a liquid crystal display (LCD), plasma display, or an organic light emitting diode (OLED) display, for example. Additionally, the display 22 may be provided in conjunction with the above-discussed touch-sensitive mechanism (e.g., a touchscreen) that may function as part of a control interface for the device 10. Further, it should be noted that in some embodiments, the device 10 may not include a display 22 or a GUI 36, but instead may include only an audio user interface 38 through which a user interacts with the device 10. An example of an embodiment of the device 10 that lacks a display 22 may be a model of an iPod® Shuffle, available from Apple Inc.

As mentioned above, the audio output device 24 may include an external audio output device, such as headphones or external speakers connected to the device 10 by an I/O port 12. Additionally, the audio output device 24 may include integrated speakers. As shown in FIG. 1, audio feedback 42 provided by the audio user interface 38 may be played back using the audio output device 24. In some embodiments, the audio user interface 38 may also be configured to receive audio inputs from a user (e.g., voice commands) by way of an audio input device (now shown in FIG. 1), which may be translated into instructions or commands for performing a certain task or function on the device 10.

The embodiment illustrated in FIG. 1 may also include one or more card or expansion slots. The card slots may be configured to receive one or more expansion cards 26 that may be used to add functionality, such as additional memory, I/O functionality, or networking capability, to the electronic device 10. Such an expansion card 26 may connect to the device 10 through any type of suitable connector, and may be accessed internally or external with respect to a housing of the electronic device 10. For example, in one embodiment, the expansion card(s) 26 may include a flash memory card, such as a SecureDigital (SD) card, CompactFlash card, Multimedia card (MMC), or the like, or a PCMCIA device. Additionally, the expansion card 24 may be a Subscriber Identity Module (SIM) card, for use with an embodiment of the electronic device 10 that provides mobile phone capability.

The electronic device 10 also includes the network device 28, which may be a network controller or a network interface card (NIC) that may provide for network connectivity over a wireless 802.11 standard or any other suitable networking standard, such as a local area network (LAN), a wide area network (WAN), such as an Enhanced Data Rates for GSM Evolution (EDGE) network, a 3G data network, or the Internet. By way of the network device 28, the device 10 may connect to and send or receive data with any device on the network, such as portable electronic devices, personal computers, printers, and so forth. In certain embodiments, the network device 28 may provide for a connection to an online digital media content provider, such as the iTunes® service, available from Apple Inc.

The power source 30 of the device 10 may include the capability to power the device 10 in both non-portable and portable settings. For example, in a portable setting, the device 10 may include one or more batteries, such as a Li-Ion battery, for powering the device 10. The battery may be recharged by connecting the device 10 to an external power source, such as to an electrical wall outlet. In a non-portable setting, the power source 30 may include a power supply unit (PSU) configured to draw power from an electrical wall outlet, and to distribute the power to various components of a non-portable electronic device, such as a desktop computing system.

Figure 2:
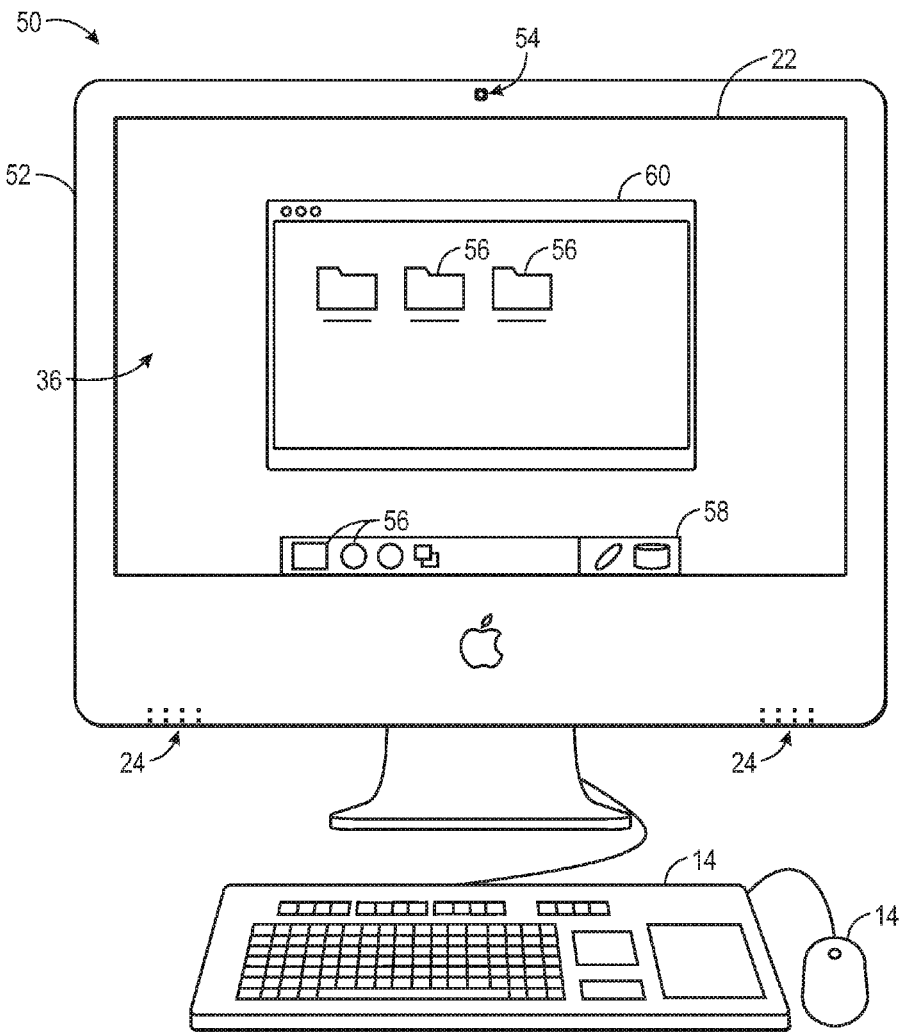
FIG. 2 is a front view of the electronic device of FIG. 1 in the form of a desktop computing device, in accordance with aspects of the present disclosure.
Figure 3:
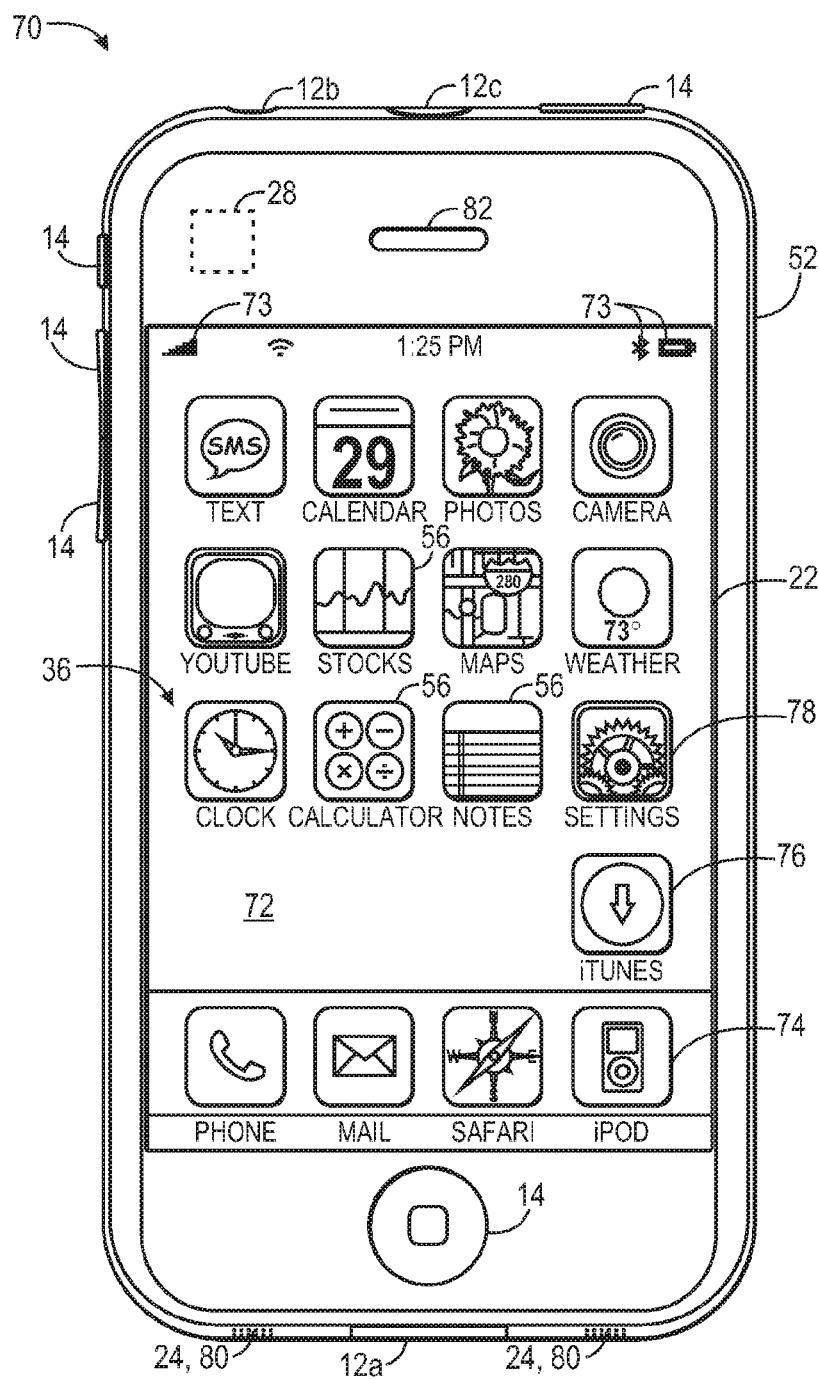
FIG. 3 is a front view of the electronic device of FIG. 1 in the form of a handheld portable electronic device, in accordance with aspects of the present disclosure.

Having described the components of the electronic device 10 depicted in FIG. 1, FIGS. 2 and 3 illustrate various forms that the electronic device 10 may take. As shown in FIG. 2, the electronic device 10 may take the form of a computing system 50. The depicted computer 50 includes a housing 52, the display 22, input structures 14 in the form of a keyboard and mouse, as well as an audio output device 24 in the form of integrated speakers. The computer 50 further includes an integrated imaging device 54, such as a digital camera. While the illustrated computer 50 is shown as being a generally non-portable computer system (e.g., desktop computer, workstation, and/or server), it should be understood that the computer 50 may also be provided using smaller and more portable form factors (e.g., laptop computers, net-book computers, and/or tablet computers).

As will be appreciated, the input structures 14 may also include various other buttons and/or switches which may be used to interact with the computer 50, such as to power on or start the computer, to operate a GUI or an application running on the computer 50, as well as adjust various other aspects relating to operation of the computer 50 (e.g., sound volume, display brightness, etc.). The computer 50 may also include various I/O ports 12 that provide for connectivity to additional devices, as discussed above, such as a FireWire® or USB port, a high definition multimedia interface (HDMI) port, or any other type of port that is suitable for connecting to an external device. Additionally, the computer 50 may include network connectivity (e.g., network device 28), memory (e.g., memory 18), and storage capabilities (e.g., storage device 20), as described above with respect to FIG. 1.

As further shown, the display 22 may be configured to generate various images that may be viewed by a user. For example, during operation of the computer 50, the display 22 may display the GUI 36 that allows the user to interact with an operating system and/or applications running on the computer 50. The GUI 36 may include various layers, windows, screens, templates, or other graphical elements that may be displayed in all, or a portion, of the display device 22. For instance, in the depicted embodiment, the GUI 36 may display an operating system interface that includes various graphical icons 56, each of which may correspond to various applications that may be opened or executed upon detecting a user selection (e.g., via keyboard/mouse or touchscreen input). The icons 56 may be displayed in a dock 58 or within one or more graphical window elements 60 displayed on the screen.

In some embodiments, the selection of an icon 56 may lead to a hierarchical navigation process, such that selection of an icon 56 leads to a screen or opens another graphical window that includes one or more additional icons or other GUI elements. By way of example only, the operating system GUI 36 displayed in FIG. 2 may be from a version of the Mac OS® operating system, available from Apple Inc. Additionally, the computer 50 may also include an audio user interface (e.g., 38) running concurrently with the GUI 36. For instance, in response to user events or system events, the audio user interface 38 may provide audio feedback to the user through the audio output devices 24. By way of example only, an embodiment of the audio user interface 38 may be the VoiceOver® utility, available on versions of the Mac OS® operating system, as well as on certain models of iPods® and iPhones®, all available from Apple Inc.

FIG. 3 further illustrates the electronic device 10 in the form of portable handheld electronic device 70, which may be a model of an iPod® or iPhone® available from Apple Inc. In the depicted embodiment, the handheld device 70 includes an enclosure 52, which may function to protect the interior components from physical damage and to shield them from electromagnetic interference. The enclosure 52 may be formed from any suitable material or combination of materials, such as plastic, metal, or a composite material, and may allow wireless networking signals, to pass through to wireless communication circuitry (e.g., network device 28), which may be disposed within the enclosure 52, as shown in FIG. 3.

The enclosure 52 also includes various user input structures 14 through which a user may interface with the handheld device 70. For instance, each input structure 14 may be configured to control one or more respective device functions when pressed or actuated. By way of example, one or more of the input structures 14 may be configured to invoke a "home" screen 72 or menu to be displayed, to toggle between a sleep, wake, or powered on/off mode, to silence a ringer for a cellular phone application, to increase or decrease a volume output, and so forth. It should be understood that the illustrated input structures 14 are merely exemplary, and that the handheld device 70 may include any number of suitable user input structures existing in various forms including buttons, switches, keys, knobs, scroll wheels, and so forth.

As shown in FIG. 3, the handheld device 70 may include various I/O ports 12. For instance, the depicted I/O ports 12 may include a proprietary connection port 12a for transmitting and receiving data files or for charging a power source 26 and an audio connection port 12b for connecting the device 70 to an external audio output device 24 (e.g., headphones or speakers). Further, in embodiments where the handheld device 70 provides mobile phone functionality, the device 70 may include an I/O port 12c for receiving a subscriber identify module (SIM) card (e.g., an expansion card 26).

The display device 22 may display various images generated by the handheld device 70. For example, the display 22 may display various system indicators 73 providing feedback to a user with regard to one or more states of handheld device 70, such as power status, signal strength, external device connections, and so forth. The display 22 may also display the GUI 36 that allows a user to interact with the device 70, as discussed above with reference to FIG. 2. The GUI 36 may include icons 56 which may correspond to various applications that may be opened or executed upon detecting a user selection of a respective icon 56. For instance, the icon 74 may represent a media player application, the icon 76 may represent an online digital media service application, and the icon 78 may represent an application through which a user may configure one or more settings of the device 70. By way of example only, the displayed GUI 36 of FIG. 3 may be from a version of the iPhone® OS operating system, available from Apple Inc.

The handheld device 70 also includes the audio output devices 24, the audio input devices 80, as well as the output transmitter 82. As discussed above, an audio user interface 38 on the device 70 may use the audio output devices 24 to provide audio feedback to a user through the playback of various audio items. Additionally, the audio output device 24 may be utilized in conjunction with the media player application 76, such as for playing back music and media files. Further, where the electronic device 70 includes a mobile phone application, the audio input devices 80 and the output transmitter 82 may operate in conjunction to function as the audio receiving and transmitting elements of a telephone.

Figure 4:
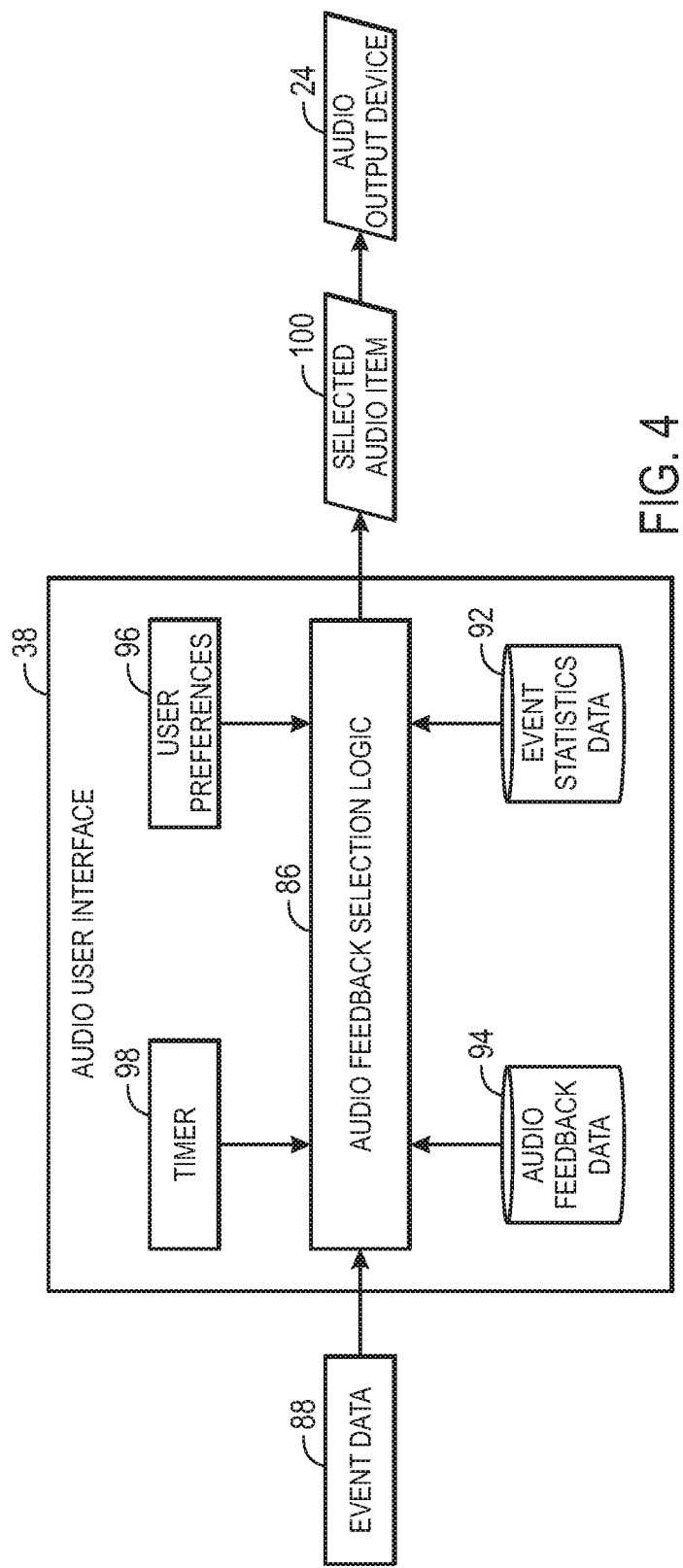
FIG. 4 is a block diagram illustrating components that may be included in an audio user interface configured to adaptively vary audio feedback, in accordance with aspects of the present disclosure.

Referring now to FIG. 4, a block diagram depicting functional components of an audio user interface 38 that may be implemented in the device 10 of FIG. 1 is illustrated in accordance with one embodiment. The audio user interface 38 includes audio feedback selection logic 86 that receives data 88 indicating the occurrence of an event, such as a user or system event. Upon receiving the data 88, the audio feedback selection logic 86 may communicate with an event statistics data storage unit 92 and an audio feedback data storage unit 94 (both of which may be part of the non-volatile storage 20 (FIG. 1) or implemented as standalone storage devices) as well as a set of user preferences 96 and a clock or timer 98, to determine the selection of an audio item 100 for playback using the audio output device 24. As will be appreciated, the functions provided by the various components shown in FIG. 4 may be executed or performed by one or more processors 16 of the electronic device 10.

For example, as mentioned above, one aspect of the audio feedback selection logic 86 may relate to devolving or evolving audio feedback in response to an event 88. In one embodiment, the selection logic 86 may identify a set of audio items ("audio feedback data set") within the audio data storage 94 that is associated with the event 88 as being candidates for audio feedback. As discussed above, the set of audio items corresponding to the event 88 may vary in levels of verbosity, wherein each level may be referred to as a "step." Thus, as defined above, "stepping down" the audio feedback may refer to decreasing the verbosity of the audio feedback, while "stepping up" the audio feedback may refer to increasing the verbosity of the audio feedback. Accordingly, an audio item 100 corresponding to a desired level of verbosity may be selected in accordance with information provided by the event statistics data storage 92 and the user preferences 96.

In one embodiment, the event statistics data storage 92 may store information about the event 88, including the frequency at which event 88 has previously occurred during operation of the device 10, the audio item selected for playback during the most recent occurrence of the event 88, as well as the temporal proximity at which the event 88 last occurred, and so forth. By way of example, each previous occurrence of the event 88 may be stamped with a time value provided by the timer 98 and stored as a data entry in the event statistics data storage 92. The timer 98 may be implemented as a standalone clock (e.g., an RC oscillator) or may be configured to derive time values based on an external system clock of the device 10. Thus, when the event 88 occurs in close proximity, i.e., within a selected amount of time (a "wait time" or "step-up time" configurable through the user preferences 96), relative to the previous occurrence of the event 88, the audio feedback selection logic 86 may select an audio item 100 from the audio feedback data set that is less verbose relative to the audio item selected during the previous occurrence. In this manner, the audio user interface 38 may avoid repeatedly playing back the same high verbosity audio item for multiple occurrences of a particular event 88 over a relatively short amount of time, thus improving the user experience with regard to the audio user interface 38.

By the same token, some embodiments of the audio feedback selection logic 86 may also be configured to evolve the audio feedback using a technique similar to the devolving process discussed above. For example, upon detecting the occurrence of the event 88, if the event statistics data 92 indicates that the event 88 has not occurred within the interval corresponding to the selected step-up time just prior to the occurrence of the event 88, then the selection logic 86 may evolve the audio feedback by selecting an audio item 100 from the audio feedback data set that is more verbose relative to the audio item selected for the previous occurrence of the event 88.

While the frequency and temporal proximity in which an event 88 occurs is one metric by which the selection logic 86 of the audio user interface 38 may vary audio feedback, other factors may also contribute to how the selection logic 86 selects the audio item 100. For instance, in one embodiment, the selection logic 86 may be configured to control or vary audio feedback based upon the contextual importance of the event 88, which may depend upon the relative importance of the information provided in response to the event 88 relative to the context in which the event 88 occurred. In other embodiments, contextual importance of an event may be determined based upon pre-programmed information (e.g., events may be programmed as having high or low contextual importance characteristics), may be adaptive or learned based upon previous device behavior and/or how a user interacts with the device during pervious occurrence(s) of the event, or may be user-specified, such as via set of configurable user preference settings on the electronic device, or may be determined based on a combination of such factors. In a further embodiment, the selection logic 86 may be configured to vary audio feedback associated with a displayed list of items based upon the speed at which the list is navigated by a user of the device 10.

Figure 12:
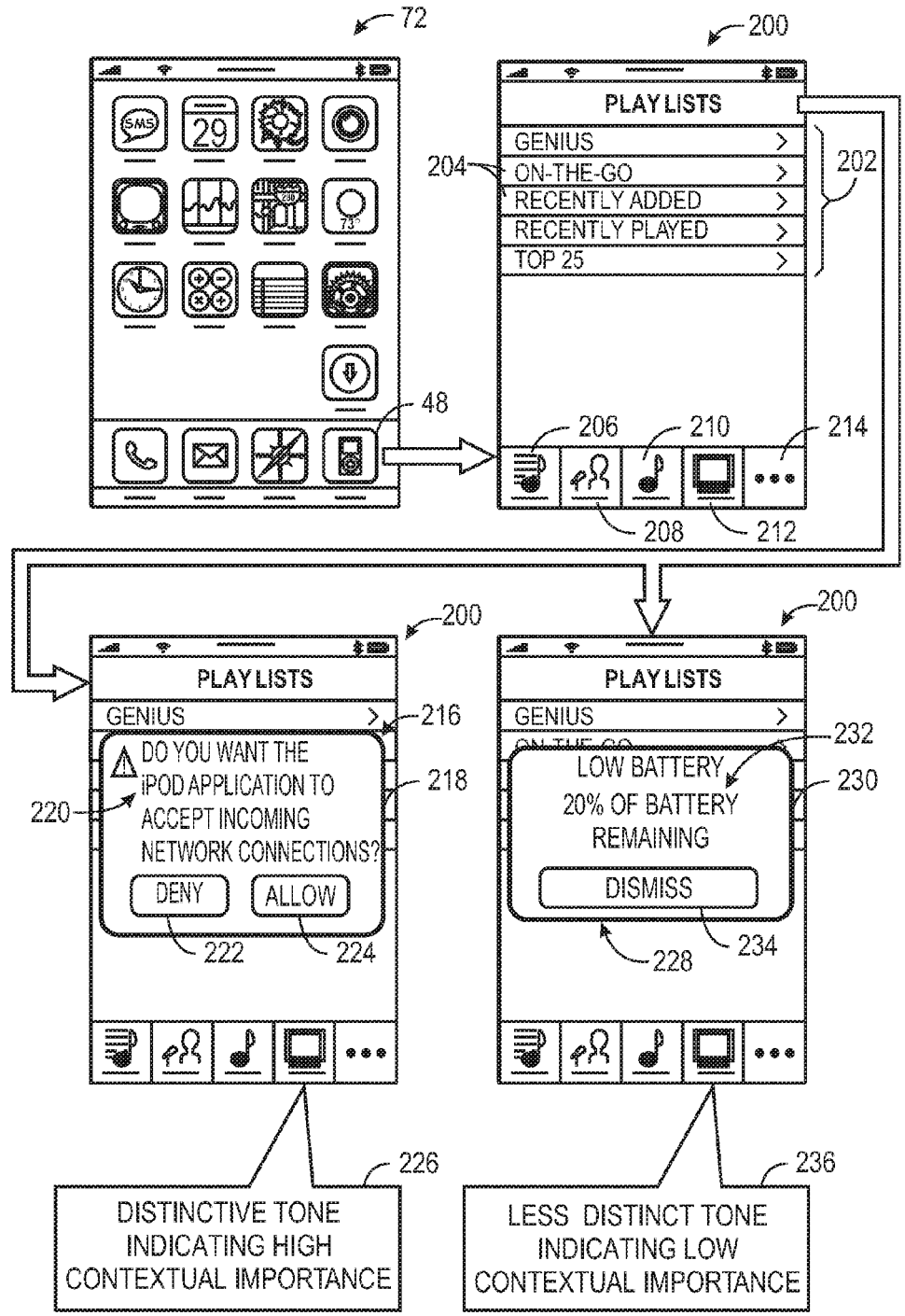
FIG. 12 shows a plurality of screen images that may be displayed on the device of FIG. 1 and illustrating how an audio user interface may provide audio feedback that distinguishes between events based upon contextual importance, in accordance with aspects of the present disclosure.
Figure 13:
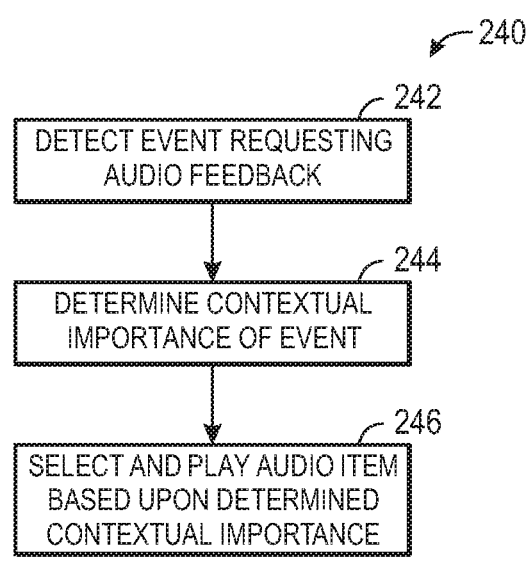
FIG. 13 is a flowchart depicting a method for selecting an audio item based upon the contextual importance of an event, in accordance with aspects of the present disclosure.
Figure 19:
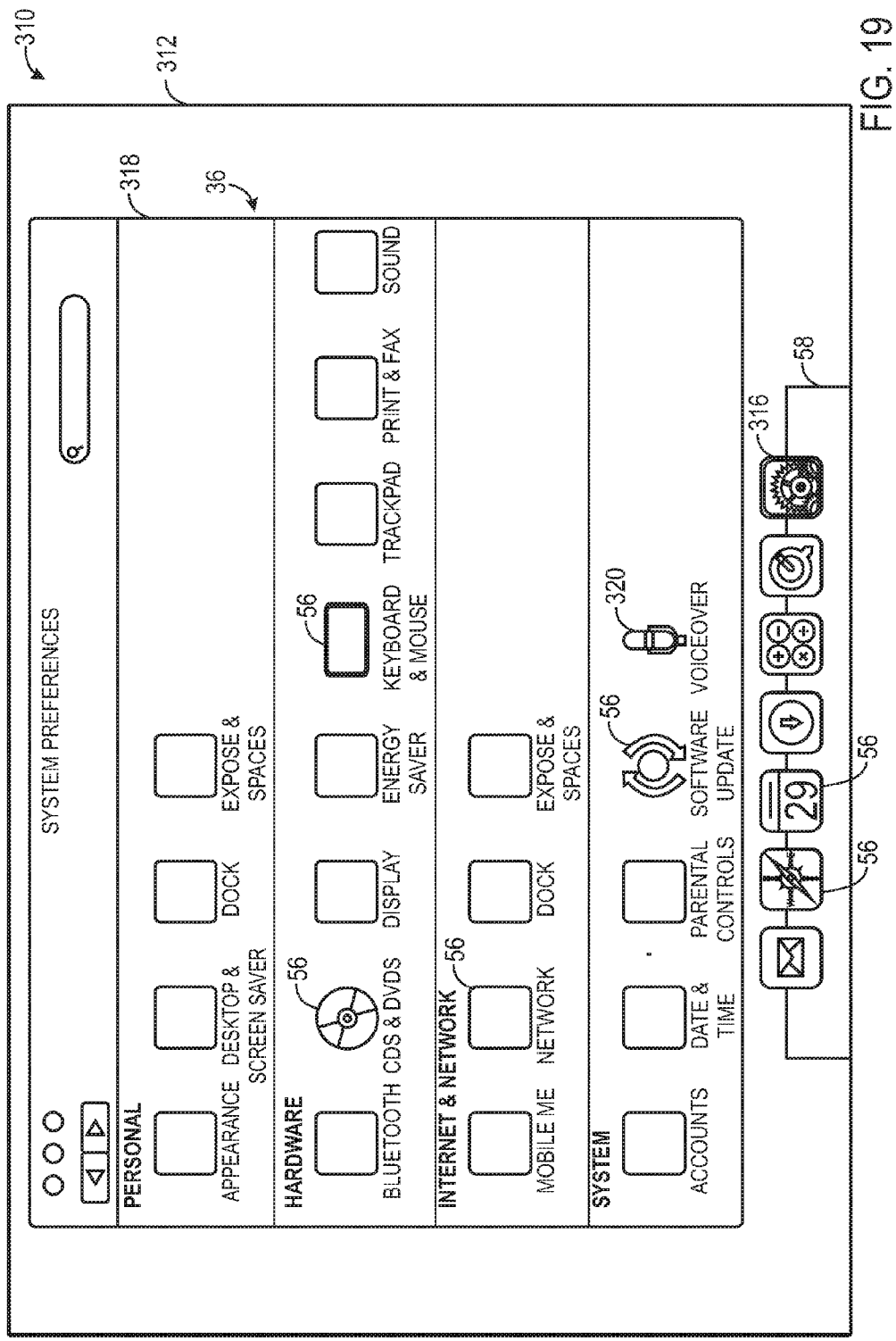
FIGS. 19-21 are screen images that may be displayed on the device of FIG. 1 illustrating various user-configurable options relating to varying audio feedback in an audio user interface, in accordance with aspects of the present disclosure.
Figure 20:
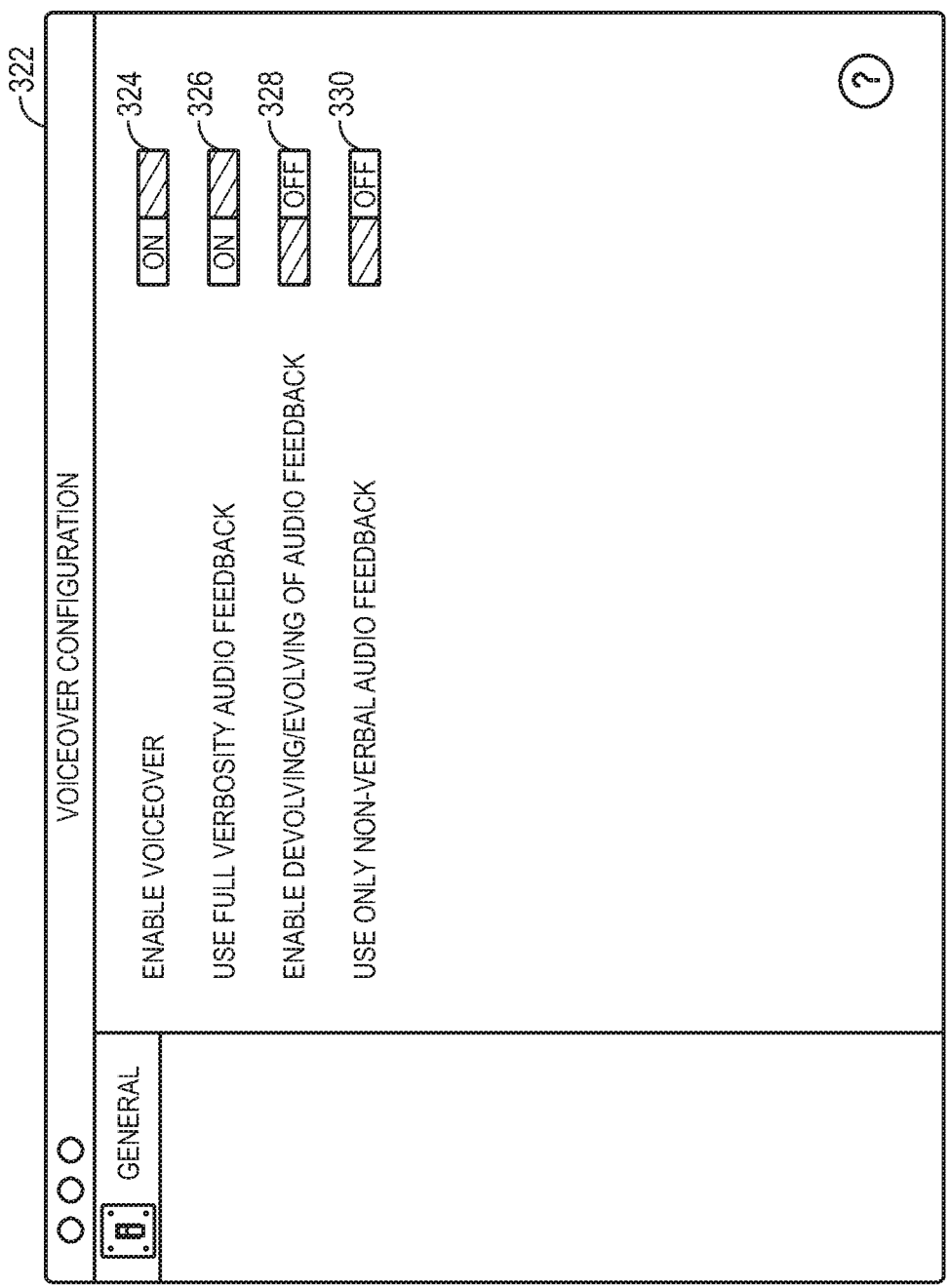
Figure 21:
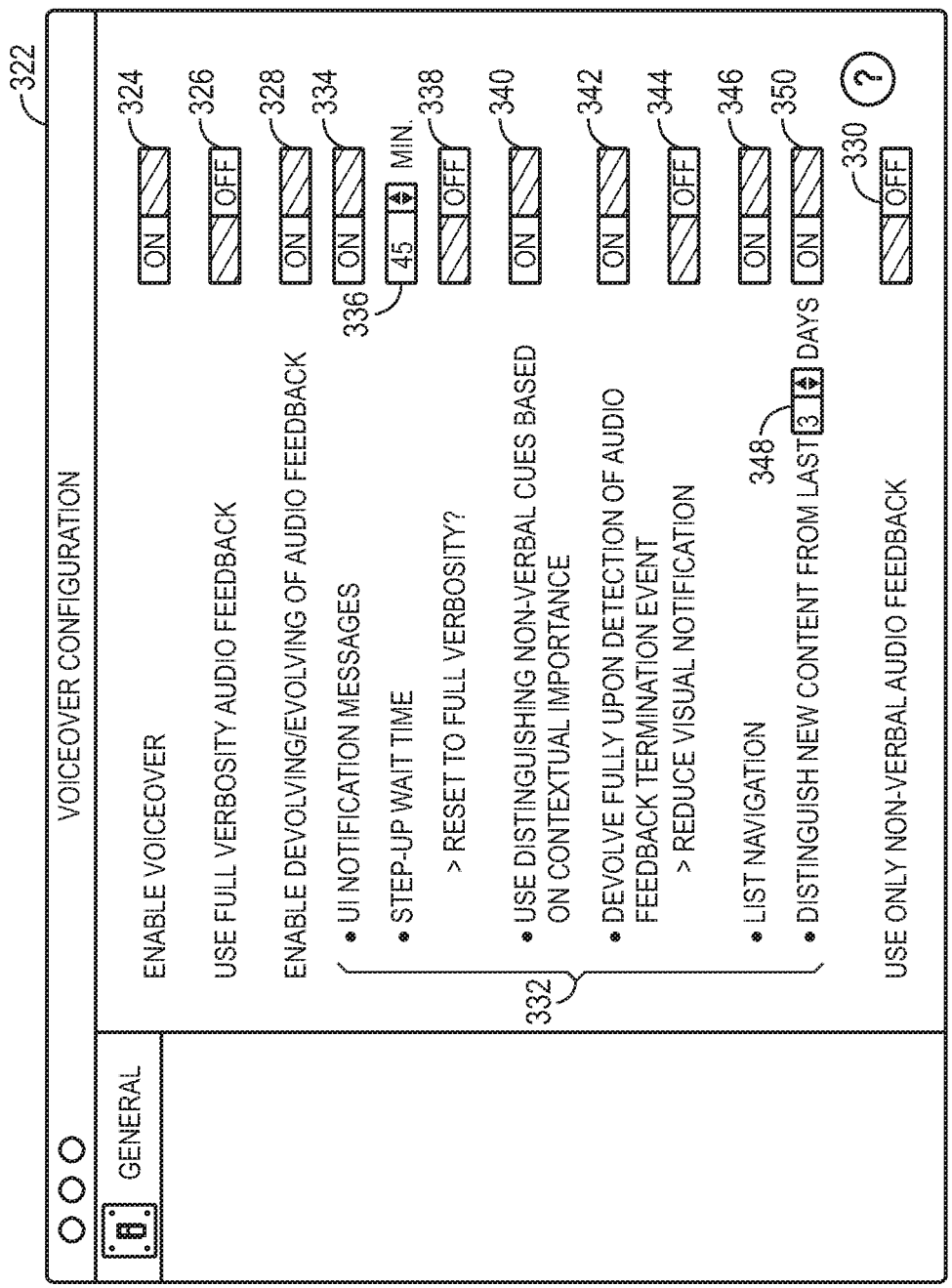

With these points in mind, the remaining figures are intended to depict various embodiments for varying audio feedback provided by an audio user interface (e.g., 38) in accordance with aspects of the present disclosure. Specifically, FIGS. 5-11 depict embodiments in which the audio feedback selection logic 86 is configured to vary audio feedback based upon the proximity in which an event occurs on the device 10 relative to previous occurrences of the same event. FIGS. 12-13 depict an embodiment in which the selection logic 86 is configured to vary audio feedback based on the contextual importance of an event occurring on the device 10. FIGS. 14-18 depict an embodiment in which the selection logic 86 is configured to vary audio feedback based on the manner in which a user navigates a listing of items displayed on the device 10. Finally, FIGS. 19-21 depict an embodiment of a configuration application through which a user may define and/or configure various audio user interface settings relating to varying audio feedback on the device 10. Those skilled in the art will readily appreciate that the detailed description given herein with respect to these figures is merely intended to provide, by way of example, certain forms that embodiments of the invention may take. That is, the disclosure should not be construed as being limited only to the specific embodiments discussed herein.

Figure 5:
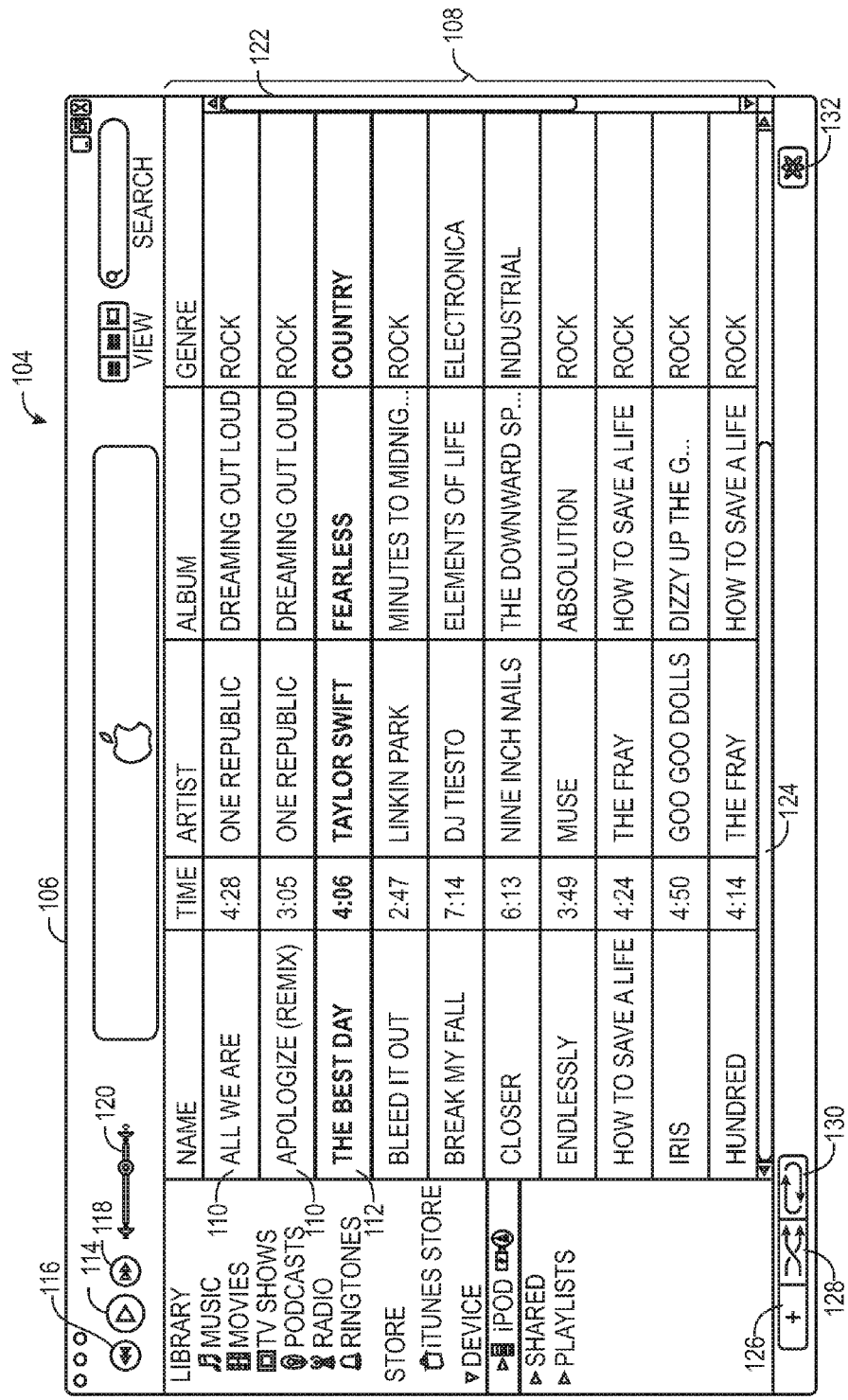
FIG. 5 is a screen image of an application that may be executed on the electronic device of FIG. 1.

Referring to FIG. 5, a screen image 104 depicting an application 106 on the device 10 is illustrated in accordance with one embodiment. The screen image 104 may be part of a graphical user interface for the application 106, and may be displayed using the display 22 on the computer 50 of FIG. 2. In the depicted embodiment, the application 106 may be a digital media player application, such as the iTunes® application, available from Apple Inc., and may be initiated when a user selects an appropriate icon 56 from an operating system GUI 36, as shown in FIG. 2. For the purposes of the embodiments discussed below, it should be understood that the application 106 either includes an audio user interface (e.g., 38) or is compatible with a global audio user interface (e.g., of a main operating system of the device 10) to provide audio feedback to the user.

As discussed above, a GUI 36, depending on the inputs and selections made by a user, may display various screens including icons (e.g., 56) and graphical elements. These elements may represent graphical and virtual elements or "buttons" which may be selected by the user from the display 22 using one or more input structures 14 (FIG. 1). Accordingly, it should be understood that the term "button," "virtual button," "graphical button," "graphical elements," or the like, as used in the following description of screen images below, is meant to refer to the graphical representations of buttons or icons represented by the graphical elements provided on the display 22. Further, it should also be understood that the functionalities set forth and described in the subsequent figures may be achieved using a wide variety graphical elements and visual schemes. Therefore, the present disclosure is not intended to be limited to the precise user interface conventions depicted herein. Rather, the embodiments set forth herein may be implemented include a wide variety of user interface styles.

As shown in the screen 104, the application 106 may display a list 108 of media items 110, such as song files, video files, podcasts, and so forth, from which a user may select an item 112 for playback on the device 10. As shown in FIG. 5, the list 108 may display various characteristics about each media item 110, such as a song name, track playback time, artist name, album name, and genre. Once a selected item 112 is identified, the user may initiate playback of the selected item 112 by selecting a graphical playback button 114. Additionally, the user may return to a previously played item by selecting the graphical button 116, skip forward to another item in the list 108 by selecting the graphical button 118, or adjust the playback volume of the selected item 112 by manipulating the graphical sliding bar 120. As shown here, the screen 104 also includes the scroll bar elements 122 and 124, which may allow a user to navigate the entire list 108 vertically and horizontally if the size of the display 22 is insufficient to display the list 108 in its entirety.

Additional playback functions provided by the application 106 are depicted by the graphical buttons 126, 128, 130, and 132. For instance, the graphical button 126 may represent a function by which the user may manually create a new group of media items for playback, commonly referred to as a "playlist." The graphical buttons 128 and 130 may represent functions for enabling or disabling "shuffle" and "repeat" playback modes, respectively. Finally, the graphical button 132 may represent a function for automatically generating a playlist using media items stored on the device 10 which are determined to be similar to the selected media item 112. By way of example only, such a function may be provided as the Genius® function, available on the iTunes® application, as well as on models of the iPod® and iPhone®, all available from Apple Inc.

Genius® playlists may be generated using ratings system and filtering algorithms provided through an external centralized server, such as the iTunes® server, provided by Apple Inc. In some instances, however, the Genius® function may be unable to fulfill a user request for generating a playlists, such as when a selected media item 112 is relatively new and the Genius® function is unable to obtain sufficient data points for identifying similar media stored on the device 10 (e.g., in non-volatile storage 20). Additionally, the Genius® function may also be unavailable if the total number of media items stored on the device 10 is insufficient to generate a suitable playlist. For the purposes of the embodiments discussed below with respect to FIGS. 6-10, the selection of the Genius® button 132 is used as an example of an event 88 (FIG. 4) that triggers or requests audio feedback.

Figure 6:
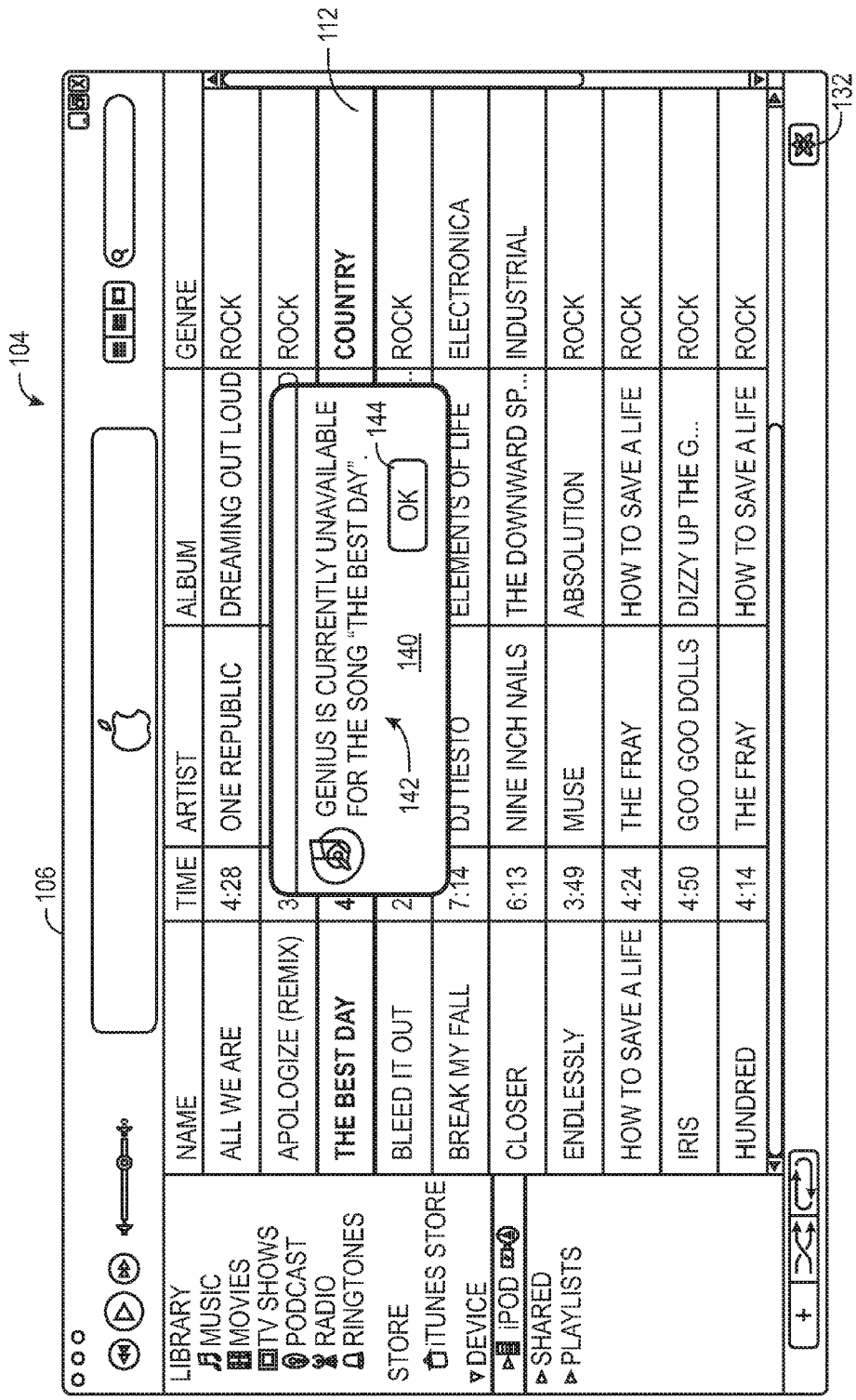
FIG. 6 is a screen image of the application shown in FIG. 5 that depicts a visual notification of an event that occurs as a user interacts with the application, in accordance with aspects of the present disclosure.

FIG. 6 shows an updated view of the screen 104 following the selection of the Genius® button 132. In the illustrated example, it is assumed that the Genius® function is unavailable for the selected media item 112. In response to this event 88, the graphical user interface 36 portion of the application 106 may display the visual notification window 140, which contains a visual notification 142 informing the user that the requested function is unavailable. Generally concurrent with the display of the visual notification window 140, the audio user interface 38 portion of the application 106 may provide audio feedback to inform the user that the requested function is unavailable. For instance, audio feedback may be provided by playing back an audio item, which may include playing an audio file or using a using a text-to-speech application to "speak" the notification 142 using synthesized speech. In order to remove the visual notification window 140 from the screen 104, the user may select the graphical button 144, which may indicate to the device 10 and application 106 that the user has received and acknowledged the information conveyed by the visual notification window 140.

As discussed above, certain embodiments of the present technique may include devolving audio feedback in response to the event 88. For instance, suppose that after attempting to apply the Genius® function to the selected media item 112, the user further attempts to apply the Genius® function to several other items on the list 108 within a relatively short interval of time with no success, thus triggering the event 88 on each attempt. Assuming that the devolving techniques discussed above are not applied, audio feedback would be provided at "full-verbosity" for each occurrence, which may overwhelm the user with repetitive information and, thus, negatively impact the user experience with regard to the application 106.

Figure 7:
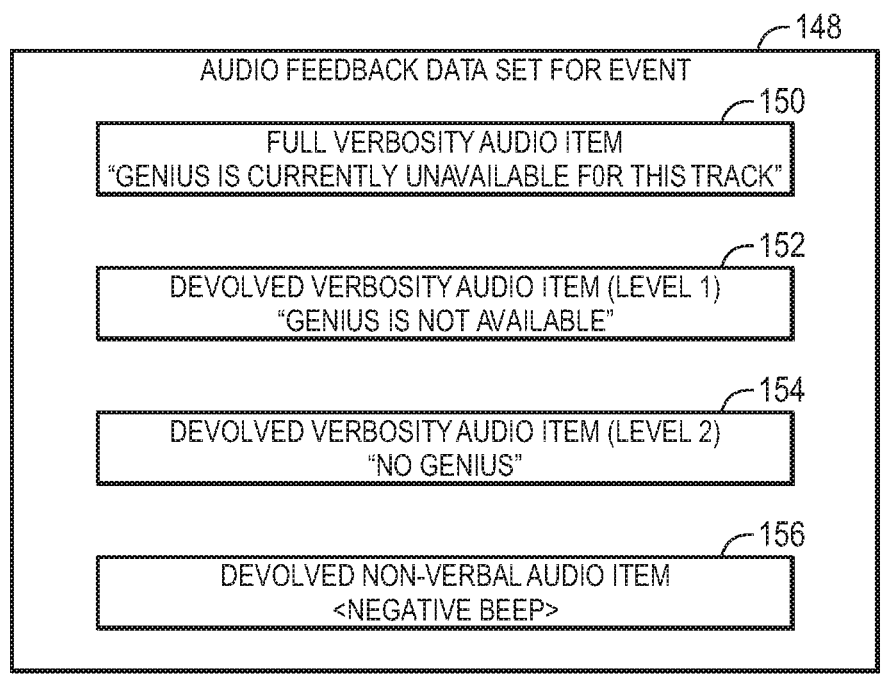
FIG. 7 graphically depicts a set of audio items having varying levels of verbosity and being associated with the event depicted in FIG. 6, in accordance with aspects of the present disclosure.

To enhance the user experience, the audio feedback selection logic 86 (FIG. 4) may reduce the verbosity of the audio feedback corresponding to the event 88 by analyzing event statistics data (e.g., from storage 92) relating to the event 88 and selecting an appropriate audio item from an audio feedback data set associated with the event 88. Referring now to FIG. 7, an example of an audio feedback data set 148 is illustrated. As shown, the audio feedback data set 148 may include the audio items 150, 152, 154, and 156, each having varying degrees of verbosity. For instance, the audio item 150, referred to as "full verbosity," is the most verbose and, when selected by the selection logic 86, may cause the verbal audio information "GENIUS IS CURRENTLY UNAVAILABLE FOR THIS TRACK" to be played back through the audio output device 24, generally concurrently with the display of the visual notification window 140 of FIG. 6.

The audio item 152 may represent a first-level devolved audio item that is less verbose relative to the audio item 150, but still contains a substantial portion of verbal audio information. For instance, when selected, the audio item 152 may cause the verbal audio information "GENIUS IS NOT AVAILABLE" to be played back through the audio output device 24. The audio item 154 is even less verbose compared to the audio item 152, and only includes a relatively short verbal message: "NO GENIUS." Finally, the audio item 156 represents the least verbose item of the set 148, and includes no verbal components, but only a non-verbal cue in the form of a negative sounding tone or beep.

Thus, the depicted audio feedback data set 148 of FIG. 7 illustrates represents audio items (e.g., 150, 152, 154, and 156) having varying levels or steps of verbosity from which the selection logic 86 may select to either evolve or devolve the audio feedback corresponding to the occurrence of the event 88. Further, while the present embodiment illustrates an audio feedback data set having 4 steps of verbosity, it should be understood that in other embodiments or with respect to other events, a corresponding audio feedback data sets may include fewer or more steps of verbosity. Further, some embodiments may provide an audio feedback data set that includes multiple audio items for the same level of verbosity. For instance, as will be discussed further below, in one embodiment, different non-verbal cues may be provided to help a user determine the contextual importance of a particular event.

Figure 8:
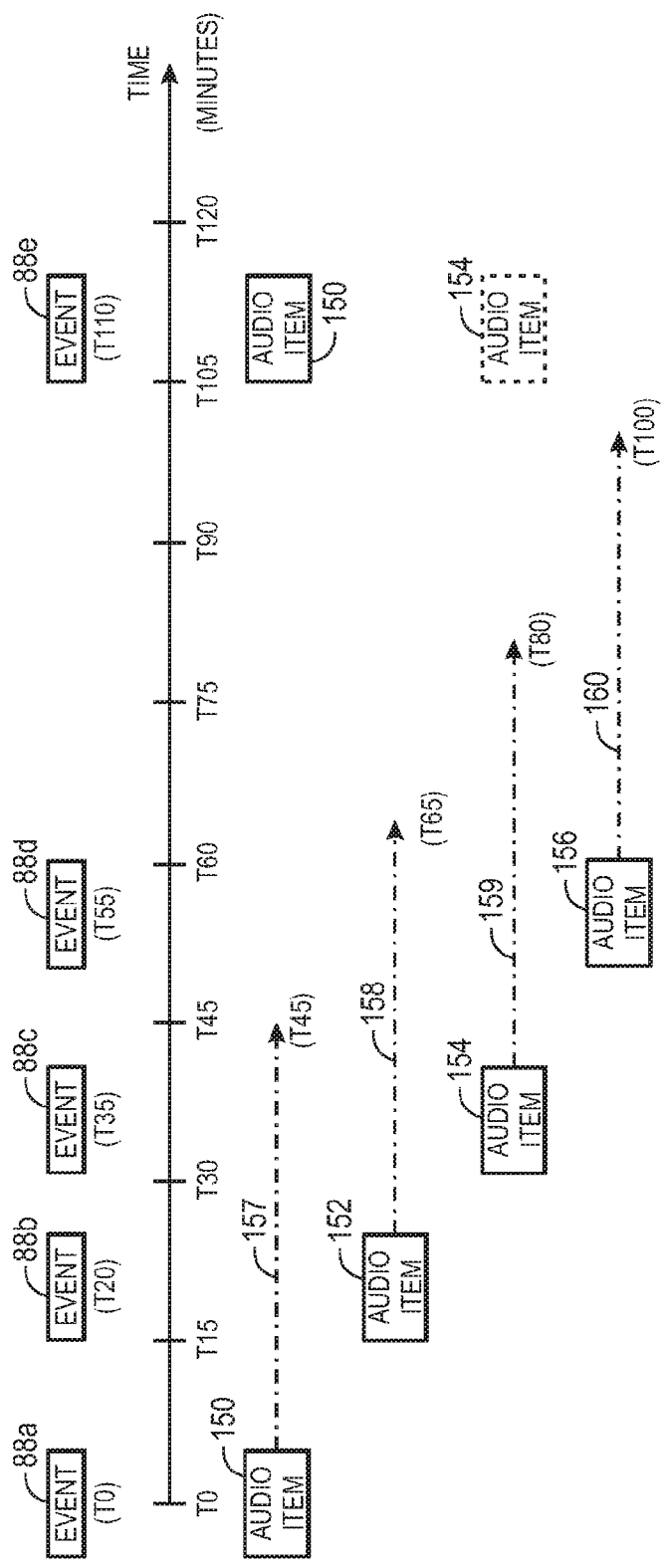
FIGS. 8 and 9 are graphical timelines depicting how the verbosity of the audio feedback associated with the event of FIG. 6 is varied over an interval of time in response to repeated occurrences of the event, in accordance with aspects of the present disclosure.

An example illustrating how audio feedback corresponding to the event 88 shown in FIG. 6 may be devolved and evolved over a period of time is illustrated in FIG. 8 by way of a graphical timeline depicting the operation of the device 10 over a period of 120 minutes. As shown, the event 88 may occur multiple times within this period, specifically at times t0 (0 minutes), t20 (20 minutes), t35 (35 minutes), t55 (55 minutes), and t110 (110 minutes). While the event 88 is generally identical at each of these times, in order to better distinguish each occurrence, the events have been labeled with the reference numbers 88a, 88b, 88c, 88d, and 88e. The present example assumes a step-up time interval set at 45 minutes, which may be preset by the manufacturer of the device 10 or programmer of the user interface 34, or later configured by the user (e.g., via the user preferences 96 shown in FIG. 4), and further assumes that in the step-up time interval just prior to time t0 (e.g., the previous 45 minutes from −t45 to t0), the event 88 did not occur.

Beginning at time t0, the occurrence of the event 88a may result in the visual notification window 140 of FIG. 6 being displayed on the screen 104, as well as the selection and playback of the full verbosity audio item 150. For instance, the event statistics data storage unit 92 may indicate to the selection logic 86 that no similar events 88 occurred within the step-up time interval (45 minutes) just prior to time t0. Based on this data, the selection logic 86 may select and initiate the playback of the full verbosity audio item 150 to provide audio information substantially concurrently with the display of visual information (e.g., visual notification window 140) relating to the occurrence of the event 88a. Upon initiating the playback of the audio item 150, the audio user interface 38 may utilize the timer 98 to establish a step-up window 157 from time t0 to time t45. If the event 88 occurs again within this window 157, the selection logic 86 may devolve the audio feedback.

In the present example, the event 88b occurs once again at time t20. Upon the occurrence of the event 88b, the event statistics data storage unit 92 may indicate to the selection logic 86 that the event 88a occurred less than 45 minutes ago (e.g., the step-up interval). Thus, because the event 88b occurs within the step-up window 157 (e.g., from t0 to t45), the selection logic 86 may identify the audio item that was played during the most recent occurrence of the event 88 (e.g., in this case, audio item 150 at time t0), and devolve the audio feedback by one step of verbosity. This may result in the selection and playback of the audio item 152, which, as shown in FIG. 7, is one verbosity step less relative to the audio item 150. Once the playback of the audio item 152 occurs at time t20, the remainder of the step-up window 157 becomes irrelevant, and a new "current" step-up window 158 is established from time t20 to time t65.

Thereafter, the event 88c occurs again at time t35. Because the event 88c occurs within the step-up window 158 (e.g., from t20 to t65), the selection logic 86 of the audio user interface 38 may further devolve the audio feedback associated with the event 88c by selecting and playing back the audio item 154, which is one verbosity step lower than the previously played audio item 152. Once the playback of the audio item 154 occurs at time t35, the remainder of the step-up window 158 also becomes irrelevant, and a step-up window 159 associated with the event 88c is established from time t35 to time t80 and becomes the current step-up window.

Following the event 88c, the event 88d occurs again at time t55. Again, because the event 88d occurs within the current step-up window 159 (e.g., from t35 to t80), the selection logic 86 of the audio user interface 38 may lower the verbosity of the audio feedback an additional step, thus fully devolving the audio feedback associated with the event 88 to the non-verbal audio item 156. Thereafter, once the playback of the non-verbal audio item 156 occurs at time t55, a new step-up window 160 associated with the event 88d is established from time t55 to time t100, and the remainder of the previous step-up window 159 becomes irrelevant. In other words, as long as the event 88 continues to occur within a current step-up time window following the most recent previous occurrence of the event 88, the selection logic 86 may continue to devolve the audio feedback corresponding to the event 88. It should be noted, however, that because the audio item 156 cannot be devolved any further in the present example, additional occurrences of the event 88 within the window 160 may result in the selection logic 86 selecting and playing the audio item 156 again.

Next, at time t110, the event 88e occurs once again. This occurrence, however, is outside of the step-up window 160. In this case, the selection logic 86 may be configured to evolve the audio feedback. For instance, in one embodiment, the selection logic 86 may "reset" the verbosity of the audio feedback to full verbosity by selecting and playing back the audio item 150 at time 110, regardless of the verbosity level of the most recently played audio item (e.g., audio item 156). In another embodiment, the selection logic 86 may evolve the audio feedback by increasing the verbosity of the audio feedback by one step relative to the most recently played audio item. For instance, in the present example, the selection of the audio item 154 at time t110 may provide a one step increase in the verbosity of the audio feedback relative to the most recently played audio item 156.

As will be appreciated, the occurrence of each of the events 88a-88e, in addition to triggering audio feedback, may also trigger the display of visual feedback on the GUI 36, such as by way of the visual notification window 140 shown in FIG. 6. Further, the occurrence of each of the events 88a-88e may be stored in the event statistics data storage 92 to provide statistical data which may be used by the audio feedback selection logic 86 when determining the appropriate audio feedback for future occurrences of the event 88.

While the graphical timeline depicted in FIG. 8 illustrates a constant rate of devolvement (e.g., one step of verbosity) for each subsequent occurrence of the event 88 that occurs within a current step-up window, other embodiments of the present techniques may vary the rate at which audio feedback is devolved based not only upon the proximity in which the event 88 occurs relative to a previous occurrence, but also based at least partially upon the user's reaction or response to visual feedback and/or audio feedback resulting from the event 88.

For instance, one embodiment for devolving audio feedback may consider the occurrence of a "playback termination event." As used herein, a playback termination event refers to a response by the user that terminates the playback of an audio item before completion. For instance, referring to FIG. 6, in one embodiment, the user may select the graphical button 144 during but prior to the completion of the playback of a selected audio feedback item (e.g., one of the audio items 150, 152, 154, and 156) to cause a playback termination event. A playback termination event may also be communicated to the device 10 using other actions, such as a gesture-based action (e.g., gently shaking the device 10). Accordingly, the device 10 may interpret playback termination events as a response that the user is not interested in the information provided by either or both the visual notification window 140 and the selected audio feedback.

Figure 9:
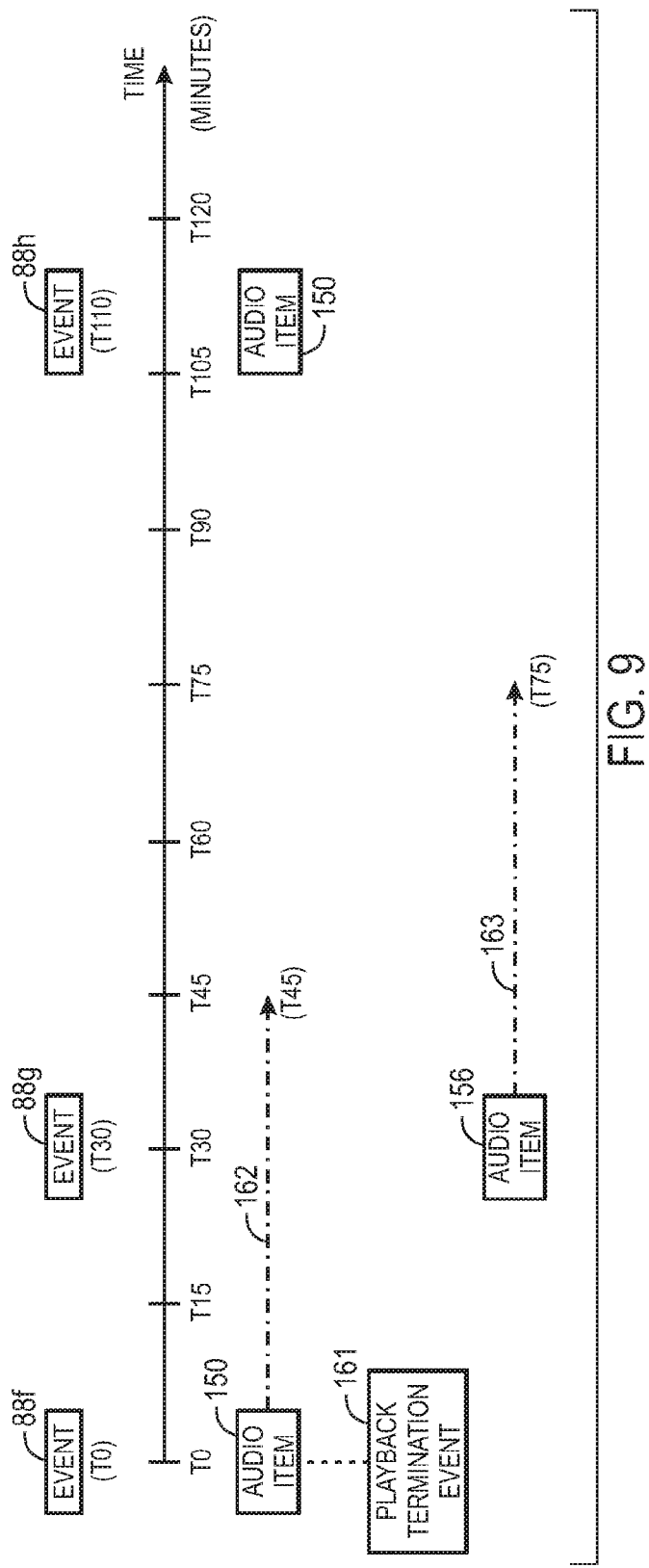
Figure 10:
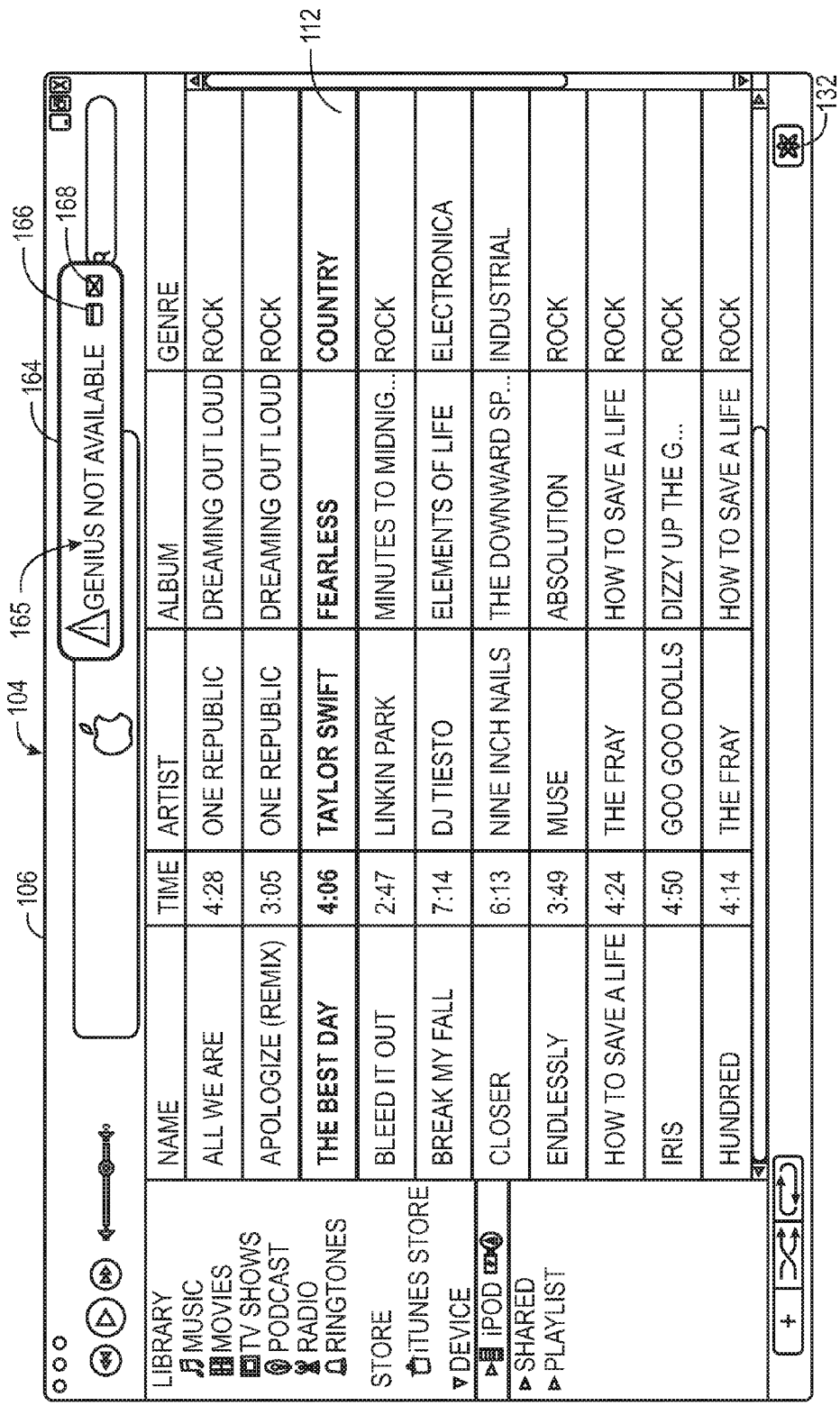
FIG. 10 is a screen image of the application shown in FIG. 5, further depicting an alternate visual notification of the event of FIG. 6, in accordance with aspects of the present disclosure.

An example illustrating how playback termination events may affect the devolvement of audio feedback is shown in FIG. 9 by way of a graphical timeline depicting the operation of the device 10 over a period of 120 minutes, in which the event 88 occurs at times t0, t30, and t110. For distinguishing purposes, these occurrences are referred to by the reference numbers 88*f*, 88*g*, and 88*h*. Additionally, for the purposes of the example shown in FIG. 9, a 45 minute step-up interval is assumed. It is also assumed that the event 88 did not occur in the step-up time interval just prior to time t0 (e.g., the previous 45 minutes from −t45 to t0).

Beginning at time t0, the occurrence of the event 88*f* may result in the visual notification window 140 of FIG. 6 being displayed on the screen 104, as well as the selection and playback of the full verbosity audio item 150 at time t0. During the playback of the audio item 150, a playback termination event 161 is detected, which may cause the playback of the audio item 150 to prematurely terminate. For example, this may be the result of the user selecting the graphical button 144 prior to the complete playback of the audio item 150, or may be the result of a termination gesture (e.g., shaking the device 10), or any other type of action that terminates the playback of the audio item 150 prior to its completion. The occurrence of the event 88*f*, as well as the playback termination event 161, is stored into the event statistics data storage 92. Additionally, a step-up window 162 for detecting subsequent occurrences of the event 88 is established from time t0 to time t45

Next, the event 88*g* occurs again at time t30. Upon the occurrence of the event 88*g*, the event statistics data storage unit 92 may indicate to the selection logic 86 that a playback termination event 161 was detected in connection with the previous occurrence of the event 88*f* at time t0. In the illustrated embodiment, this may cause the selection logic 86 to fully devolve the audio feedback by selecting and playing back the non-verbal audio item 156, thus bypassing the verbosity levels represented by the audio items 152 and 154. A new step-up window 163 is established from time t30 to time t75. As will be appreciated, like the embodiment of FIG. 8, subsequent occurrences of the event 88 within the window 163 may result in the audio item 156 being played again, and subsequent occurrences of the event 88 outside of the window 163 may result in the audio feedback being reset to full verbosity (e.g., audio item 150), as shown in FIG. 9 at time t110.

In some embodiments, a playback termination event (e.g., 161) may, in addition to affecting audio feedback behavior, also affect visual feedback behavior. For instance, referring to FIG. 10, the screen 104 is depicted during the occurrence of the event 88*g* at time t30 of FIG. 9. As shown, due the detection of the playback termination event 161 during the most recent occurrence of the event (e.g., 88*f* at time t0), the visual notification window 140 that previously appeared in the center of the screen 104 in FIG. 6 is devolved into a less prominent and smaller notification banner 164 that appears near the upper right corner of the screen 104. The notification banner 164 includes the visual notification message 165, which is also devolved relative to the more verbose notification message 142 shown in FIG. 6.

The notification banner 164 may include the graphical elements 166 and 168. By selecting the graphical element 166, the user may expand the notification banner 164, causing the window 140 to appear instead. In one embodiment, the GUI 36 may display the notification banner 164 only briefly, such as for a period of 5 to 10 seconds, before automatically removing the banner 164 from the screen 104. Additionally, the user may choose to manually remove the notification banner 164 by selecting the graphical button 168.

The various techniques for devolving and evolving audio feedback, as described with reference to the embodiments shown in FIGS. 5-10, are generally summarized by the method 169 depicted by the flowchart of FIG. 11A, and the method 174, depicted by the flowchart shown in FIG. 11B.

Figure 11A:
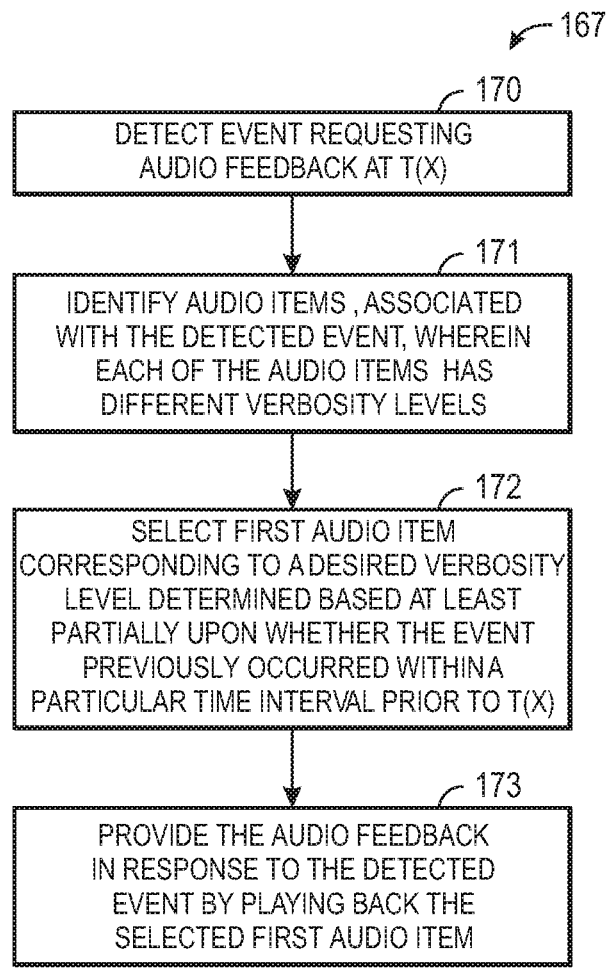
FIG. 11A is a flowchart depicting a first embodiment of a method for selecting an audio item for playback in response to the occurrence of an event requesting audio feedback, in accordance with aspects of the present disclosure.

Referring first to FIG. 11A, the method 169 illustrates a more basic approach for providing evolving/devolving audio feedback based on a desired verbosity level. For instance, the method 169 begins at step 170, at which the occurrence of an event at a first time (T(x)) (e.g., an indication that the Genius® function of FIG. 6 is unavailable) triggering or requesting audio feedback is detected by the audio user interface 38 of the device 10. Next, at step 171, a set of audio items corresponding to the detected event is identified, whereby each of the audio items within the set may have a different level of verbosity with respect to every other audio items within the set.

Thereafter, at step 172, a first audio item is selected that corresponds to a desired verbosity level which, as shown in FIG. 11A, may be determined based at least partially upon whether the detected event from step 170 occurred within a particular time interval (e.g., a step-up window) prior to the time T(x). In one embodiment, if the event previously occurred within the particular time interval, then the desired verbosity level may be devolved in relation to the verbosity of the audio item selected during the immediately preceding occurrence of the event. Similarly, if the event did not previously occur within the particular time interval, then the desired verbosity level may be evolved in relation to the verbosity of the audio item selected during the immediately preceding occurrence of the event. Subsequently, at step 173, the selected audio item (e.g., having the desired verbosity level) is played back to provide audio feedback in response to the detected event.

Figure 11B:
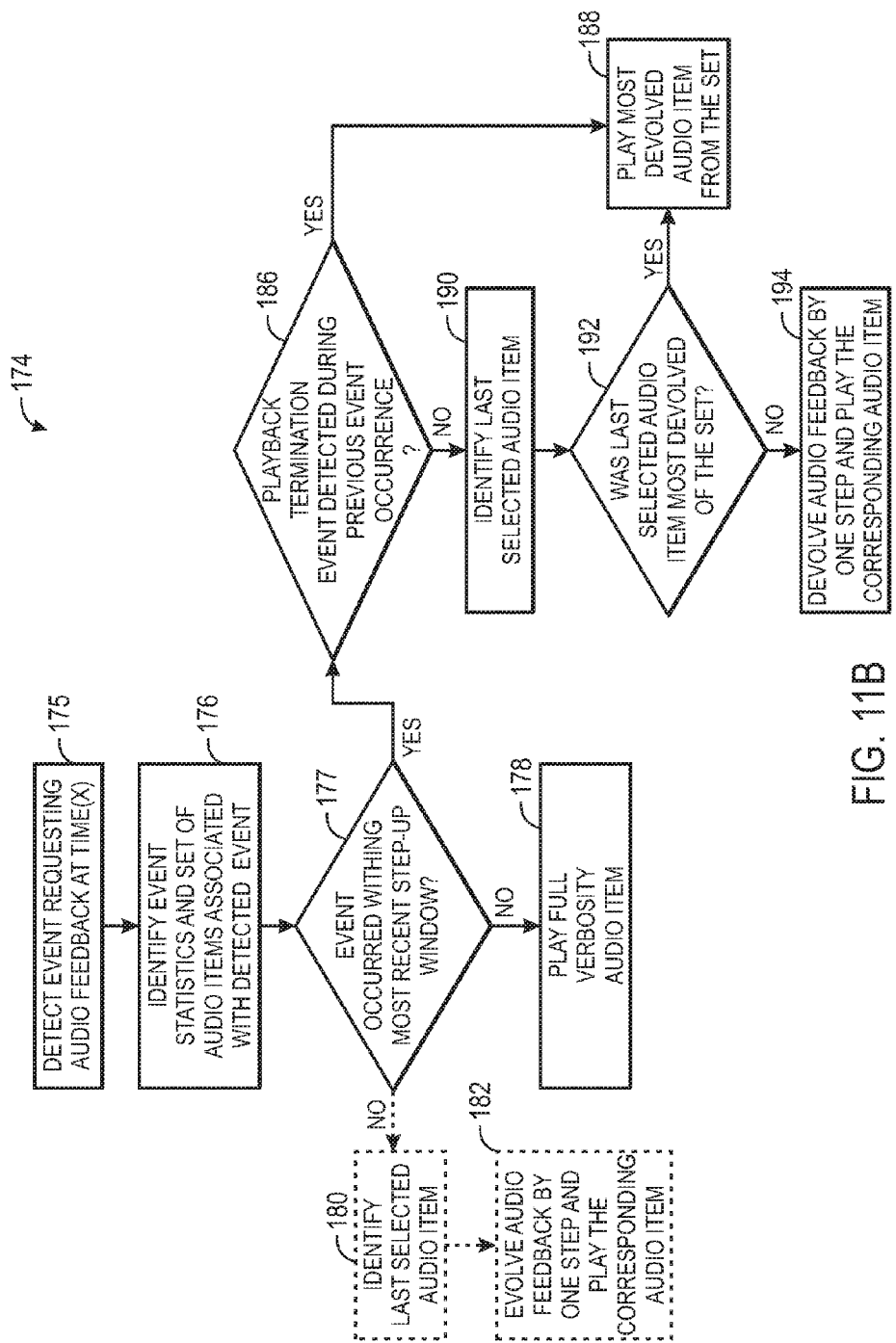
FIG. 11B is a flowchart depicting a second embodiment of a method for selecting an audio item for playback in response to the occurrence of an event requesting audio feedback, in accordance with aspects of the present disclosure.

FIG. 11B illustrates a more detailed flowchart that depicts additional features, as discussed above with reference to FIGS. 8-9. For instance, the method 174 begins at step 175, at which the occurrence of an event (e.g., an indication that the Genius® function of FIG. 6 is unavailable) triggering or requesting audio feedback is detected by the audio user interface 38 of the device 10. Next, at step 176, a set of event statistics data and an audio feedback data set, which may include multiple audio items having different levels of verbosity, that correspond to the event detected at step 175 are identified.

Based upon the event statistics data from step 176, the selection logic 86 may, at decision block 177, determine whether the event occurred within the step-up window following the most recent previous occurrence of the event. If the event did not occur within the step-up window, then the method 174 continues to step 178, whereby audio feedback is provided at full verbosity. As mentioned above, in an alternate embodiment, rather than providing full verbosity, the selection logic 86 may instead evolve the audio feedback by one step. For instance, as shown in FIG. 11, if the event did not occur within the step-up window, the method 174 may alternatively continue to step 180, at which the most recently selected audio item corresponding to the most recent previous occurrence of the event is identified, and step 182, at which the audio feedback is evolved by one step relative to the previously selected audio item and played back by the device 10.

Referring again to decision block 177, if the event does occur within the step-up window following the previous occurrence, the method 174 continues to decision block 186, at which a determination is made as to whether the previous occurrence was accompanied by a playback termination event (e.g., 161). If a playback termination event was detected alongside the previous occurrence of the event, the method 174 continues to step 188, and the most devolved audio item from the audio feedback data set (e.g., 148) is selected and played back. By way of example, the most devolved audio item may be a non-verbal audio cue (e.g., audio item 156).

If the decision block 186 determines that there was not a playback termination event detected during the previous occurrence of the event, then the most recently selected audio item corresponding to the previous occurrence of the event is identified at step 190. At step 192, a determination is made as to whether the most recently selected audio item is already the most devolved audio item of the audio feedback data set from step 176. If the most recently selected audio item is determined to be the most devolved audio item from the set, then it is selected as the current audio item and played back at step 188. If the most recently selected audio item is not the most devolved audio item from the set, then the selection logic 86 may devolve the audio feedback one step, and play the corresponding devolved audio item.

Continuing to FIGS. 12 and 13, embodiments illustrating how audio feedback may be varied based upon the contextual importance of an event are illustrated in accordance with aspects of the present disclosure. As defined above, the contextual importance refers to the importance of the information provided in response to an event on a device relative to the context in which the information is provided.

Referring first to FIG. 12, a series of screen images depicting the occurrence of two different events having differing contextual importance characteristics is illustrated. The screen images shown in FIG. 12 may be part of the GUI 36 displayed on the handheld device 70 shown in FIG. 3. For instance, beginning from the home screen 72 of the GUI 36, the user may initiate a media player application by selecting the icon 74. By way of example, the media player application 74 may be an iPod® application running on a model of an iPod Touch® or an iPhone®, available from Apple Inc. Additionally, the GUI 36, as shown in FIG. 12, may be a version of an iPod® or iPhone® operating system, also available from Apple Inc.

Upon selection of the icon 74, the user may be navigated to a home screen 200 of the media player application 74. As shown in FIG. 12, the screen 200 may initially display a listing 202 of playlists 204, each of which may include a plurality of media files defined by the user. For instance, a playlist 204 may constitute all the song files from an entire music album, or may be a custom "mix" of media files chosen by the user of the device 10. The screen 200 also includes the graphical buttons 206, 208, 210, 212, and 214, each of which may correspond to specific functions. For example, if the user navigates away from the screen 200, the selection of the graphical button 206 may return the user to the screen 200. The graphical button 208 may organize the media files stored on the device 10 alphabetically based on the names of artists associated with each media file. The graphical button 210 may represent a function by which the media files corresponding specifically to music (e.g., song files) are sorted and displayed on the device 10. For instance, the selection of the graphical button 210 may display all music files stored on the device 10 alphabetically in a listing that may be navigated by the user. Additionally, the graphical button 212 may represent a function by which the user may access video files stored on the device 10. Finally, the graphical button 214 may provide the user with a listing of options that the user may configure to further customize the functionality of the device 10 and the media player application 74.

As discussed above, during operation of the device 10, various events, including user events and system events may occur, as defined above. For instance, the visual notification window 218 may be displayed on the screen 200 to indicate that a user event 216 has occurred in response to actions initiated by a user to enable the media player application 74 to accept incoming network connections. As shown in FIG. 12, the window 218 may include the visual notification message 220, as well as the decision button 222, which may deny incoming network connections if selected, and the decision button 224, which may allow incoming network connections if selected.

In the present context, the "contextual importance" of the event 216 may be relatively high due to the fact that a user input is required in order to carry out or not carry out the requested operation (e.g., the allowance of incoming network connections). That is, without a response from the user, the device 10 is unable to proceed, as the user has not confirmed or denied the allowance of incoming network connections. Thus, an audio feedback data set associated with the event 216 may include at least a non-verbal audio tone 226 that signifies the high contextual importance of the event 216 when played back, with a goal of prompting the user to respond to the visual notification window 218. For example, the non-verbal tone 226 may include a distinctive alarm sound, a chirp, a beep, or any other type of non-verbal audio tone that may highlight the contextual importance of the event 216 (e.g., higher pitched sound, louder volume, longer playback time, etc.). In other words, while the event 216 may also be associated with one or more verbal audio items, in situations where either the audio user interface 38 selects the non-verbal audio item 226 or in which the user configures the device 10 to play back only non-verbal audio feedback, the non-verbal audio item 226 may help audibly distinguish the event 216 from events of lesser contextual importance.

To provide an example, an event that initially has lower contextual importance relative to the event 216 may be a system event in the form of a low battery warning 228. For instance, upon the occurrence of the low battery warning event 228, the visual notification window 230 is displayed on the screen 200, and contains the visual notification message 232 indicating that the power source 30 (FIG. 1) of the device 10 has 20% of its full charge capacity remaining. The window 230 also includes the graphical button 234, which the user may select to remove the window 230 from the screen 200. Thus, unlike the event 216, the device 10 does not require a decision input.

Ideally, the user will mentally process the notification provided by the window 230 and take necessary actions to recharge the power source 30. However, the device 10 will continue to operate in the near term regardless of whether or not the user initiates recharging of the power source 30 immediately. In this context, the contextual importance of the event 228 may be regarded as generally low relative to the event 216. As such, the event 228 may have associated therewith a non-verbal audio item 236 that is less distinct (e.g., lower pitched, softer volume, shorter playback time, etc.) relative to the non-verbal audio item 226, thus signifying the lesser contextual importance of the event 228.

While the event 228 may initially be categorized as having low contextual importance, it should be appreciated that the context in which the event 228 occurs may change over time. For instance the notification 230 may be a first warning based on a low power notification threshold of 20%. However, assuming the user chooses not to take action to replenish the power source 30, the device 10 will continue to consume the remaining power, thus further depleting the power source 30. Accordingly, in some embodiments, the user interface 34 may be configured to supply additional warnings at one or more lower thresholds. For instance, in one embodiment, the user interface 34 may supply a subsequent low power warning when the remaining charge in the power source 30 is depleted to 1% of total charge capacity. In this context, the 1% warning may be regarded as having high contextual importance, as the device 10 would be unable to continue operating when the power source 30 inevitably becomes fully depleted absent recharging or replacement. Thus, the latter example represents an embodiment in which multiple non-verbal items (e.g., of the same verbosity level) are associated with a common event, such that during the initial 20% warning event, a non-verbal audio item indicating low contextual importance may be played, and during the subsequent 1% warning event, another non-verbal audio item indicating high contextual importance may be played by the audio user interface 38.

In additional embodiments, the contextual importance of the events 226 or 230 may be determined based upon pre-programmed information (e.g., events may be programmed as having high or low contextual importance characteristics), which may be established by the manufacturer of the device 10 or the programmer of the audio user interface 38, or later configured/modified by a user, such as through the user preference settings 96 (FIG. 4). In other embodiments, the contextual importance of the events 226 or 230 may be adaptive or learned based upon previous device behavior and/or how a user interacts with the device during pervious occurrence(s) of the user interface event. For instance, in one embodiment, a current event (e.g., 226 or 230) may be identified as having higher contextual importance if it is determined that the same type of event occurred frequently within a particular interval of time immediately preceding the current occurrence, or may be identified as having lower contextual importance if the same type of event rarely occurred or did not occur at all within the particular interval of time immediately preceding the current occurrence.

FIG. 13 provides a flowchart that depicts a method 240 for varying audio feedback based upon contextual importance, as described in FIG. 12. For instance, beginning at step 242, the method 240 may detect an event requesting audio feedback. Next, at step 244, the contextual importance of the event is determined. For instance, as discussed above, this step may, in some instances, include determining whether or not action on the user's part is necessary for the device to continue operating. Subsequently, at step 246, an audio item is selected based upon the contextual importance of the event, as determined at step 244. For example, if the event has low contextual importance, the less distinct non-verbal tone 236 may be played back, and if the event has high contextual importance, the more distinct non-verbal tone 226 may be played back.

Continuing to FIGS. 14-18, embodiments illustrating how audio feedback may be varied based upon the manner in which a user navigates a list of items displayed on a device 10 are illustrated in accordance with aspects of the present disclosure. For instance, referring first to FIG. 14, screen images depicting how a user may access a listing of songs in the media player application 74 are illustrated. Screens 72 and 200 are similar to those shown in FIG. 12, and depict the initiation of the media player application 74 and the navigation from the home screen 72 to the screen 200, which displays the listing 202 of playlists 204.

Figure 14:
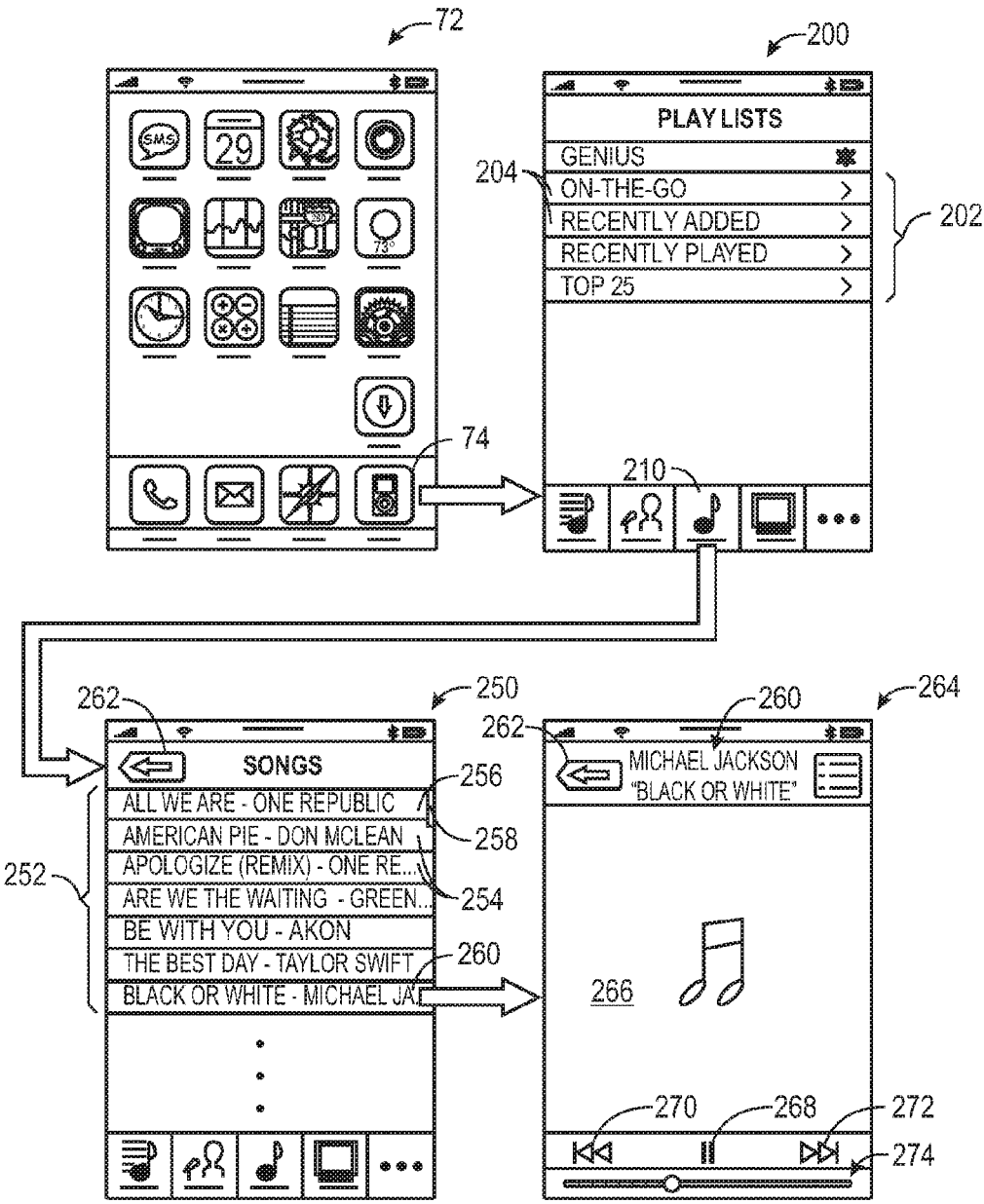
FIG. 14 depicts a plurality of screen images showing an application that may be executed on the electronic device of FIG. 1 that includes a navigable list of items.

By selecting the graphical button 210 the user may be navigated to the screen 250, which may display a navigable list 252 of music files (songs) 254 stored on the device 10 alphabetically. For instance, as shown in FIG. 14, the first song in the list 252 is referred to by reference number 256. To select a particular song for playback, the user may select a displayed song using an input structure 14 of the device 10 (e.g., a touchscreen). The screen 250 may also include a scroll bar element 258 to provide a scrolling function. Thus, where the listing 252 of the music files 254 exceeds the display capabilities of the device 10, the user may interface with the scroll bar element 258 to navigate the remainder of the list 252. Upon selection of a particular item for playback, referred to here by reference number 260, the user may continue to the screen 264.

As shown in the screen 264, information pertaining to the selected music file 260 is displayed. For instance, the displayed information may include the name of the recording artist, the title of the selected music file 260, and, in some embodiments, the album with which the selected music file 260 is associated. The screen 264 may also display the album artwork 266 and the graphical buttons 268, 270, and 272. As will be appreciated, the graphical button 268 may allow the user to pause or un-pause the playback of the selected music file 260. Additionally, where the presently selected media file 260 is part of a playlist, the graphical buttons 270 and 272 may represent the functions to returning to a previous file in the playlist or to continue to the subsequent file in the playlist. As can be appreciated, where a playlist is being played in a random mode or shuffle mode, the graphical buttons 270 and 272 may function select a random file from the playlist for playback. The screen 264 also includes a sliding bar element 274, which may be manipulated by the user to control the volume of the audio playback. For the purposes of the list navigation examples discussed below with respect to FIGS. 15-17, it is assumed that the user pauses the playback of the selected music file 260 (by selecting the graphical button 268) and returns to the list 252 on the screen 250 by selecting the graphical button 262 on the screen 264.

Referring now to FIGS. 15-17, examples of how audio feedback may be varied based upon the speed at which navigates a list, such as the song list 252, are illustrated in accordance with aspects of the present disclosure. In the illustrated examples, each song file in the list 252, beginning with the initial list item 256, is given a list position reference label, beginning with L0 for the first item 256, L1 for the second item, and so forth. It should be understood that the techniques disclosed herein may be applied to both vertical navigation of a list, as well as horizontal navigation of a list.

As depicted in FIG. 15, the list 252 is navigated a first speed 280. The first navigation speed 280 may be relatively slow, and may allow enough time between the transition of one list item to another list item to provide full verbosity audio feedback for each of the list items. For instance, in the depicted example, the user may begin navigating the list 252 by scrolling down the list from first list item L0 and stopping at the list item L3. During this action, the title of each song and the name of the recording artist may be spoken by the audio user interface 38 for each of the songs L0, L1, L2, and L3, as shown in Table 1 below:

TABLE 1

List Navigation at First Speed with Full Verbosity Audio Feedback

| List Item | Audio Feedback |
| --- | --- |
| L0 | Speak full song title followed by artist name |
| L1 | Speak full song title followed by artist name |
| L2 | Speak full song title followed by artist name |
| L3 | Speak full song title followed by artist name |

In accordance with the presently disclosed techniques, the audio user interface 38 may be configured to adapt to slight changes in the navigation speed 280. For instance, in one situation, the navigation speed may increase slightly, such that the transition time between list items reduced to allot enough time for speaking only one of the two audio items (e.g., song title or artist name). In one embodiment, the audio user interface 38 may still provide full verbosity audio feedback with respect to the song title information, but may omit the information regarding the artist name.

Next, FIG. 16 shows an example in which the navigation speed 282, which is notably increased relative to the navigation speed 280 of FIG. 15, does not provide enough transition time between list items to allow for full verbosity audio feedback. To provide an example, the navigation speed may be expressed based upon a number of list items navigated per second of time (e.g., List Items/second). By way of example only, the navigation speed 282 may be approximately 2 list items per second (or 1 list item per half second), whereas the navigation speed 280 shown in FIG. 15 may be notably slower, such as 0.25 list items per second (or 1 list items every 4 seconds).

In the present example of FIG. 16, the user may navigate from the first list item L0 to the list item L11 using the navigation speed 282. To accommodate for the reduced transition time between each list item when navigating at the speed 282, the audio user interface 38 may, in one embodiment, devolve the audio feedback associated with the list navigation by speaking only the letter corresponding to the alphabetical order of a list item if that list item is the first item within an alphabetical grouping (e.g., song titles starting with "A," "B," etc.), and providing a non-verbal tone for each other list item. This embodiment is depicted below in Table 2.

TABLE 2

List Navigation at Second Speed with Reduced Verbosity Audio Feedback

| List Item | Audio Feedback |
| --- | --- |
| L0 | Speak the letter "A" |
| L1 | Nonverbal tone |
| L2 | Nonverbal tone |
| L3 | Nonverbal tone |
| L4 | Speak the letter "B" |
| L5 | Nonverbal tone |
| L6 | Nonverbal tone |
| L7 | Nonverbal tone |
| L8 | Nonverbal tone indicating new content |
| L9 | Speak the letter "C" |
| L10 | Nonverbal tone |
| L11 | Speak the letter "D" |

Additionally, as indicated by the list item L8, the audio user interface 38 may also be configured to selectively provide non-verbal tones based on the "newness" of the list item. For instance, the list item L8 may represent a song that was recently purchased from an online digital media service, such as the iTunes® service, provided by Apple Inc. Thus, in order to emphasize the newness of the song L8, the audio user interface 38 may play a non-verbal tone that is more distinct (e.g., a higher pitched beep) relative to the non-verbal tones played for older content (e.g., L6, L7, etc.) when the newer song L8 is reached during navigation. As will be appreciated, the "newness" threshold may be configured through user preferences 96 on the device 10. By way of example, a user may configure the device 10 to identify content purchased or downloaded with the last 3 days as being new content.

In another embodiment, the identification of "newer" content may include defining multiple tiers of newness. For instance, in addition to using a 3 day threshold for identifying the newest content on the device 10, a second threshold (e.g., 14 days) may be established to detect content that is still relatively recent. In such embodiments, different non-verbal tones may be used for list items that are identified as being newest and recent items, with the non-verbal tone for recent items being less distinct than the non-verbal tone associated with the newest items, but with both the non-verbal tones for recent and newest items being substantially more distinct relative to a non-verbal tone used for items not identified as being new or recent (e.g., items older than 14 days). Indeed, those skilled in the art will appreciate that any number of non-verbal tones for distinguishing between the age of content stored on the device 10 (e.g., based on any number of tiers defined by corresponding thresholds) may be utilized in various embodiments of the present technique.

Continuing to FIG. 17, an additional example depicting the navigation of the list 252 at the speed 284, which is even greater relative to the speed 282 of FIG. 16, is provided. By way of example only, the navigation speed 284 may be approximately 4 list items per second. In the present example, the user may navigate from the first list item L0 to the list item L18 using the navigation speed 284. To accommodate for an even further reduced transition time between each list item when navigating at the speed 284, the audio user interface 38 may further devolve the audio feedback such that audio feedback is provided only for a portion of the list items. For instance, as shown in Table 3 below, the audio user interface 38 may, in one embodiment, devolve the audio feedback associated with the list navigation by speaking the letter corresponding to the alphabetical order of a list item for the first list items within each alphabetical grouping (e.g., song titles starting with "A," "B," etc.), and playing a non-verbal tone for only every third list item (e.g., items L2, L5, L8, and L17). For list items that qualify for the playback of a non-verbal tone and are also the first item in an alphabetical group, the alphabetical letter may be spoken in lieu of the non-verbal tone (e.g., items L11 and L14).

TABLE 3

List Navigation at Third Speed with Reduced Verbosity Audio Feedback

| List Item | Audio Feedback |
|---|---|
| L0 | Speak the letter "A" |
| L1 | |
| L2 | Nonverbal tone |
| L3 | |
| L4 | Speak the letter "B" |
| L5 | Nonverbal tone |
| L6 | |
| L7 | |
| L8 | Nonverbal tone indicating new content |
| L9 | Speak the letter "C" |
| L10 | |
| L11 | Speak the letter "D" |
| L12 | |
| L13 | |
| L14 | Speak the letter "E" |
| L15 | |
| L16 | |
| L17 | Nonverbal tone |
| L18 | Speak the letter "G" |

As will be appreciated, in other embodiments, the frequency at which the non-verbal tones are provided may further decrease (e.g., every fourth, fifth, or sixth item) as the list navigation speed continues to increase. Further, it should be understood that the navigation of the list 252 may not necessarily occur a constant speed. Thus, the audio user interface 38 may adjust the verbosity of the audio feedback accordingly. For instance, if the user initially navigates the list 252 very slowly (e.g., speed 280), and gradually increases to a faster speed (e.g., speed 284), the audio user interface 38 may initially provide full verbosity audio feedback for multiple segments of data (e.g., song title and artist name), and gradually devolve the verbosity to providing only the song title and eventually reaching a devolved verbosity scheme similar to that shown in Table 3. If the user subsequently gradually decreases the navigation speed, then the audio feedback may also gradually evolve back towards the full verbosity mode.

Moreover, while the present techniques have been illustrated in conjunction with a graphical user interface, it should be understood that certain embodiments may include only an audio user interface. In such embodiments, the above-described audio feedback techniques may be applied as the user may navigate through a listing of items (e.g., using a scroll wheel) without a corresponding visual interface. As mentioned above, an embodiment of the device 10 that lacks a display 22 and thus a graphical user interface may be a model of an iPod® Shuffle, available from Apple Inc.

The various techniques for varying audio feedback during list navigation, as described with reference to the embodiments shown in FIGS. 15-17 and in Tables 1-3, are generally summarized by the method 290, depicted by the flowchart shown in FIG. 18. The method 290 begins at step 292, at which a list navigation event is detected. For instance, a list navigation event may include the transition from one list item (e.g., L0) to a subsequent list item (e.g., L1). At step 294, the current list item is identified. Thereafter, at decision block 296, a determination is made as to whether the user's navigation speed permits full verbosity audio feedback. By way of example, the navigation speed may be determined in one embodiment by calculating an average of the speeds at which the transition between two or more immediately preceding list items occurred (e.g., or succeeding items if the user is navigating up a list). If it is determined that the navigation speed allows for full verbosity audio feedback, the method 290 continues to step 298, whereby one or more full verbosity audio items associated with the currently selected list item are played back.

If the navigation speed at decision block 296 does not permit full verbosity audio feedback, the method 290 continues to decision block 300, at which a determination is made as to whether the current list item is the first item of an alphabetical group and, if so, the letter of the alphabetical group is spoken by the audio user interface 38 and provided as audio feedback (step 302). If the current list item is not the first item of an alphabetical group, the method 290 proceeds to decision block 304, whereby the newness of the current list item is determined. If the current list item is identified as being new content, then a distinct non-verbal audio item that indicates the newness of the current list item is played, as indicated at step 306. If the current list item is not identified as being new content, then a less distinct non-verbal audio item is played instead, as indicated at step 308.

FIGS. 19-21 depict various screens images showing how audio feedback options may be configured on the device 10, in accordance with one embodiment. For instance, referring first to the screen 310 of FIG. 19, a main "home" screen 312 of a GUI 36 for an operating system is illustrated. By way of example, the operating system may be a version of the Mac OS® operating system from Apple Inc. As discussed in FIG. 2, the GUI 36 may provide a dock 58 that includes various icons 56. The selection of the icon 316 may cause the graphical window 318 to be displayed. As shown, the graphical window 318 includes additional icons 56 that may relate the configuration of various aspects of system preferences for the device 10. Particularly, the graphical icon 320 may represent a function for configuring an audio user interface 38.

Referring to FIG. 20, the selection of the icon 320 may cause the graphical configuration window 322 to be displayed. Initially, the configuration window 322 includes the graphical switches 324, 326, 328, and 330. The switch 324, currently in the "ON" position, may enable or disable the audio user interface 38, while the switches 326, 328, and 330 may be toggled to allow the audio user interface 38 to operate in different modes. For instance, the switch 326, currently in the "ON" position, indicates that a constant full verbosity mode is presently enabled, and that the additional modes for devolving/evolving audio feedback (switch 328) and for using only non-verbal audio feedback (switch 330) are both presently disabled.

FIG. 21 depicts the configuration window 322 following the performance of various configuration steps by a user. For instance, as shown, the switch 326 is toggled to the "OFF" position to disable the constant full verbosity mode, and the switch 328 is toggled to the "ON" position to indicate that the adaptive devolving/evolving mode has been enabled. Upon enabling the devolving/evolving mode, a set of additional configuration parameters 332 may be displayed and configured by the user. For instance, the user may enable or disable each of the configuration parameters 332 by toggling the graphical switches 334, 338, 340, 342, 344, 346, and 350 to desired positions. The user may also utilize the selection field 336 to specify a step-up time, as discussed above with reference to FIGS. 8 and 9. Additionally, the user may utilize the selection field 348 to specify a threshold for distinguishing between newer and older content during list navigation, as discussed above with reference to FIGS. 15-17.

In summary, the embodiments presented above provide an intelligent and adaptive technique by which an electronic device (e.g., device 10) is capable of evolving and devolving of audio feedback verbosity in response to user inputs and/or in response to external stimuli. For instance, based on user actions and or user-defined preferences (e.g., preferences 96) the specific actions for devolving and/or evolving audio feedback may be dynamic and adaptive. By way of example, as shown in FIG. 9 above, the detection of a user action in the form of a playback termination event may cause the device 10 to increase the rate of devolution (e.g., devolves verbosity faster due to the indication that the user is not interested in the audio feedback corresponding to the terminated event). Additionally, the external stimuli not caused by user inputs, such as low power events or the detection of network connections (FIG. 12) may also cause the device 10 to increase or decrease the verbosity of audio feedback (e.g., based on contextual importance). Indeed, the presently described techniques offer a robust and adaptive system for adjusting the verbosity of audio feedback provided by an audio user interface.

Further, as will be understood, the various techniques described above and relating to adaptively varying audio feedback provided by an audio user interface of an electronic device are provided herein by way of example only. Accordingly, it should be understood that the present disclosure should not be construed as being limited to only the examples provided above. Indeed, a number of variations of the audio feedback techniques set forth above may exist. Further, it should be appreciated that the above-discussed techniques may be implemented in any suitable manner. For instance, audio user interface 38 and the audio feedback selection logic 86, which are collectively configured to implement various aspects of the presently disclosed techniques, may be implemented using hardware (e.g., suitably configured circuitry), software (e.g., via a computer program including executable code stored on one or more tangible computer readable medium), or via using a combination of both hardware and software elements.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method, comprising:
at an electronic device having one or more processors and memory:
detecting a respective occurrence of a user interface event requesting audio feedback on the electronic device at a first time;
in response to detecting the respective occurrence of the user interface event at the first time, identifying a plurality of audio items and a first visual notification associated with the user interface event, wherein each of the plurality of audio items has a different level of verbosity, and wherein the plurality of audio items include at least a first audio item having a first verbosity level corresponding to a verbosity level of the first visual notification, and a second audio item having a second verbosity level lower than the first verbosity level;
selecting the second audio item in accordance with at least a determination that the user interface event previously occurred within a particular time interval prior to the first time and that the first audio item was provided during said previous occurrence with the first visual notification; and
concurrently providing the second audio item with the first visual notification on the electronic device.

2. The method of claim 1, further comprising:
in accordance with at least a determination that the user interface event did not previously occur within the particular time interval prior to the first time, selecting an audio item having the highest verbosity level from the plurality of audio items for playback.

3. The method of claim 1, further comprising:
detecting a subsequent occurrence of the user interface event on the electronic device at a second time; and
selecting a respective one of the plurality of audio items that corresponds to a respective verbosity level determined based upon the duration between the first time and the second time.

4. The method of claim 3, wherein selecting said respective one audio item comprises:
in accordance with at least a determination that the duration between the first and second times is less than or equal to the particular time interval, selecting an audio item from the plurality of audio items that is at least one verbosity level lower relative to the second audio item; and
in accordance with at least a determination that the duration between the first and second times is greater than the particular time interval, selecting an audio item from the plurality of audio items that is at least one verbosity level higher relative to the second audio item.

5. The method of claim 3, wherein selecting the respective one audio item comprises:
determining whether a playback termination event was detected during the subsequent occurrence of the user interface event at the second time; and
in accordance with at least a determination that a playback termination event was detected during the subsequent occurrence at the second time, selecting an audio item from the plurality of audio items having a verbosity level lower than the second verbosity level.

6. The method of claim 3, comprising:
determining whether a playback termination event was detected during the subsequent occurrence of the user interface event at the second time; and
in accordance with at least a determination that a playback termination event was not detected during the subsequent occurrence of the user interface event at the second time, providing the first visual notification concurrently with the playback of the selected respective one audio item; and
in accordance with at least a determination that a playback termination event was detected during the subsequent occurrence of the user interface event at the second time, providing a second visual notification concurrently with the playback of the selected respective one audio item, wherein the second visual notification is less verbose relative to the first visual notification.

7. The method of claim 6, wherein providing the second visual notification further comprises:
displaying the second visual notification at a second location in the graphical user interface that is less prominent than a first location at which the first visual notification was previously displayed.

8. An electronic device, comprising:
one or more processors; and
memory having instructions stored thereon, the instructions, when executed by the one or more processors, cause the processors to perform operations comprising:
  detecting a respective occurrence of a user interface event requesting audio feedback on the electronic device at a first time;
  in response to detecting the respective occurrence of the user interface event at the first time, identifying a plurality of audio items and a first visual notification associated with the user interface event, wherein each of the plurality of audio items has a different level of verbosity, and wherein the plurality of audio items include at least a first audio item having a first verbosity level corresponding to a verbosity level of the first visual notification, and a second audio item having a second verbosity level lower than the first verbosity level;
  selecting the second audio item in accordance with at least a determination that the user interface event previously occurred within a particular time interval prior to the first time and that the first audio item was provided during said previous occurrence with the first visual notification; and
  concurrently providing the second audio item with the first visual notification on the electronic device.

9. The device of claim 8, wherein the operations further comprise:
  in accordance with at least a determination that the user interface event did not previously occur within the particular time interval prior to the first time, selecting an audio item having the highest verbosity level from the plurality of audio items for playback.

10. The device of claim 8, wherein the operations further comprise:
  detecting a subsequent occurrence of the user interface event on the electronic device at a second time; and
  selecting a respective one of the plurality of audio items that corresponds to a respective verbosity level determined based upon the duration between the first time and the second time.

11. The device of claim 10, wherein selecting said respective one audio item comprises:
  in accordance with at least a determination that the duration between the first and second times is less than or equal to the particular time interval, selecting an audio item from the plurality of audio items that is at least one verbosity level lower relative to the second audio item; and
  in accordance with at least a determination that the duration between the first and second times is greater than the particular time interval, selecting an audio item from the plurality of audio items that is at least one verbosity level higher relative to the second audio item.

12. The device of claim 10, wherein selecting the respective one audio item comprises:
  determining whether a playback termination event was detected during the subsequent occurrence of the user interface event at the second time; and
  in accordance with at least a determination that a playback termination event was detected during the subsequent occurrence at the second time, selecting an audio item from the plurality of audio items having a verbosity level lower than the second verbosity level.

13. The device of claim 10, wherein the operations further comprise:
  determining whether a playback termination event was detected during the subsequent occurrence of the user interface event at the second time; and
  in accordance with at least a determination that a playback termination event was not detected during the subsequent occurrence of the user interface event at the second time, providing the first visual notification concurrently with the playback of the selected respective one audio item; and
  in accordance with at least a determination that a playback termination event was detected during the subsequent occurrence of the user interface event at the second time, providing a second visual notification concurrently with the playback of the selected respective one audio item, wherein the second visual notification is less verbose relative to the first visual notification.

14. The device of claim 13, wherein providing the second visual notification further comprises:
  displaying the second visual notification at a second location in the graphical user interface that is less prominent than a first location at which the first visual notification was previously displayed.

15. A non-transitory computer-readable medium having instructions stored thereon, the instructions, when executed by the one or more processors, cause the processors to perform operations comprising:
  detecting a respective occurrence of a user interface event requesting audio feedback on the electronic device at a first time;
  in response to detecting the respective occurrence of the user interface event at the first time, identifying a plurality of audio items and a first visual notification associated with the user interface event, wherein each of the plurality of audio items has a different level of verbosity, and wherein the plurality of audio items include at least a first audio item having a first verbosity level corresponding to a verbosity level of the first visual notification, and a second audio item having a second verbosity level lower than the first verbosity level;
  selecting the second audio item in accordance with at least a determination that:
    the user interface event previously occurred within a particular time interval prior to the first time, and
    the first audio item was provided during said previous occurrence with the first visual notification; and
  concurrently providing the second audio item with the first visual notification on the electronic device.

16. The computer-readable medium of claim 15, wherein the operations further comprise:
  in accordance with at least a determination that the user interface event did not previously occur within the particular time interval prior to the first time, selecting an audio item having the highest verbosity level from the plurality of audio items for playback.

17. The computer-readable medium of claim 15, wherein the operations further comprise:
  detecting a subsequent occurrence of the user interface event on the electronic device at a second time; and
  selecting a respective one of the plurality of audio items that corresponds to a respective verbosity level determined based upon the duration between the first time and the second time.

18. The computer-readable medium of claim 15, wherein selecting said respective one audio item comprises:
  in accordance with at least a determination that the duration between the first and second times is less than or equal to the particular time interval, selecting an audio item from the plurality of audio items that is at least one verbosity level lower relative to the second audio item; and in accordance with at least a determination that the duration between the first and second times is greater than the particular time interval, selecting an audio item from the plurality of audio items that is at least one verbosity level higher relative to the second audio item.

19. The computer-readable medium of claim 18, wherein selecting the respective one audio item comprises:

determining whether a playback termination event was detected during the subsequent occurrence of the user interface event at the second time; and in accordance with at least a determination that a playback termination event was detected during the subsequent occurrence at the second time, selecting an audio item from the plurality of audio items having a verbosity level lower than the second verbosity level.

20. The computer-readable medium of claim 18, wherein the operations further comprise:

determining whether a playback termination event was detected during the subsequent occurrence of the user interface event at the second time; and in accordance with at least a determination that a playback termination event was not detected during the subsequent occurrence of the user interface event at the second time, providing the first visual notification concurrently with the playback of the selected respective one audio item; and in accordance with at least a determination that a playback termination event was detected during the subsequent occurrence of the user interface event at the second time, providing a second visual notification concurrently with the playback of the selected respective one audio item, wherein the second visual notification is less verbose relative to the first visual notification.

21. The computer-readable medium of claim 20, wherein providing the second visual notification further comprises:

displaying the second visual notification at a second location in the graphical user interface that is less prominent than a first location at which the first visual notification was previously displayed.

22. A method, comprising:

at an electronic device having one or more processors and memory:

detecting a first occurrence of a user interface event;

in response to detecting the first occurrence of the user interface event, concurrently providing a first audio item with a visual notification on the electronic device, wherein the first audio item has a first verbosity level corresponding to a verbosity level of the visual notification;

detecting a second occurrence of the user interface event;

determining whether the second occurrence is detected within a particular time interval after detecting the first occurrence; and in accordance with a determination that the second occurrence is detected within the particular time interval after detecting the first occurrence and that the first audio item was provided during said first occurrence with the visual notification, concurrently providing a second audio item with the visual notification on the electronic device, wherein the second audio item has a second level of verbosity lower than the first verbosity level.

23. The method of claim 22, wherein detecting the first occurrence of the user interface event comprises:

initiating the user interface event by the electronic device in absence of user interaction therewith.

24. The method of claim 22, wherein detecting the first occurrence of the user interface event comprises:

initiating the user interface event by the electronic device in response to a detected user interaction with a graphical user interface displayed by the electronic device.

25. The method of claim 22, further comprising:

selecting the second audio item from a plurality of audio items associated with the user interface event, wherein the second audio item is selected based on the first verbosity level and in accordance with at least the determination that the second occurrence of the user interface event is detected within the particular time interval after detecting the first occurrence of the user interface event.

* * * * *